United States Patent
Shen et al.

(10) Patent No.: US 7,424,158 B2
(45) Date of Patent: Sep. 9, 2008

(54) IMAGE PREDICTIVE CODING METHOD

(75) Inventors: Sheng Mei Shen, Singapore (SG); Thiow Keng Tan, Singapore (SG)

(73) Assignee: Matsushita Electric Industrial Co., Ltd., Osaka (JP)

( * ) Notice: Subject to any disclaimer, the term of this patent is extended or adjusted under 35 U.S.C. 154(b) by 46 days.

(21) Appl. No.: 11/601,796

(22) Filed: Nov. 20, 2006

(65) Prior Publication Data
US 2007/0065030 A1    Mar. 22, 2007

Related U.S. Application Data

(62) Division of application No. 10/781,616, filed on Feb. 20, 2004, which is a division of application No. 10/229,151, filed on Aug. 28, 2002, now Pat. No. 6,859,559, which is a division of application No. 09/513,198, filed on Feb. 25, 2000, now Pat. No. 6,532,306, which is a division of application No. 08/983,640, filed as application No. PCT/JP97/01800 on May 28, 1997, now Pat. No. 6,148,109.

(30) Foreign Application Priority Data

| May 28, 1996 | (JP) | ................................. P8-132970 |
| Jul. 5, 1996 | (JP) | ................................. P8-176426 |
| Sep. 26, 1996 | (JP) | ................................. P8-254677 |

(51) Int. Cl.
*G06K 9/36* (2006.01)
*G06K 9/46* (2006.01)
*H04N 7/26* (2006.01)
*H04N 7/30* (2006.01)
*H04N 7/34* (2006.01)
*H04N 7/50* (2006.01)

(52) U.S. Cl. ....................... 382/233; 382/238; 382/250; 382/251; 382/248

(58) Field of Classification Search ................. 358/466, 358/426.07, 426.08; 382/236, 238, 239, 382/244, 248, 250, 251, 233; 375/E7.142, 375/E7.211, E7.212, E7.225, E7.226, E7.229, 375/E7.256, E7.264, E7.265, E7.266
See application file for complete search history.

(56) References Cited

U.S. PATENT DOCUMENTS

| 4,155,097 A | * | 5/1979 | Lux ....................... 375/240.24 |
| 4,833,535 A | | 5/1989 | Ozeki et al. |
| 4,870,695 A | * | 9/1989 | Gonzales et al. ............. 382/238 |
| 5,485,279 A | * | 1/1996 | Yonemitsu et al. ...... 375/240.14 |
| 5,959,674 A | | 9/1999 | Jang et al. |
| 5,970,172 A | * | 10/1999 | Mochizuki .................. 382/233 |
| 5,974,184 A | * | 10/1999 | Eifrig et al. ................. 382/236 |
| 6,005,622 A | | 12/1999 | Haskell |
| 6,148,109 A | | 11/2000 | Boon |
| 6,173,080 B1 | | 1/2001 | Cho et al. |
| 6,292,588 B1 | | 9/2001 | Shen et al. |
| 6,341,144 B1 | | 1/2002 | Haskell et al. |
| 6,360,016 B1 | | 3/2002 | Shen et al. |
| 6,366,703 B1 | | 4/2002 | Boon et al. |
| 6,377,708 B1 | | 4/2002 | Shen et al. |

FOREIGN PATENT DOCUMENTS

| EP | 0 549 813 | 7/1993 |
| EP | 0863673 | 9/1998 |
| JP | 60-143088 | 7/1985 |
| JP | 61-201570 | 9/1986 |
| JP | 62-065583 | 3/1987 |
| JP | 2-65583 | 3/1990 |
| JP | 4-306095 | 10/1992 |
| JP | 5-37786 | 2/1993 |
| JP | 5-336382 | 12/1993 |
| JP | 7-231445 | 8/1995 |
| JP | 8-23536 | 1/1996 |
| JP | 10-304364 | 3/1998 |
| JP | 10-304364 | 11/1998 |

OTHER PUBLICATIONS

European Search Report issued Sep. 4, 2007 in European Application No. 07109871.9-1522.
European Search Report issued Sep. 4, 2007 in European Application No. 07109893.3-1522.

European Search Report issued Sep. 4, 2007 in European Application No. 07109900.6-1522.

"MPEG-4 Video Verification Model Version 5.0" 37 MPEG Meeting, Nov. 18, 1996-Nov. 22, 1996, Maceio, (Motion Picture Expert Group or ISO/IEC JTC1/SC29/WG11), International Organization for Standardization (ISO), 1, CH. De La Voie-Creuse, Case Postale 56—CH-1211 Geneva 20, Switzerland, Nov. 18, 1996.

A. Puri et al., "Description and Results of Coding Efficiency Modified Experiment T16 in MPEG-4 Video", ISO/IEC JTC 1/SC29/WG11, vol. MPEG97, No. 1703, Feb. 1997, pp. 1-22.

G. Sullivan, "Draft text of H.263+" ITU SG15, LBC Experts Group, Feb. 28, 1997, pp. 1-92.

"Codebook adaptation algorithm for a scene adaptive video coder"; Hartung; IEEE 95 vol. 4 pp. 2591-2594 (1995).

Video coding for mobile communications MPEG4 perspective; Kittler Mobile Multimedia Comm. Dec. 1996 pp. 311-319.

A 60mW MPEG4 video coder using clustered voltage scaling with variable supply voltage scheme; Takahashi et al.; IEEE Journal of Solid State Circuits pp. 1772-1780 Nov. 1998 vol. 33 Issue 11 ISSN: 0018-9200.

Puri, A., et al. "Improvements in DCT Based Video Coding", Proceedings of the SPIE, Feb. 12, 1997.

Wallace, G. K. "The JPEG Still Picture Compression Standard", Communications of the Association for Computing Machinery, vol. 34, No. 4, Apr. 1, 1991, pp. 30-44.

C-T et al., "Efficient Encoding of DC Coefficients in Transform Coding of Images Using JPEG Scheme", Signal Image and Video Processing, Singapore, Jun. 11-14, 1991, pp. 404-407, XP000384794.

Netravali et al., "Picture Coding: A Review", Proceedings of the IEEE, IEEE, New York, vol. 68, No. 3, Mar. 1, 1980, pp. 366-407, XP002028499.

Ad Hoc Group on MPEG-4 Video VM Editing: "MPEG-4 Video Verification Model 5.0", Nov. 1996, pp. 55-60, XP002240954.

Office Action issued Feb. 22, 2008 in U.S. Appl. No. 11/601,794.

* cited by examiner

*Primary Examiner*—Jerome Grant, II

(74) *Attorney, Agent, or Firm*—Wenderoth, Lind & Ponack, L.L.P.

(57) ABSTRACT

There is disclosed image predictive coding apparatus and method, image predictive decoding apparatus and method, and recording medium which stores therein the image predictive coding method or the image predictive decoding method, of which the transform efficiency is remarkably improved in comparison with the prior art. According to the image predictive coding apparatus and method, when dividing inputted image data to be coded into image data of a plurality of small regions which are adjacent to each other and coding the image data of an objective small region to be processed among the image data of the plurality of divided small regions which are adjacent to each other, reconstructed image data of a reproduction small region adjacent to the image data of the objective small region to be processed is used as image data of an intra-frame prediction small region of the objective small region to be processed, the image data of the intra-frame prediction small region is used as image data of an optimum prediction small region and image data of a difference small region which are differences between the image data of the objective small region to be processed and the image data of the optimum prediction small region is generated. Then, the generated image data of the difference small region is coded and outputted, and then the coded image data of the difference small region is decoded, so that the reconstructed image data of the reproduction small region is generated by adding the decoded image data of the difference small region to the image data of the optimum prediction small region.

4 Claims, 26 Drawing Sheets

First Preferred Embodiment
Image Predictive Coding Apparatus

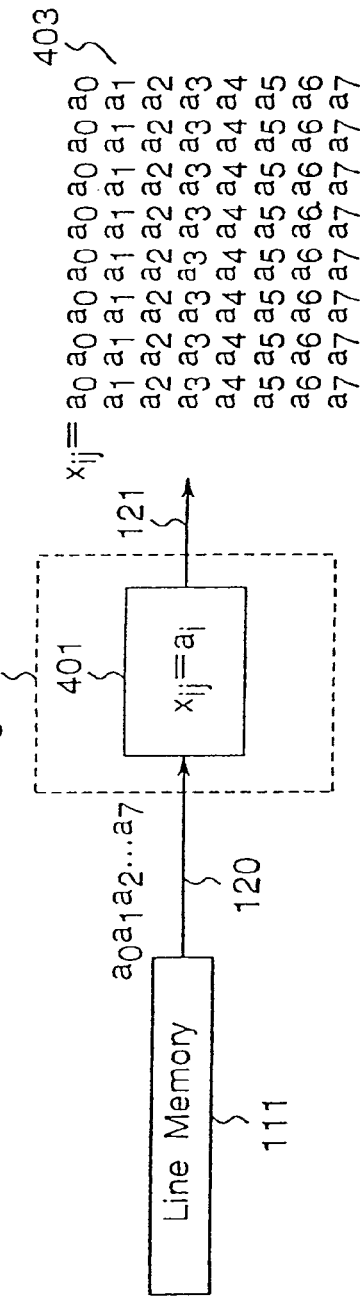
Fig.4 First Preferred Embodiment of Prediction Signal Generator 112
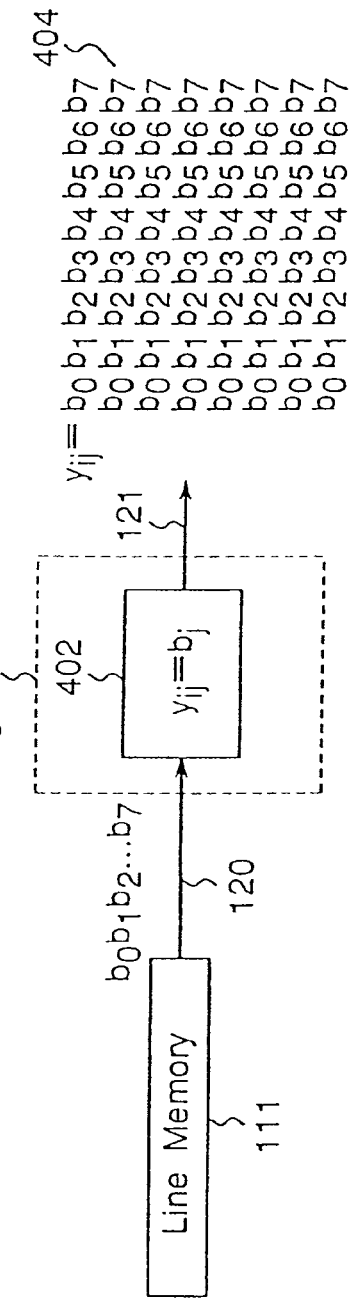
Fig.5 Second Preferred Embodiment of Prediction Signal Generator 112

Third Preferred Embodiment    Fourth Preferred Embodiment of Prediction Signal Generator 112

Fig.8 Second Preferred Embodiment Image Predictive Coding Apparatus

Fig. 12  Third Preferred Embodiment Image Predictive Decoding Apparatus

Fourth Preferred Embodiment
Image Predictive Decoding Apparatus

Fig.16 Fifth Preferred Embodiment Image Predictive Coding Apparatus

Fig. 17 Sixth Preferred Embodiment Image Predictive Coding Apparatus

Fig.18 DCT Region Predicting Circuits 1017, 1031

Image Predictive Coding Apparatus

Image Predictive Coding Apparatus

Fig.24 Eighth Preferred Embodiment Image Predictive Coding Apparatus

Fig. 25  Eighth Preferred Embodiment
Image Predictive Decoding Apparatus

Fig.27

| 0 | 1 | 2 | 3 | 10 | 11 | 12 | 13 |
|---|---|---|---|----|----|----|----|
| 4 | 5 | 8 | 9 | 17 | 16 | 15 | 14 |
| 6 | 7 | 19 | 18 | 26 | 27 | 28 | 29 |
| 20 | 21 | 24 | 25 | 30 | 31 | 32 | 33 |
| 22 | 23 | 34 | 35 | 42 | 43 | 44 | 45 |
| 36 | 37 | 40 | 41 | 46 | 47 | 48 | 49 |
| 38 | 39 | 50 | 51 | 56 | 57 | 58 | 59 |
| 52 | 53 | 54 | 55 | 60 | 61 | 62 | 63 |

Horizontal Scanning

Fig.28

| 0 | 4 | 6 | 20 | 22 | 36 | 38 | 52 |
|---|---|---|----|----|----|----|----|
| 1 | 5 | 7 | 21 | 23 | 37 | 39 | 53 |
| 2 | 8 | 19 | 24 | 34 | 40 | 50 | 54 |
| 3 | 9 | 18 | 25 | 35 | 41 | 51 | 55 |
| 10 | 17 | 26 | 30 | 42 | 46 | 56 | 60 |
| 11 | 16 | 27 | 31 | 43 | 47 | 57 | 61 |
| 12 | 15 | 28 | 32 | 44 | 48 | 58 | 62 |
| 13 | 14 | 29 | 33 | 45 | 49 | 59 | 63 |

Vertical Scanning

Fig.29

| 0 | 1 | 5 | 6 | 14 | 15 | 27 | 28 |
|---|---|---|---|----|----|----|----|
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

Zigzag Scanning

IMAGE PREDICTIVE CODING METHOD

This is a divisional application of Ser. No. 10/781,616, filed Feb. 20, 2004 which is a divisional application of Ser. No. 10/229,151, filed Aug. 28, 2002, now U.S. Pat. No. 6,859,559, which is a divisional application of Ser. No. 09/513,198, filed Feb. 25, 2000, now U.S. Pat. No. 6,532,306, which is a divisional application of Ser. No. 08/983,640, filed Jan. 28, 1998, now U.S. Pat. No. 6,148,109, which is the National Stage of International Application No. PCT/JP97/01800, filed May 28, 1997.

TECHNICAL FIELD

The present invention relates to an image predictive coding apparatus and method, image predictive decoding apparatus and method and recording medium. The present invention relates, in particular, to an image predictive coding apparatus and method as well as image predictive decoding apparatus and method for storing digital image data of an image which is a static image or a dynamic image into a recording medium such as an optical disk or for transmitting the data through a communication line. The present invention also relates to a recording medium in which a program including the steps of the image predictive coding method is recorded as well as a recording medium in which a program including the steps of the image predictive decoding method is recorded.

BACKGROUND ART

For the purpose of efficiently storing or transmitting a digital image, the image is required to be coded in a compression coding manner. As a method for coding a digital image in a compression coding manner, there is a waveform coding method of sub-band coding, wavelet coding, fractal coding or the like other than discrete cosine transform (referred to as a DCT transform hereinafter) represented by JPEG (Joint Photographic Experts Group) and MPEG (Motion Picture Experts Group). For the purpose of removing a redundant signal between images, an inter-image prediction with a motion compensation is executed, thereby subjecting a differential signal to waveform coding.

According to the MPEG system, an input image is processed while being divided into a plurality of 16×16 macro blocks. One macro block is further divided into 8×8 blocks and quantized after undergoing 8×8 DCT transform. This is called an intra-frame coding.

On the other hand, according to a motion detection method inclusive of block matching, a prediction macro block having the minimum error with respect to the objective macro block is detected from other frames adjacent in time, the detected prediction macro block is subtracted from the target macroblock thereby forming a differential macro block, and this macro block is quantized alter undergoing 8×8 DCT transform. This is called an inter-frame coding, and the prediction macro block is called a prediction signal of the time domain.

A normal image has spatially similar regions, and an image can be approximated to a spatial region by utilizing this characteristic. In a manner similar to that of the prediction signal of the time region, a prediction signal can also be obtained from an identical frame. This is called a spatial prediction signal.

Since spatially adjacent two pixel values are close to each other, the prediction signal of the spatial region is generally located close to the target signal. On the other hand, on the receiving side or the reproducing side, a signal which has been coded and reproduced in the past is required to be used as the prediction signal since the original image is absent. From these two factors, the prediction signal of the spatial region is required to be generated at high speed. This is because the signal used for the generation of a prediction signal has to be decoded and reproduced.

Therefore, the prediction signal of the spatial region is required to be generated in a simple manner, as well as, in high accuracy. Furthermore, a quickly operable construction is required in a coding apparatus and a decoding apparatus.

The coding of image data has been widely used in many international standards such as JPEG, MPEG1, H.261, MPEG2 and H.263. Each of the latter standards has a more improved coding efficiency. That is, much effort has been devoted to further reducing the number of bits than in the conventional standards in expressing the same image quality.

Coding of image data of moving images is comprised of intra-frame coding and prediction frame coding. In a representative hybrid coding system such as MPEG1 Standard, consecutive frames can be classified into the following three different types:

(a) intra-frame (referred to as an "I-frame" hereinafter);

(b) prediction frame (referred to as a "P-frame" hereinafter); and (c) bidirectional prediction frame (referred to as a "B-frame" hereinafter).

An I-frame is coded independently of the other frames, i.e., the I-frame is compressed without referring to the other frames. A P-frame is coded through motion detection and compensation by using the preceding frame for predicting the contents of a coded frame (it is a P-frame). A B-frame is coded through motion detection and compensation by using information from the preceding frame and information from the subsequent frame for predicting the data of the contents of the B-frame. The preceding frame and the subsequent frames could be an I-frame or a P-frame. The I-frame is coded in intra-modes. The P-frame and the B-frame are coded in intra and prediction mode.

As the characteristics of the coding of the I-frame, P-frame and B-frame are different from one another, the compressing methods thereof differ from one another. The I-frame uses no temporal prediction for the purpose of reducing the redundancy, and therefore, it requires more bits than those of the P-frame and the B-frame.

A description will be herein made taking MPEG2 as an example. It is assumed that the bit rate is 4 Mbits/sec and an image having 30 frames/sec is used. In general, the ratio of the number of bits used for the I- P- and B-frames is 6:3:1. Therefore, the I-frame uses about 420 kbits/s, and the B-frame uses about 70 kbits/s. This is because the B-frame is sufficiently predicted from both directions.

FIG. 14 is a block diagram showing a construction of a prior art image predictive coding apparatus. Since a DCT transform is executed on a block basis, the recent image coding methods are all based on the division of an image into smaller blocks. According to the intra-frame coding, an inputted digital image signal is first of all subjected to a block sampling process 1001 as shown in FIG. 14. Next, the blocks obtained after the block sampling process 1001 are subjected to a DCT transform process 1004 and thereafter subjected to a quantizing process 1005 and a run length Huffman variable length coding (VLC: Variable Length Coding; entropy coding) process 1006. On the other hand, according to the prediction frame coding, an inputted digital image is subjected to a motion compensating process 1003, and the motion-compensated block (i.e., the predicted block) is subjected to the DCT transform process 1004. Next, the quantizing process 1005 and the run length Huffman VLC coding (entropy coding) process 1006 are executed.

The fact that the block-based DCT transform process 1004 removes or reduces a spatial redundancy inside the target block to be processed and the fact that the motion detecting and compensating processes 1002 and 1003 remove or reduce a temporal redundancy between adjacent frames are known from the conventional image coding techniques. Further, the run length Huffman VLC coding or other entropy coding processes 1006 executed after the DCT transform process 1004 and the quantizing process 1005 removes statistical redundancy between quantized DCT transform coefficients. However, the process is executed only on the blocks within an image.

A digital image has a spatially great redundancy as an inherent characteristic. This redundancy exists not only in the blocks inside a frame but also between blocks over blocks. However, the fact that no actual method uses a process for removing the redundancy between blocks of an image is apparent from the above description.

According to the existing image coding method, the DCT transform process 1004 or another transform process is executed on the block basis due to restrictive conditions in terms of hardware formation and calculation.

Although the spatial redundancy is reduced through the block-based transform process, it is restricted to the inside of one block. The redundancy between adjacent two blocks is not satisfactorily considered. The redundancy, however, can be further reduced when the intra-frame coding which consistently consumes a great number of bits.

Furthermore, the fact that the block-based DCT transform process removes or reduces the spatial redundancy inside the target block to be processed and the fact that the motion predicting and compensating processes remove or reduce the temporal redundancy between adjacent two frames are known from the existing image coding techniques. A zigzag scan and the run length Huffman VLC coding or another entropy coding process, which are executed after the DCT transform process and the quantizing process, remove the statistical redundancy in quantized DCT transform coefficients, however, they are still restricted to the inside of one block.

A digital image inherently includes a great spatial redundancy. This redundancy exists not only inside a block but also between blocks over blocks of an image. There is no existing method uses the process for removing the redundancy between blocks of one image at all except for the DC coefficient prediction of JPEG, MPEG1 and MPEG2.

According to MPEG1 and MPEG2, the DC coefficient prediction is executed by subtracting the DC value of the preceding coded block from the currently coded block. This is a simple predicting method which does not have an adaptiveness or mode switching when the prediction is inappropriate. Further, it merely includes DC coefficients.

According to the current state of the concerned technical field, the zigzag scan is used for all blocks prior to the run length coding. No attempt at making scan adaptive on the basis of the data of the contents of the block has been made.

FIG. 22 is a block diagram showing a construction of a prior art image predictive coding apparatus. In FIG. 22, the prior art image predictive coding apparatus is provided with a block sampling unit 2001, a DCT transform unit 2003, a quantizing unit 2004, a zigzag scan unit 2005 and an entropy coding unit 2006. In this specification, the term "unit" device a circuit device.

According to the intra-frame coding (i.e., coding inside a frame), an inputted image signal is subjected to a block sampling process 2001 and thereafter subjected directly to a DCT transform process 2003. Then, a quantizing process 2004, a zigzag scan process 2005 and an entropy coding process 2006 are sequentially executed. On the other hand, according to the inter-frame coding (i.e., coding between frames, i.e., prediction frame coding), a motion detecting and compensating process is executed in a unit 2011 after the block sampling process 2001, and then a prediction error is obtained from an adder 2002 by subtracting a detection value obtained from the unit 2011 from the image data obtained from the block sampling 2001. Further, this prediction error is subjected to the DCT transform process 2003 and then to the quantizing process 2004, zigzag scan process 2005 and entropy coding process 2006 similar to the intra-frame coding.

In a local decoder provided in the image predictive coding apparatus shown in FIG. 22, an inverse quantizing process and an inverse DCT transform process are executed in units 2007 and 2008. According to the inter/frame coding, a prediction value obtained through motion detection and compensation is added by an adder 2009 to the prediction error reconstructed by the units 2007 and 2008, and the addition value device locally decoded image data. The decoded image data is stored into a frame memory 2010 of the local decoder. Finally, a bit stream is outputted from the entropy coding unit 2010 and transmitted to the image predictive decoding apparatus of the other party.

FIG. 23 is a block diagram showing a construction of a prior art image predictive decoding apparatus. The bit stream is decoded by a variable length decoder (VLD: Variable Length Decoding) unit (or an entropy decoding unit) 2021, and the decoded image data is then subjected to an inverse quantizing process and an inverse DCT transform process in units 2023 and 2024. According to the inter-frame coding, a prediction value which is obtained through motion detection and compensation and formed by a unit 2027 is added by an adder 2025 to the prediction error reconstructed, thereby forming locally decoded image data. The locally decoded image data is stored into a frame memory 1026 of the local decoder.

According to the existing image coding techniques, the DCT transform process or other transform process is executed on the block basis due to the restrictive conditions in terms of hardware formation and calculation. The spatial redundancy will be reduced through the block-based transform. However, it is restricted to the inside of a block. The redundancy between adjacent blocks is not satisfactorily considered. In particular, the intra-frame coding which consistently consumes a great amount of bits is not satisfactorily considered.

SUMMARY OF THE INVENTION

A first object of the present invention is to provide an image predictive coding apparatus and method as well as image predictive decoding apparatus and method capable of simply generating prediction image data of the spatial region at high speed with high accuracy.

A second object of the present invention is to provide an image predictive coding apparatus and method as well as image predictive decoding apparatus and method capable of removing the redundancy in a block further than in the prior art image predictive coding apparatus and image predictive decoding apparatus and more efficiently coding or decoding image data.

Further, a third object of the present invention is to provide an image predictive coding apparatus and method as well as image predictive decoding apparatus and method capable of improving the efficiency of an entropy coding process by solving the problem that important transform coefficients are concentrated on different regions of a block depending on the internal properties of image data and by determining the correct scan method for the block.

Furthermore, a fourth object of the present invention is to provide a recording medium in which the steps of the image predictive coding method or the image predictive decoding method are recorded.

According to the first aspect of the present invention, there is provided an image predictive coding apparatus comprising:

dividing device operable to divide inputted image data to be coded into image data of a plurality of small regions which are adjacent to one another;

first generating device operable, when code the image data of a target small region to be processed among the image data of the plurality of small regions which are divided by the dividing device and adjacent to one another, to use image data of a reconstructed small region adjacent to the image data of the target small region to be processed as image data of an intra-frame prediction small region of the target small region to be processed, to use the image data of the intra-frame prediction small region as image data of an optimum prediction small region and to generate image data of a difference small region which are differences between the image data of the objective small region to be processed and the image data of the optimum prediction small region;

coding device operable to code the image data of the difference small region generated by the generating device;

decoding device operable to decode the image data of the difference small region coded by the coding device; and second generating device operable to generate image data of a reproduced reproduction small region by adding the image data of the difference small region decoded by the decoding device to the image data of the optimum prediction small region.

Also, according to the second aspect of the present invention, there is provided an image predictive coding apparatus comprising:

dividing device operable to divide inputted image data to be coded into image data of a plurality of small regions which are adjacent to one another;

first generating device operable, when coding an objective small region to be processed among a plurality of small regions which are divided by the dividing device and adjacent to one another, to use only significant image data indicated by an inputted significance signal representing whether or not the coded image data is significant as image data of an intra-frame prediction small region of the objective small region to be processed among image data of a reproduced reproduction small region adjacent to the image data of the objective small region to be processed, to use the image data of the intra-frame prediction small region as image data of an optimum prediction small region and to generate image data of a difference small region which are differences between the image data of the objective small region to be processed and the image data of the optimum prediction small region;

coding device operable to code the image data of the difference small region generated by the first generating device;

decoding device operable to decode the image data of the difference small region coded by the coding device; and second generating device operable to generate image data of a reproduced reproduction small region by adding the image data of the difference small region decoded by the decoding device to the image data of the optimum prediction small region.

Further, according to the third aspect of the present invention, there is provided an image predictive decoding apparatus comprising:

analyzing device operable to analyze an inputted coded image data series and outputting an image difference signal;

decoding device operable to decode image data of a reproduction difference small region from the image difference signal outputted from the analyzing device;

a line memory for storing therein image data for generating image data of a predetermined intra-frame prediction small region;

generating device operable to execute a prediction signal generating process on the image data from the line memory to thereby use reconstructed image data adjacent to the image data of the reproduction difference small region as image data of an intra-frame prediction small region and outputting the image data of the intra-frame prediction small region as image data of an optimum prediction small region; and adding device operable to add the image data of the reproduction difference small region from the decoding device to the image data of the optimum prediction small region from the generating device, outputting image data for generating image data of an intra-frame prediction small region of the result of addition and storing the data into the line memory.

Still further, according to the fourth aspect of the present invention there is provided an image predictive decoding apparatus comprising:

analyzing device operable to analyze an inputted coded image data series and outputting an image difference signal, a motion vector signal and a control signal;

decoding device operable to decode the image difference signal outputted from the analyzing device into image data of a reproduction difference small region;

control device operable to output a switching signal for controlling motion compensating device and generating device to selectively operate based on the control signal outputted from the analyzing device;

a frame memory for storing therein predetermined reproduction image data;

a line memory for storing therein image data for generating image data of a predetermined intra-frame prediction small region;

motion compensating device operable to execute a motion compensating process on an inputted motion vector signal in response to the switching signal from the control device to thereby generate image data of a time prediction small region from the frame memory and outputting the data as image data of an optimum prediction small region;

generating device operable to execute a prediction signal generating process on the image data from the line memory in response to the switching signal from the control device to thereby use reconstructed image data adjacent to the image data of the reproduction difference small region as image data of an intra-frame prediction small region and outputting the image data of the intra-frame prediction small region as image data of an optimum prediction small region; and adding device operable to add the image data of the reproduction difference small region from the decoding device to the image data of the optimum prediction small region from the generating device to thereby output reproduction image data of the result of addition, storing the reproduction image data into the frame memory and storing only the image data for generating the image data of the intra-frame prediction small region into the line memory.

Also, according to the fifth aspect of the present invention, there is provided an image predictive decoding apparatus comprising:

analyzing device operable to analyze an inputted coded image data series and outputting a compressed shape signal and an image difference signal;

first decoding device operable to decode the compressed shape signal outputted from the analyzing device into a reproduction shape signal;

second decoding device operable to decode the image difference signal outputted from the analyzing device into image data of a reproduction difference small region;

a line memory for storing therein image data for generating image data of a predetermined intra-frame prediction small region;

generating device operable to execute a prediction signal process on the image data from the line memory to thereby use only significant image data expressed by the reproduction shape signal as image data of an intra-frame prediction small region among the reconstructed image data adjacent to the image data of the reproduction difference small region and outputting the image data of the intra-frame prediction small region as image data of an optimum prediction small region; and adding device operable to add the image data of the reproduction difference small region from the second decoding device to the image data of the optimum prediction small region from the generating device to thereby output image data of the result of addition and storing only image data for generating the image data of the intra-frame prediction small region into said line memory.

Further, according to the sixth aspect of the present invention, there is provided an image predictive decoding apparatus comprising:

analyzing device operable to analyze an inputted coded image data series and outputting a compressed shape signal, an image difference signal, a motion vector signal and a control signal;

first decoding device operable to decode the compressed shape signal outputted from the analyzing device into a reproduction shape signal;

second decoding device operable to decode the image difference signal outputted from the analyzing device into image data of a reproduction difference small region;

control device operable to output a switching signal for controlling the motion compensating device and generating device to selectively operate based on the control signal outputted from the analyzing device;

a frame memory for storing therein predetermined reproduction image data;

a line memory for storing therein image data for generating image data of a predetermined intra-frame prediction small region;

motion compensating device operable to execute a motion compensating process on the reproduction image data from the frame memory based on the motion vector signal outputted from the analyzing device in response to the switching signal outputted from the control device to thereby generate image data of a time prediction small region and outputting the data as image data of an optimum prediction small region;

generating device operable to execute a prediction signal process on the image data from the line memory in response to the switching signal outputted from the control device to hereby use only significant image data expressed by the reproduction shape signal among the reconstructed image data adjacent to the image data of the reproduction difference small region as the image data of the intra-frame prediction small region and outputting the image data of the intra-frame prediction small region as image data of an optimum prediction small region; and adding device operable to add the image data of the reproduction difference small region from the second decoding device to the image data of the optimum prediction small region from the generating device to thereby output reproduction image data of the result of addition, storing the reproduction image data into the frame memory and storing only image data for generating the image data of the intra-frame prediction small region into the line memory.

According to the seventh aspect of the present invention, there is provided an image predictive coding apparatus comprising:

sampling device operable to sample an inputted image signal into image data of a plurality of blocks each including pixel values of a two-dimensional array;

transforming device operable to transform the image data of the blocks sampled by the sampling device into coefficient data of a predetermined transform domain;

a block memory for storing therein coefficient data of a restored block;

predicting device operable to form coefficient data of a plurality of prediction blocks for the coefficient data of the block transformed by the transforming device based on the coefficient data of a block which has been previously reconstructed and stored in the block memory;

determining device operable to determine, select and output the coefficient data of a most efficient prediction block among the coefficient data of the plurality of prediction blocks formed by the predicting device and transmitting an identifier indicating the selected prediction block in an indication bit form to an image predictive decoding apparatus;

first adding device operable to subtract the coefficient data of the prediction block selected by the determining device from the coefficient data of the current block at the present timing, thereby outputting coefficient data of a prediction error of the result of subtraction;

quantizing device operable to quantize the coefficient data of the prediction error outputted from the first adding device;

coding device operable to code in an entropy coding manner the coefficient data of the prediction error from the quantizing device and transmit the coded coefficient data of the prediction error to the image predictive decoding apparatus;

inverse quantizing device operable to inverse quantize the coefficient data of the prediction error from the quantizing device and output the coefficient data of the restored block;

second adding device operable to add the coefficient data of the prediction block outputted from the determining device to the coefficient data of the prediction error outputted from the inverse quantizing device to thereby output coefficient data of the restored block and storing the data into the block memory; and inverse transforming device operable to inverse transform the coefficient data of the block outputted from the second adding device, thereby generating image data of the restored block.

Also, according to the eighth aspect of the present invention, there is provided an image predictive coding apparatus comprising:

sampling device operable to sample an inputted image signal into image data of a plurality of blocks each including pixel values of a two-dimensional array;

transforming device operable to transform the image data of the plurality of blocks sampled by the sampling device into coefficient data of a predetermined transform domain;

quantizing device operable to quantize the coefficient data of the transform domain from the transforming device;

a block memory for storing therein coefficient data of a restored block;

predicting device operable to form coefficient data of a plurality of prediction blocks for the coefficient data of the block transformed by the transforming device based on the coefficient data of a block which has been previously reconstructed and stored in the block memory;

determining device operable to determine, select and output the coefficient data of a most efficient prediction block among the coefficient data of the plurality of prediction blocks formed by the predicting device and transmit an identifier indicating the selected prediction block in an indication bit form to an image predictive decoding apparatus;

first adding device operable to subtract the coefficient data of the prediction block selected by the determining device from the coefficient data of the current block at the present timing, thereby outputting coefficient data of a prediction error of the result of subtraction;

coding device operable to code in an entropy coding manner the coefficient data of the prediction error from the first adding device and transmitting the coded coefficient data of the prediction error to the image predictive decoding apparatus;

second adding device operable to add the coefficient data of the prediction error from the first adding device to the coefficient data of the prediction block outputted from the determining device to thereby restore and output the quantized coefficient data of the current block and storing the data into the block memory;

inverse quantizing device operable to inverse quantize the coefficient data of the current block outputted from the second adding device and outputting the resulting data; and inverse transforming device operable to inverse transform the coefficient data of the current block from the inverse quantizing device, thereby generating image data of the restored block.

Further, according to the ninth aspect of the present invention, there is provided an image predictive coding apparatus comprising:

sampling device operable to sample an inputted image signal into image data of a plurality of blocks each including pixel values of a two-dimensional array;

compensating device operable to execute a motion compensating process on the image data of an inputted block, thereby generating and outputting image data of a prediction error of a motion-compensated block;

first adding device operable to subtract the image data of the prediction error of the block outputted from the compensating device from the image data of the block outputted from the sampling device, thereby outputting image data of the block of the result of subtraction;

transforming device operable to transform the image data of the block outputted from the first adding device into coefficient data of a predetermined transform domain;

a block memory for storing therein coefficient data of a restored block;

predicting device operable to form coefficient data of a plurality of prediction blocks for the coefficient data of the block transformed by the transforming device based on the coefficient data of the block which has been previously reconstructed and stored in the block memory;

determining device operable to determine, select and output the coefficient data of a most efficient prediction block among the coefficient data of the plurality of prediction blocks formed by the predicting device and transmitting an identifier indicating the selected prediction block in an indication bit form to an image predictive decoding apparatus;

second adding device operable to subtract the coefficient data of the prediction block selected by the determining device from the coefficient data of the current block at the present timing, thereby outputting coefficient data of the prediction error of the result of subtraction;

quantizing device operable to quantize the coefficient data of the prediction error outputted from the second adding device;

coding device operable to code in an entropy coding manner the coefficient data of the prediction error from the quantizing device and transmitting the coded coefficient data of the prediction error to the image predictive decoding apparatus;

inverse quantizing device operable to inverse quantize the coefficient data of the prediction error from the quantizing device and output the coefficient data of the restored block;

third adding device operable to add the coefficient data of the prediction block outputted from the determining device to the coefficient data of the prediction error outputted from the inverse quantizing device to thereby output the coefficient data of the restored block and storing the data into the block memory;

inverse transforming device operable to inverse transform the coefficient data of the block outputted from the third adding device, thereby generating image data of the restored block; and fourth adding device operable to add the image data of the prediction error of the motion-compensated block outputted from the motion compensating device to the image data of the restored block from the inverse transforming device, thereby outputting the image data of the restored block to the compensating device.

Still further, according to the tenth aspect of the present invention, there is provided an image predictive coding apparatus comprising:

sampling device operable to sample an inputted image signal into image data of a plurality of blocks each including pixel values of a two-dimensional array;

compensating device operable to execute a motion compensating process on the image data of an inputted block, thereby generating and outputting image data of a prediction error of a motion-compensated block;

first adding device operable to subtract the image data of the prediction error of the block outputted from the compensating device from the image data of the block outputted from the sampling device, thereby outputting image data of the block of the result of subtraction;

transforming device operable to transform the image data of the block outputted from the first adding device into coefficient data of a predetermined transform domain;

quantizing device operable to quantize the coefficient data of the transform domain from said transforming device;

a block memory for storing therein coefficient data of a restored block;

predicting device operable to form coefficient data of a plurality of prediction blocks for the coefficient data of the block transformed by the transforming device based on the coefficient data of the block which has been previously reconstructed and stored in the block memory;

determining device operable to determine, select and output the coefficient data of a most efficient prediction block among the coefficient data of the plurality of prediction blocks formed by the predicting device and transmitting an identifier indicating the selected prediction block in an indication bit form to an image predictive decoding apparatus;

second adding device operable to subtract the coefficient data of the prediction block selected by the determining device from the coefficient data of the current block at the present timing, thereby outputting coefficient data of the prediction error of the result of subtraction;

coding device operable to code in an entropy coding manner the coefficient data of the prediction error from the second adding device and transmitting the coded coefficient data of the prediction error to the image predictive decoding apparatus;

third adding device operable to add the coefficient data of the prediction error from the second adding device to the coefficient data of the prediction block outputted from the determining device to thereby restore and output the coefficient data of the quantized current block and storing the data into the block memory;

inverse quantizing device operable to inverse quantize the coefficient data of the current block outputted from the third adding device and output the resulting data;

inverse transforming device operable to inverse transform the coefficient data of the current block from the inverse quantizing device, thereby generating image data of the restored block; and fourth adding device operable to add the image data of the prediction error of the motion-compensated block outputted from the motion compensating device to the image data of the restored block from the inverse transforming device, thereby outputting the image data of the restored block to the compensating device.

According to the eleventh aspect of the present invention, there is provided an image predictive decoding apparatus provided in correspondence with the image predictive coding apparatus of the seventh aspect of the present invention, comprising:

extracting device operable to extract the indication bit from received data received from the image predictive coding apparatus;

a block memory for storing therein coefficient data of the restored block;

further predicting device operable to generate and output coefficient data of a prediction block for the coefficient data of the current block at the present timing included in the received data by device of the coefficient data of the block which has been previously restored and stored in the block memory based on the prediction block indicated by the indication bit extracted by said extracting device;

decoding device operable to decode the received data in an entropy decoding manner and outputting the decoded coefficient data of the prediction error;

inverse quantizing device operable to inverse quantize the coefficient data of the prediction error outputted from the decoding device and outputting the resulting data;

third adding device operable to add the coefficient data of the prediction block outputted from the further predicting device to the coefficient data of the prediction error outputted from the inverse quantizing device to thereby restore and output the coefficient data of the current block at the present timing and storing the data into the block memory; and further inverse transforming device operable to inverse transform the coefficient data of the current block outputted from the third adding device and outputting the image data of the restored current block.

Also, according to the twelfth aspect of the present invention, there is provided an image predictive decoding apparatus provided in correspondence with the image predictive coding apparatus of the eighth aspect of the present invention, comprising:

extracting device operable to extract the indication bit from received data received from the image predictive coding apparatus;

a block memory for storing therein coefficient data of the restored block;

further predicting device operable to generate and output coefficient data of a prediction block for the coefficient data of the current block at the present timing included in the received data by device of the coefficient data of the block which has been previously restored and stored in the block memory based on the prediction block indicated by the indication bit extracted by the extracting device;

decoding device operable to decode the received data in an entropy decoding manner and outputting the decoded coefficient data of the prediction error;

third adding device operable to add the coefficient data of the prediction block outputted from the predicting device to the coefficient data of the prediction error outputted from the decoding device to thereby restore and output the coefficient data of the current block at the present timing and storing the data into said block memory;

inverse quantizing device operable to inverse quantize the coefficient data of the prediction error outputted from the third adding device and outputting the resulting data; and further inverse transforming device operable to inverse transform the coefficient data of the current block outputted from the inverse quantizing device and output the image data of the restored current block.

Further, according to the thirteenth aspect of the present invention, there is provided an image predictive decoding apparatus provided in correspondence with the image predictive coding apparatus of the ninth aspect of the present invention, comprising:

extracting device operable to extract the indication bit from received data received from the image predictive coding apparatus;

a block memory for storing therein coefficient data of the restored block;

further predicting device operable to generate and output coefficient data of a prediction block for the coefficient data of the current block at the present timing included in the received data by device of the coefficient data of the block which has been previously restored and stored in the block memory based on the prediction block indicated by the indication bit extracted by the extracting device;

decoding device operable to decode the received data in an entropy decoding manner and outputting the decoded coefficient data of the prediction error;

inverse quantizing device operable to inverse quantize the coefficient data of the prediction error outputted from said decoding device and output the resulting data;

third adding device operable to add the coefficient data of the prediction block outputted from the further predicting device to the coefficient data of the prediction error outputted from the inverse quantizing device to thereby restore and output the coefficient data of the current block at the present timing and storing the data into the block memory;

further inverse transforming device operable to inverse transform the coefficient data of the current block outputted from the third adding device and output the image data of the restored current block;

further compensating device operable to execute a motion compensating process on the image data of the current block outputted from the further inverse transforming device, thereby outputting motion-compensated prediction error data; and fifth adding device operable to subtract the motion-compensated prediction error data outputted from the further compensating device from the image data of the current block outputted from the further inverse transforming device, thereby outputting the image data of the restored block of the result of subtraction.

Still further, according to the fourteenth aspect of the present invention, there is provided an image predictive decoding apparatus provided in correspondence with the image predictive coding apparatus of the tenth aspect of the present invention, comprising:

extracting device operable to extract the indication bit from received data received from the image predictive coding apparatus;

a block memory for storing therein coefficient data of the restored block;

further predicting device operable to generate and output coefficient data of a prediction block for the coefficient data of the current block at the present timing included in the received data by device of the coefficient data of the block which has been previously restored and stored in the block memory based on the prediction block indicated by the indication bit extracted by the extracting device;

decoding device operable to decode the received data in an entropy decoding manner and outputting the decoded coefficient data of the prediction error;

third adding device operable to add the coefficient data of the prediction block outputted from the predicting device to the coefficient data of the prediction error outputted from the decoding device to thereby restore and output the coefficient data of the current block at the present timing and storing the data into the block memory;

inverse quantizing device operable to inverse quantize the coefficient data of the prediction error outputted from the third adding device and output the resulting data;

further inverse transforming device operable to inverse transform the coefficient data of the current block outputted from the inverse quantizing device and output the image data of the restored current block;

further compensating device operable to execute a motion compensating process on the image data of the current block outputted from the further inverse transforming device, thereby outputting motion-compensated prediction error data; and fifth adding device operable to subtract the motion-compensated prediction error data outputted from the further compensating device from the image data of the current block outputted from the further inverse transforming device, thereby outputting the image data of the restored block of the result of subtraction.

According to the fifteenth aspect of the present invention, there is provided an image predictive coding apparatus comprising:

sampling device operable to sample an inputted image signal into image data of a plurality of blocks each including pixel values of a two-dimensional array;

transforming device operable to transform the image data of the blocks sampled by the sampling device into coefficient data of a predetermined transform domain;

a block memory for storing therein coefficient data of a restored block;

predicting device operable to form coefficient data of a plurality of prediction blocks for the coefficient data of the block transformed by the transforming device based on the coefficient data of a block which has been previously reconstructed and stored in the block memory;

determining device operable to determine, select and output the coefficient data and scan method of a most efficient prediction block among the coefficient data of the plurality of prediction blocks formed by the predicting device and transmitting an identifier indicating the selected prediction block and scan method in an indication bit form to an image predictive decoding apparatus;

first adding device operable to subtract the coefficient data of the prediction block selected by the determining device from the coefficient data of the current block at the present timing, thereby outputting coefficient data of a prediction error of the result of subtraction;

quantizing device operable to quantize the coefficient data of the prediction error outputted from the first adding device;

scanning device operable to execute a scan process on the coefficient data of the prediction error from the quantizing device according to the scan method determined by the determining device and outputting the coefficient data of the prediction error obtained after the scan process;

coding device operable to code in an entropy coding manner the coefficient data of the prediction error obtained after the scan process outputted from the scanning device and transmit the coded coefficient data of the prediction error to the image predictive decoding apparatus;

inverse quantizing device operable to inverse quantize the coefficient data of the prediction error from the quantizing device and output the coefficient data of the restored block;

second adding device operable to add the coefficient data of the prediction block outputted from the determining device to the coefficient data of the prediction error outputted from the inverse quantizing device to thereby output coefficient data of the restored block and storing the data into the block memory; and inverse transforming device operable to inverse transform the coefficient data of the block outputted from the second adding device, thereby generating image data of the restored block.

Also, according to the sixteenth aspect of the present invention, there is provided an image predictive coding apparatus comprising:

sampling device operable to sample an inputted image signal into image data of a plurality of blocks each including pixel values of a two-dimensional array;

transforming device operable to transform the image data of the plurality of blocks sampled by the sampling device into coefficient data of a predetermined transform domain;

quantizing device operable to quantize the coefficient data of the transform domain from the transforming device;

a block memory for storing therein coefficient data of a restored block;

predicting device operable to form coefficient data of a plurality of prediction blocks for the coefficient data of the block transformed by the transforming device based on the coefficient data of a block which has been previously reconstructed and stored in the block memory;

determining device operable to determine, select and output the coefficient data and scan method of a most efficient prediction block among the coefficient data of the plurality of prediction blocks formed by the predicting device and transmit an identifier indicating said selected prediction block and scan method in an indication bit form to an image predictive decoding apparatus;

first adding device operable to subtract the coefficient data of the prediction block selected by the determining device from the coefficient data of the current block at the present timing, thereby outputting coefficient data of a prediction error of the result of subtraction;

scanning device operable to execute a scan process on the coefficient data of the prediction error from the first adding device according to the scan method determined by the determining device and outputting the coefficient data of the prediction error obtained after the scan process;

coding device operable to code in an entropy coding manner the coefficient data of the prediction error obtained after the scan process outputted from the scanning device and transmitting the coded coefficient data of the prediction error to the image predictive decoding apparatus;

second adding device operable to add the coefficient data of the prediction error from the first adding device to the coefficient data of the prediction block outputted from the determining device to thereby restore and output the quantized coefficient data of the current block and storing the data into said block memory;

inverse quantizing device operable to inverse quantize the coefficient data of the current block outputted from the second adding device and output the resulting data; and inverse transforming device operable to inverse transform the coefficient data of the current block from the inverse quantizing device, thereby generating image data of the restored block.

Further, according to the seventeenth aspect of the present invention, there is provided an image predictive coding apparatus comprising:

sampling device operable to sample an inputted image signal into image data of a plurality of blocks each including pixel values of a two-dimensional array;

compensating device operable to execute a motion compensating process on the image data of an inputted block, thereby generating and outputting image data of a prediction error of a motion-compensated block;

first adding device operable to subtract the image data of the prediction error of the block outputted from the compensating device from the image data of the block outputted from the sampling device, thereby outputting image data of the block of the result of subtraction;

transforming device operable to transform the image data of the block outputted from the first adding device into coefficient data of a predetermined transform domain;

a block memory for storing therein coefficient data of a restored block;

predicting device operable to form coefficient data of a plurality of prediction blocks for the coefficient data of the block transformed by the transforming device based on the coefficient data of the block which has been previously reconstructed and stored in the block memory;

determining device operable to determine, select and output the coefficient data and scan method of a most efficient prediction block among the coefficient data of the plurality of prediction blocks formed by the predicting device and transmit an identifier indicating the selected prediction block and scan method in an indication bit form to an image predictive decoding apparatus;

second adding device operable to subtract the coefficient data of the prediction block selected by the determining device from the coefficient data of the current block at the present timing, thereby outputting coefficient data of the prediction error of the result of subtraction;

quantizing device operable to quantize the coefficient data of the prediction error outputted from the second adding device;

scanning device operable to execute a scan process on the coefficient data of the prediction error from the quantizing device according to the scan method determined by the determining device and outputting the coefficient data of the prediction error obtained after the scan process;

coding device operable to code in an entropy coding manner the coefficient data of the prediction error obtained after the scan process outputted from the scanning device and transmitting the coded coefficient data of the prediction error to the image predictive decoding apparatus;

inverse quantizing device operable to inverse quantize the coefficient data of the prediction error from the quantizing device and outputting the coefficient data of the restored block;

third adding device operable to add the coefficient data of the prediction block outputted from the determining device to the coefficient data of the prediction error outputted from the inverse quantizing device to thereby output the coefficient data of the restored block and storing the data into the block memory;

inverse transforming device operable to inverse transform the coefficient data of the block outputted from the third adding device, thereby generating image data of the restored block; and fourth adding device operable to add the image data of the prediction error of the motion-compensated block outputted from the motion compensating device to the image data of the restored block from the inverse transforming device, thereby outputting the image data of the restored block to the compensating device.

Still further, according to the eighteenth aspect of the present invention, there is provided an image predictive coding apparatus comprising:

sampling device operable to sample an inputted image signal into image data of a plurality of blocks each including pixel values of a two-dimensional array;

compensating device operable to execute a motion compensating process on the image data of an inputted block, thereby generating and outputting image data of a prediction error of a motion-compensated block;

first adding device operable to subtract the image data of the prediction error of the block outputted from the compensating device from the image data of the block outputted from the sampling device, thereby outputting image data of the block of the result of subtraction;

transforming device operable to transform the image data of the block outputted from the first adding device into coefficient data of a predetermined transform domain;

quantizing device operable to quantize the coefficient data of the transform domain from the transforming device;

a block memory for storing therein coefficient data of a restored block;

predicting device operable to form coefficient data of a plurality of prediction blocks for the coefficient data of the block transformed by the transforming device based on the coefficient data of the block which has been previously reconstructed and stored in the block memory;

determining device operable to determine, select and output the coefficient data and scan method of a most efficient prediction block among the coefficient data of the plurality of prediction blocks formed by the predicting device and transmit an identifier indicating said selected prediction block and scan method in an indication bit form to an image predictive decoding apparatus;

second adding device operable to subtract the coefficient data of the prediction block selected by the determining device from the coefficient data of the current block at the present timing, thereby output coefficient data of the prediction error of the result of subtraction;

scanning device operable to execute a scan process on the coefficient data of the prediction error from the second adding device according to the scan method determined by the determining device and output the coefficient data of the prediction error obtained after the scan process;

coding device operable to code in an entropy coding manner the coefficient data of the prediction error obtained after the scan process outputted from the scanning device and transmitting the coded coefficient data of the prediction error to the image predictive decoding apparatus;

third adding device operable to add the coefficient data of the prediction error from the second adding device to the coefficient data of the prediction block outputted from the determining device to thereby restore and output the coefficient data of the quantized current block and storing the data into the block memory;

inverse quantizing device operable to inverse quantize the coefficient data of the current block outputted from the third adding device and output the resulting data;

inverse transforming device operable to inverse transform the coefficient data of the current block from the inverse quantizing device, thereby generating image data of the restored block; and fourth adding device operable to add the image data of the prediction error of the motion-compensated block outputted from the motion compensating device to the image data of the restored block from the inverse transforming device, thereby outputting the image data of the restored block to the compensating device.

According to the nineteenth aspect of the present invention, there is provided an image predictive decoding apparatus provided in correspondence with the image predictive coding apparatus of the fifteenth aspect of the present invention, comprising:

extracting device operable to extract the indication bit from received data received from the image predictive coding apparatus;

a block memory for storing therein coefficient data of the restored block;

further predicting device operable to generate and output coefficient data of a prediction block for the coefficient data of the current block at the present timing included in the received data by device of the coefficient data of the block which has been previously restored and stored in the block memory based on the prediction block indicated by the indication bit extracted by the extracting device;

decoding device operable to decode the received data in an entropy decoding manner and outputting the decoded coefficient data of the prediction error;

inverse scanning device operable to execute an inverse scan process on the coefficient data of the prediction error outputted from the decoding device based on the scan method indicated by the indication bit extracted by the extracting device and outputting the coefficient data of the prediction error obtained after the inverse scan process;

inverse quantizing device operable to inverse quantize the coefficient data of the prediction error obtained after the inverse scan process outputted from the scanning device and outputting the resulting data;

third adding device operable to add the coefficient data of the prediction block outputted from the further predicting device to the coefficient data of the prediction error outputted from the inverse quantizing device to thereby restore and output the coefficient data of the current block at the present timing and storing the data into the block memory; and further inverse transforming device operable to inverse transform the coefficient data of the current block outputted from the third adding device and outputting the image data of the restored current block.

Also, according to the twentieth aspect of the present invention, there is provided an image predictive decoding apparatus provided in correspondence with the image predictive coding apparatus of the sixteenth aspect of the present invention, comprising:

extracting device operable to extract the indication bit from received data received from the image predictive coding apparatus;

a block memory for storing therein coefficient data of the restored block;

further predicting device operable to generate and output coefficient data of a prediction block for the coefficient data of the current block at the present timing included in the received data by device of the coefficient data of the block which has been previously restored and stored in the block memory based on the prediction block indicated by the indication bit extracted by the extracting device;

decoding device operable to decode the received data in an entropy decoding manner and outputting the decoded coefficient data of the prediction error;

inverse scanning device operable to execute an inverse scan process on the coefficient data of the prediction error outputted from the decoding device based on the scan method indicated by the indication bit extracted by the extracting device and output the coefficient data of the prediction error obtained after the inverse scan process;

third adding device operable to add the coefficient data of the prediction block outputted from the predicting device to the coefficient data of the prediction error outputted from the inverse scanning device to thereby restore and output the coefficient data of the current block at the present timing and storing the data into the block memory;

inverse quantizing device operable to inverse quantize the coefficient data of the prediction error outputted from the third adding device and output the resulting data; and further inverse transforming device operable to inverse transform the coefficient data of the current block outputted from the inverse quantizing device and output the image data of the restored current block.

Further, according to the twenty-first aspect of the present invention, there is provided an image predictive decoding apparatus provided in correspondence with the image predictive coding apparatus of the seventeenth aspect of the present invention, comprising:

extracting device operable to extracte the indication bit from received data received from the image predictive coding apparatus;

a block memory for storing therein coefficient data of the restored block;

further predicting device operable to generate and output coefficient data of a prediction block for the coefficient data of the current block at the present timing included in the received data by device of the coefficient data of the block which has been previously restored and stored in the block memory based on the prediction block indicated by the indication bit extracted by the extracting device;

decoding device operable to decode the received data in an entropy decoding manner and outputting the decoded coefficient data of the prediction error;

inverse scanning device operable to execute an inverse scan process on the coefficient data of the prediction error outputted from the decoding device based on the scan method indicated by the indication bit extracted by the extracting device and outputting the coefficient data of the prediction error obtained after the inverse scan process;

inverse quantizing device operable to inverse quantize the coefficient data of the prediction error obtained after the inverse scan process outputted from the inverse scanning device and output the resulting data;

third adding device operable to add the coefficient data of the prediction block outputted from the further predicting device to the coefficient data of the prediction error outputted from the inverse quantizing device to thereby restore and output the coefficient data of the current block at the present timing and storing the data into the block memory;

further inverse transforming device operable to inverse transform the coefficient data of the current block outputted from the third adding device and output the image data of the restored current block;

further compensating device operable to execute a motion compensating process on the image data of the current block outputted from the further inverse transforming device, thereby outputting motion-compensated prediction error data; and fifth adding device operable to subtract the motion-compensated prediction error data outputted from the further compensating device from the image data of the current block outputted from the further inverse transforming device, thereby outputting the image data of the restored block of the result of subtraction.

Still further, according to the twenty-second aspect of the present invention, there is provided an image predictive decoding apparatus provided in correspondence with the image predictive coding apparatus of the eighteenth aspect of the present invention, comprising:

extracting device operable to extracte the indication bit from received data received from the image predictive coding apparatus;

a block memory for storing therein coefficient data of the restored block;

further predicting device operable to generate and output coefficient data of a prediction block for the coefficient data of the current block at the present timing included in the received data by device of the coefficient data of the block which has been previously restored and stored in the block memory based on the prediction block indicated by the indication bit extracted by the extracting device;

decoding device operable to decode the received data in an entropy decoding manner and outputting the decoded coefficient data of the prediction error;

inverse scanning device operable to execute an inverse scan process on the coefficient data of the prediction error outputted from the decoding device based on the scan method indicated by the indication bit extracted by the extracting device and output the coefficient data of the prediction error obtained after the inverse scan process;

third adding device operable to add the coefficient data of the prediction block outputted from the predicting device to the coefficient data of the prediction error outputted from the inverse scanning device to thereby restore and output the coefficient data of the current block at the present timing and storing the data into the block memory;

inverse quantizing device operable to inverse quantize the coefficient data of the prediction error outputted from the third adding device and output the resulting data;

further inverse transforming device operable to inverse transforming the coefficient data of the current block outputted from the inverse quantize device and output the image data of the restored current block;

further compensating device operable to execute a motion compensating process on the image data of the current block outputted from the further inverse transforming device, thereby outputting motion-compensated prediction error data; and fifth adding device operable to subtract the motion-compensated prediction error data outputted from the further compensating device from the image data of the current block outputted from the further inverse transforming device, thereby outputting the image data of the restored block of the result of subtraction.

Also, according to the twenty-third aspect of the present invention, there is provided an image predictive coding method including steps obtained by replacing the device of the above-mentioned image predictive coding apparatus.

Further, according to the twenty-fourth aspect of the present invention, there is provided an image predictive decoding method including steps obtained by replacing the device of the above-mentioned image predictive decoding apparatus.

Also, according to the twenty-fifth aspect of the present invention, there is provided a recording medium in which a program including the steps of the above-mentioned image predictive coding method.

Further, according to the twenty-sixth aspect of the present invention, there is provided a recording medium in which a program including the steps of the above-mentioned image predictive decoding method.

BRIEF DESCRIPTION OF THE DRAWINGS

FIG. 4 is a block diagram showing a construction of a first preferred embodiment of a prediction signal generator for use in the image predictive coding apparatus of FIG. 1;

FIG. 5 is a block diagram showing a construction of a second preferred embodiment of a prediction signal generator for use in the image predictive coding apparatus of FIG. 1;

FIG. 27 is a schematic view of an image for explaining a horizontal scan sequence to be used for a coefficient scan in the eighth preferred embodiment;

FIG. 28 is a schematic view of an image for explaining a vertical scan sequence to be used for the coefficient scan in the eighth preferred embodiment;

FIG. 29 is a schematic view of an image for explaining a zigzag scan sequence to be used for the coefficient scan in the eighth preferred embodiment;

BEST MODE FOR CARRYING OUT THE INVENTION

Preferred embodiments of the present invention will be described below with reference to the accompanying drawings.

First Preferred Embodiment Group

The first preferred embodiment group includes first through fourth preferred embodiments.

First Preferred Embodiment

Figure 1:
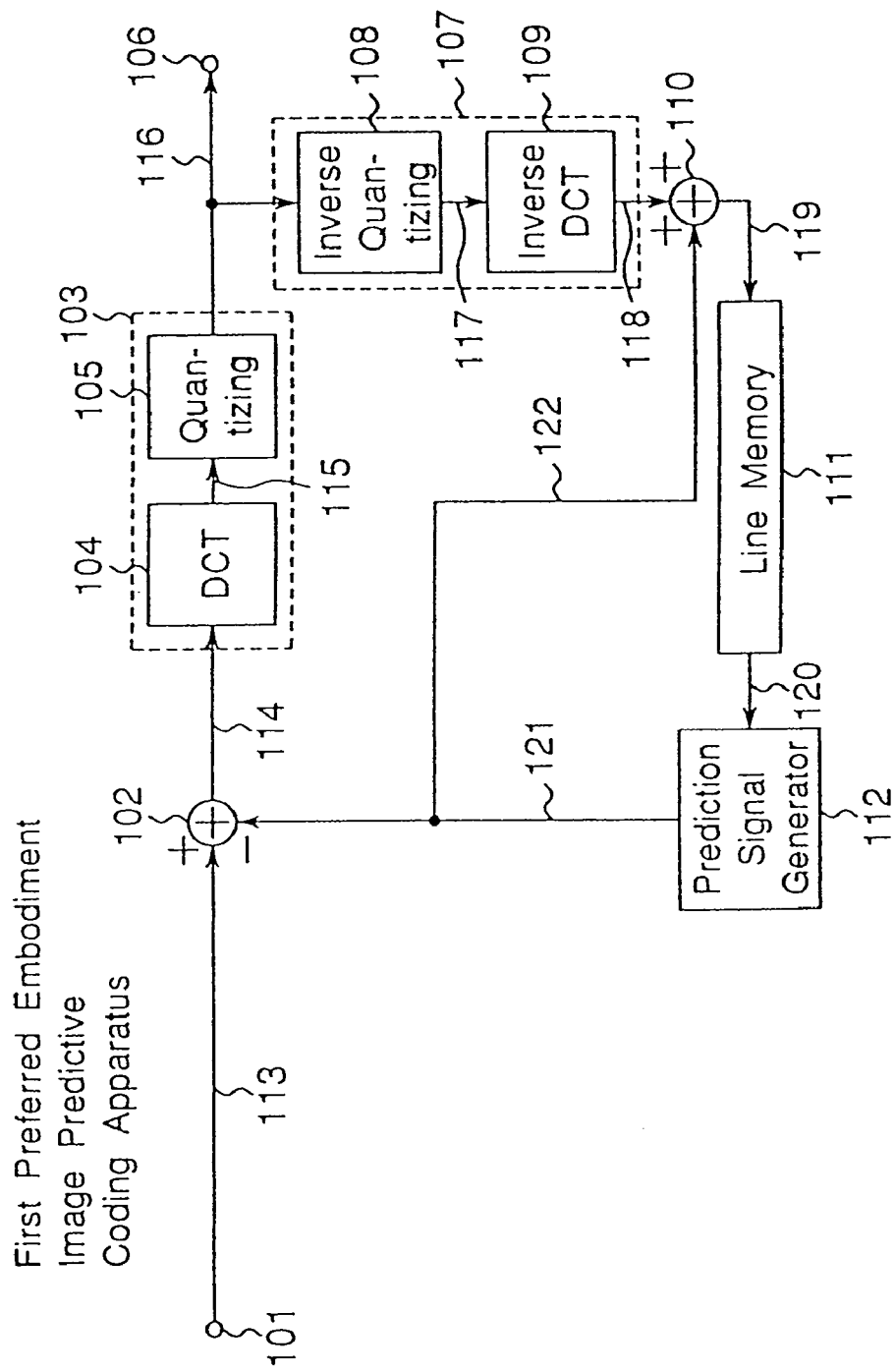
FIG. 1 is a block diagram showing a construction of an image predictive coding apparatus according to a first preferred embodiment of the present invention.

FIG. 1 is a block diagram showing a construction of an image predictive coding apparatus according to a first preferred embodiment of the present invention.

In FIG. 1 are shown an input terminal 101, a first adder 102, an encoder 103, an output terminal 106, a decoder 107, a second adder 110, a line memory 111 and a prediction signal generator 112.

The construction and operation of the image predictive coding apparatus will be described below. Objective image data to be subjected to a coding process is inputted to the input terminal 101. In this case, the inputted image data is divided into a plurality of adjacent small regions.

Figure 2:
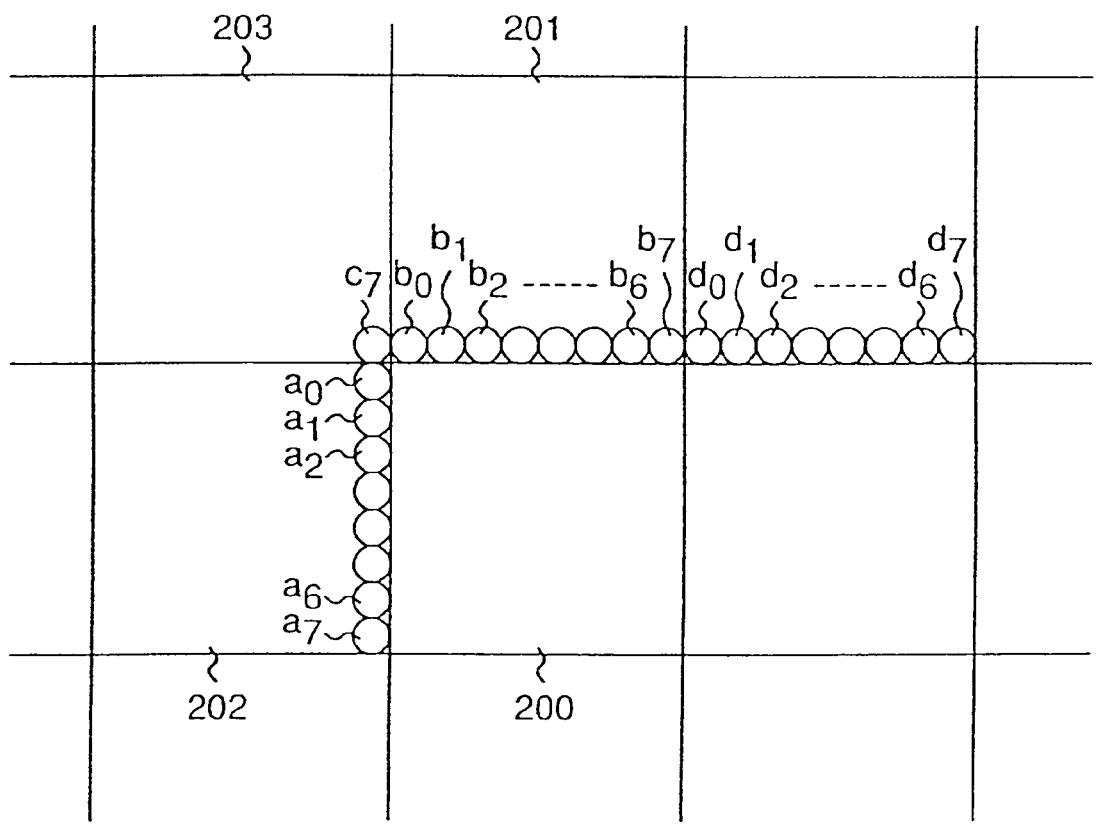
FIG. 2 is a schematic view in a case where an input image inputted to the image predictive coding apparatus of FIG. 1 is divided into 8×8 blocks.
Figure 3:
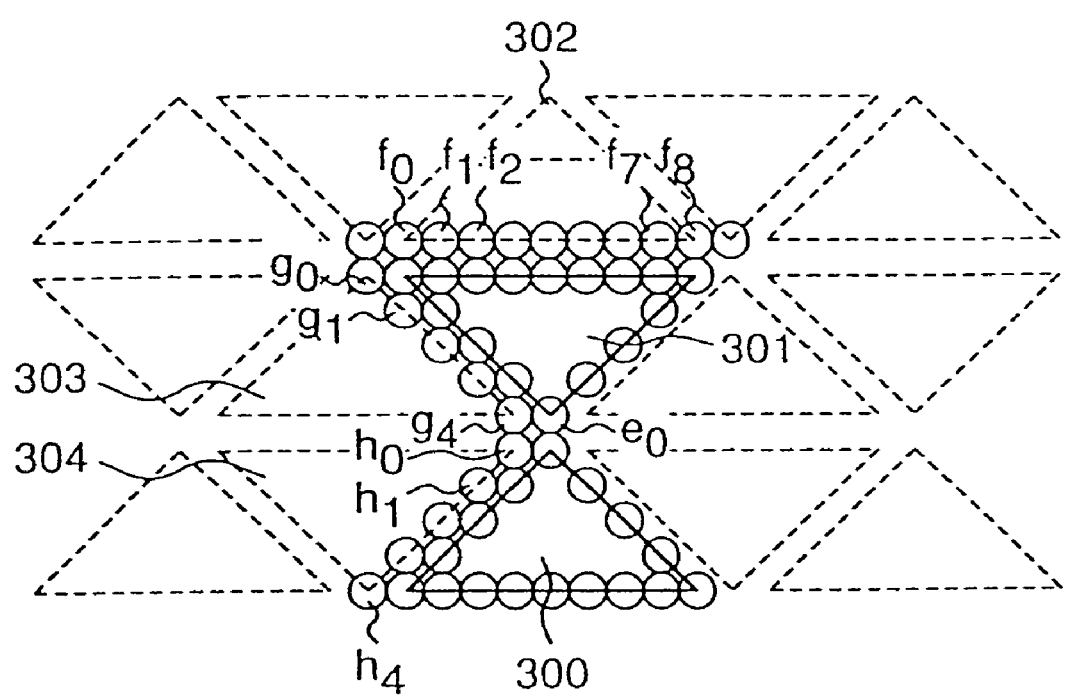
FIG. 3 is a schematic view in a case where an input image inputted to the image predictive coding apparatus of FIG. 1 is divided into triangular regions.

FIG. 2 shows the image of the inputted image data in a case where it is divided into small regions of 8×8 samples. FIG. 3 shows the image of the inputted image data in a case where it is divided into triangular small regions. The image data of the plurality of small regions are successively coded when the image data of the objective small region to be processed is inputted to the adder 102 via the input terminal 101 and a line 113. On the other hand, the prediction signal generator 112 generates image data of an intra-frame prediction small region and outputs the generated image data as image data of an optimum prediction small region to the adder 102 via a line 121.

The adder 102 subtracts the corresponding pixel value of the optimum prediction small region obtained from the prediction signal generator 112 from the pixel value of the inputted image data of the target small region to be processed, thereby generating image data of a difference small region of the subtraction result and outputting the image data to the encoder 103 for the execution of a compression coding process. In the present preferred embodiment, the encoder 103 is provided with a DCT transformer 104 and a quantizing unit (Q) 105, and the image data of the difference small domain is transformed into an image signal of a frequency region by the DCT transformer 104, so that DCT transform coefficients are obtained. Then, the DCT transform coefficients are quantized by the quantizing unit 105. The quantized DCT coefficients of the small region are outputted to the output terminal 106 via a line 116, further transformed into a string of a variable length or fixed length codes and thereafter stored into a recording medium such as an optical disk or transmitted via a communication line (not shown).

At the same time, the quantized DCT coefficients of the small region are inputted to the decoder 107. In this case, the decoder 107 is provided with an inverse quantizing unit 108 and a DCT transformer 109 and restores the inputted image data of the small region into image data of an expanded difference small region. In the present preferred embodiment, the inputted DCT coefficients of the small region are inverse quantized by the inverse quantizing unit 108, and thereafter the inverse quantized DCT coefficients are transformed into an image signal in spatial domain by an inverse discrete cosine transformer (referred to as an inverse DCT transformer hereinafter) 109. The thus-obtained image data of the expanded difference small region is outputted to the adder 110, and the adder 110 adds an optimum prediction image signal outputted from the prediction signal generator 112 via the line 121 and a line 122 to the image data of the expanded difference small region to thereby generate image data of a reconstructed small region and store the reconstructed pixel values from the image data of the reconstructed small region into the line memory 111 for generating intra-frame prediction image signal. The prediction signal generator 112 generates image data of the intra-frame prediction small region as follows. That is, the prediction signal generator 112 generates a pixel value of the reconstructed image data adjacent to the image data of the target small region to be processed as a pixel value of the image data of the intra-frame prediction small region.

In FIG. 2, assuming that a block 200 is the target small region to be processed, then the pixel values of the adjacent reconstructed image data are $a_0, a_1, a_2, \ldots, a_6, a_7, b_0, b_1, b_2, \ldots, b_6, b_7$. In FIG. 3, assuming that a triangle 301 is the target small region to be processed, then the pixel values of the adjacent reconstructed image data are $g_0, g_1, \ldots, g_4, f_0, f_1, f_2, \ldots, f_7, f_8$. Assuming that a triangle 300 shown in FIG. 3 is the objective small region to be processed, the pixel values of the adjacent reconstructed image data are $e_0, h_0, h_1, \ldots, h_4$. These pixel values are stored into the line memory 111. The prediction signal generator 112 makes access to the line memory 111 to read the pixel values of the adjacent image data as the pixel values of the image data of the intra-frame prediction small region.

FIG. 4 and FIG. 5 are block diagrams showing constructions of the prediction signal generator according to first and second preferred embodiments for use in the image predictive coding apparatus of FIG. 1.

In FIG. 4, the pixel values $a_0, a_1, a_2, \ldots, a_6, a_7$ which are adjacent to one another in a horizontal direction with respect to the target small region to be processed are inputted from the line memory 111 to the prediction signal generator 112, and a generator 401 inside the prediction signal generator 112 generates image data 403 of the intra-frame prediction small region by repetitively outputting an identical pixel, for example, eight times in the horizontal direction. In this case, the image data 403 of the intra-frame prediction small region is used in a case where no vertically adjacent pixel exists with respect to the objective small region to be processed.

In FIG. 5, the pixel values $b_0, b_1, b_2, \ldots, b_6, b_7$ which are adjacent to one another in a vertical direction with respect to the objective small region to be processed are inputted from the line memory 111 to the prediction signal generator 112, and a generator 402 inside the prediction signal generator 112 generates image data 404 of the intra-frame prediction small region by repetitively outputting a pixel, for example, eight times in the vertical direction. In this case, the image data 404 of the intra-frame prediction small region is used in a case where no horizontally adjacent pixel exists with respect to the objective small region to be processed. In a case where pixels which are adjacent both in the horizontal direction and the vertical direction exist, image data of the intra-frame prediction small region is generated as in a third preferred embodiment shown in FIG. 6.

Figure 6:
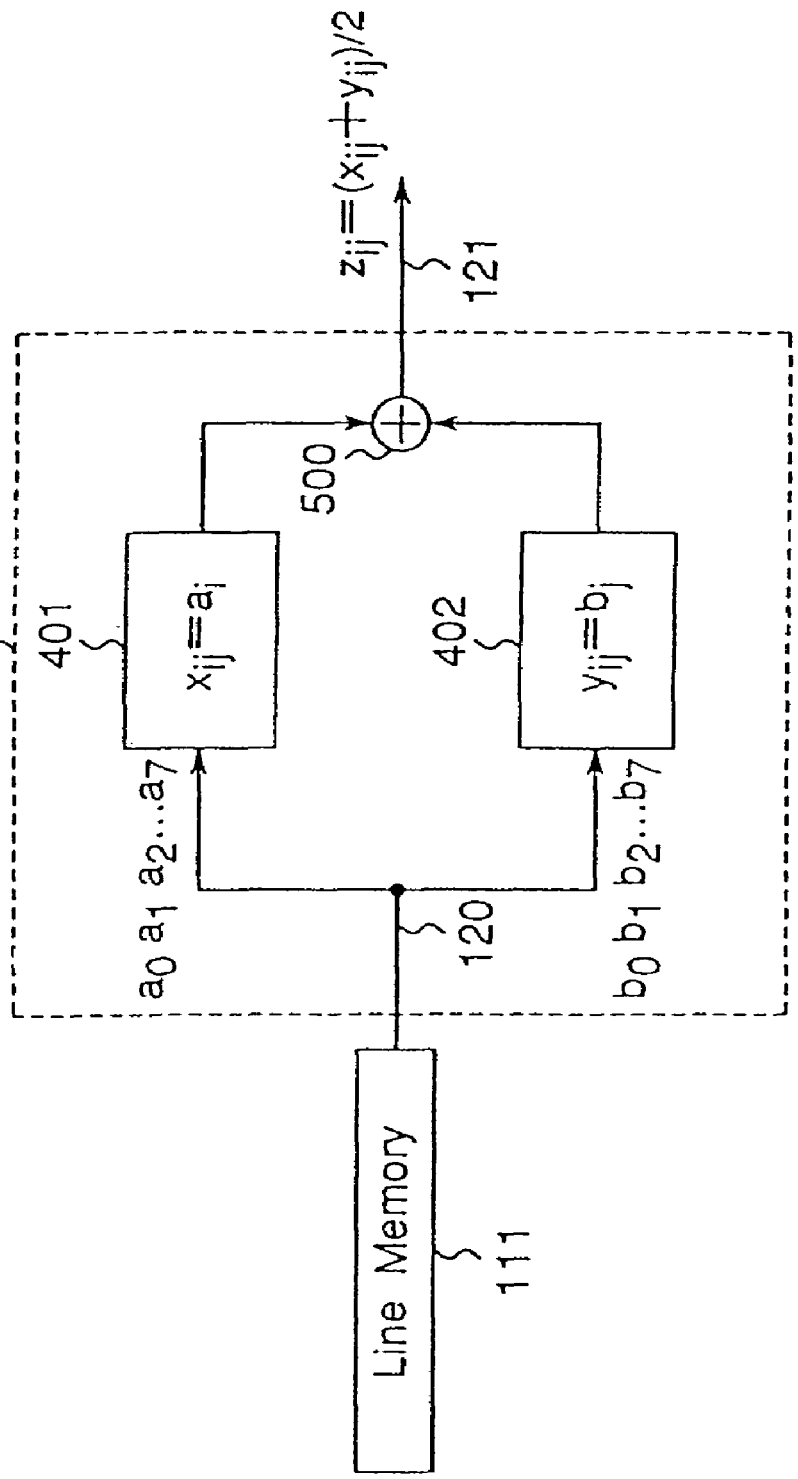
FIG. 6 is a block diagram showing a construction of a third preferred embodiment of a prediction signal generator for use in the image predictive coding apparatus of FIG. 1.

FIG. 6 is a block diagram showing a construction of the third preferred embodiment of the prediction signal generator for use in the image predictive coding apparatus of FIG. 1.

In FIG. 6, the image data 403 of the intra-frame prediction small region (See FIG. 5) generated by the generator 401 and the image data 404 of the intra-frame prediction small region generated by the generator 402 are inputted to an adder 500, and the adder 500 averages these two pieces of image data by dividing the sum of the inputted two pieces of image data by two. Thus, the adjacent reproduced pixels are repetitively outputted by the generators 401 and 402 and the averaging computation is merely executed by the adder 500, and therefore, the image data of the intra-frame prediction small region can be generated at high speed. It is acceptable to generate the image data of the intra-frame prediction small region by linearly interpolating the pixel values of adjacent two pieces of image data.

Figure 7:
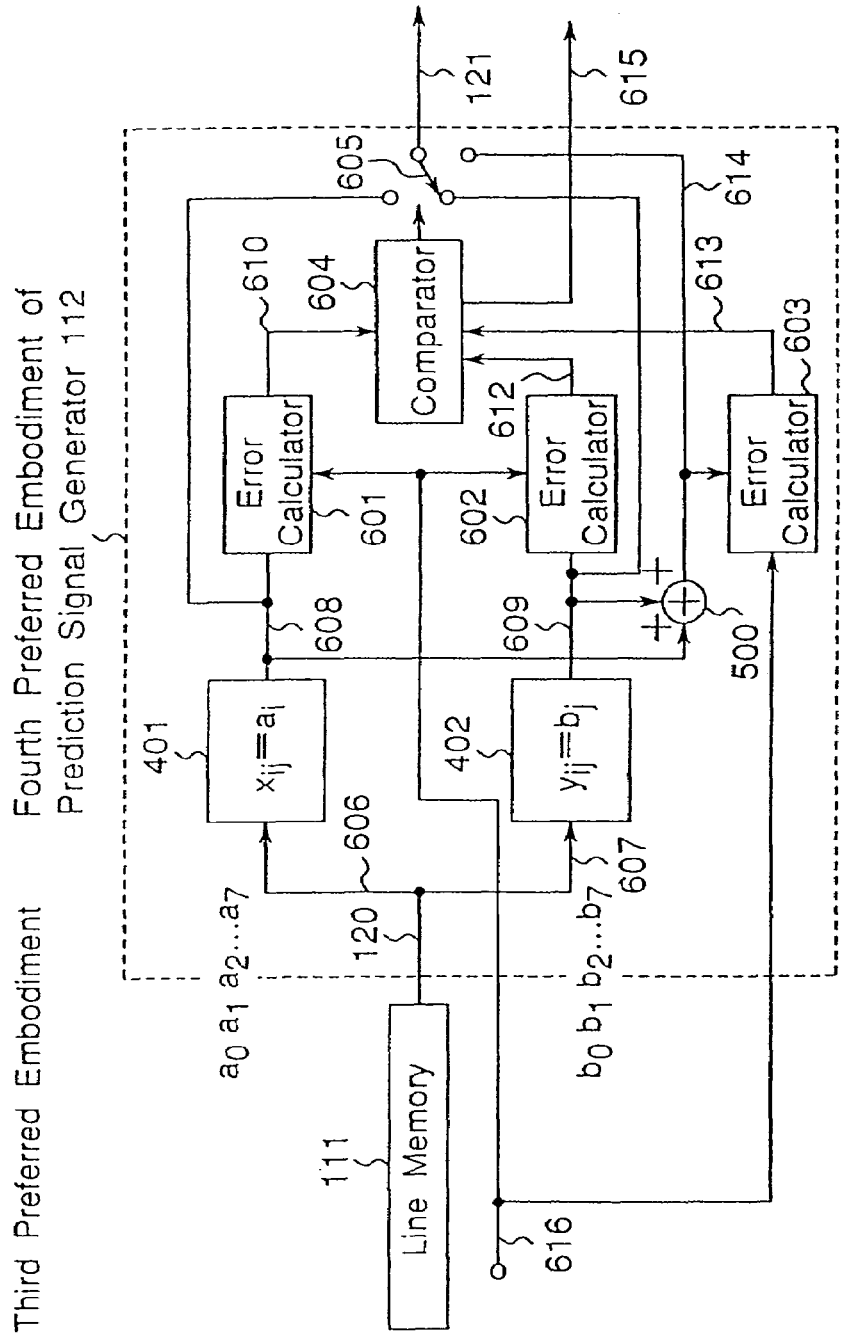
FIG. 7 is a block diagram showing a construction of a fourth preferred embodiment of a prediction signal generator for use in the image predictive coding apparatus of FIG. 1.

FIG. 7 is a block diagram showing a construction of a fourth preferred embodiment of a prediction signal generator for use in the image predictive coding apparatus of FIG. 1.

In FIG. 7, the pixel values $a_0, a_1, a_2, \ldots, a_6, a_7$ which are adjacent to one another in a horizontal direction with respect to the objective small region to be processed are inputted from the line memory 111 to the generator 401, and the generator 401 generates image data of a first intra-frame prediction small region by repetitively outputting each pixel in the horizontal direction. On the other hand, the pixel values $b_0, b_1, b_2, \ldots, b_6, b_7$ which are adjacent to one another in the vertical direction with respect to the objective small region to be processed are inputted from the line memory 111 to the generator 402, and the generator 402 generates image data of a second intra-frame prediction small region by repetitively outputting each pixel in the vertical direction. The image data of the first intra-frame prediction small region and the image data of the second intra-frame prediction small region are inputted to the adder 500, and image data of a third intra-frame prediction small region is generated by averaging these two pieces of image data.

On the other hand, the image data of the objective small region to be processed is inputted via a line 616 to error calculators 601, 602 and 603. In this case, the above-mentioned image data of the first intra-frame prediction small region and the image data of the objective small region to be processed are inputted to the error calculator 601, and the error calculator 601 calculates a first absolute error which is the absolute value of the error of those two pieces of image data and outputs the absolute error to a comparator 604. The above-mentioned image data of the second intra-frame prediction small region and the image data of the target small region to be processed are inputted to the error calculator 602, and the error calculator 602 calculates a second absolute error which is the absolute value of the error of those two pieces of image data and outputs the absolute error to the comparator 604. Further, the above-mentioned image data of the third intra-frame prediction small region and the image data of the target small region to be processed are inputted to the error calculator 603, and the error calculator 603 calculates a third absolute error which is the absolute value of the error of those two pieces of image data and outputs the absolute error to the comparator 604.

The comparator 604 compares the inputted three absolute errors with each other, determines the one having the smallest absolute error and controls a switch 605 so as to output the image data of the intra-frame prediction small region corresponding thereto to the line 121. The comparator 604 simultaneously outputs an identifier for identifying the image data of the first, second and third intra-frame prediction small regions to the apparatus on the receiving side or the reproducing side via a line 615. With this identifier, the image data of the intra-frame prediction small region is uniquely determined on the receiving side or the reproducing side. Thus by using the image data of the intra-frame prediction small region having the smallest error, a differential signal in the coding stage can be suppressed, thereby allowing the reduction in the number of bits to be generated.

Second Preferred Embodiment

Figure 8:
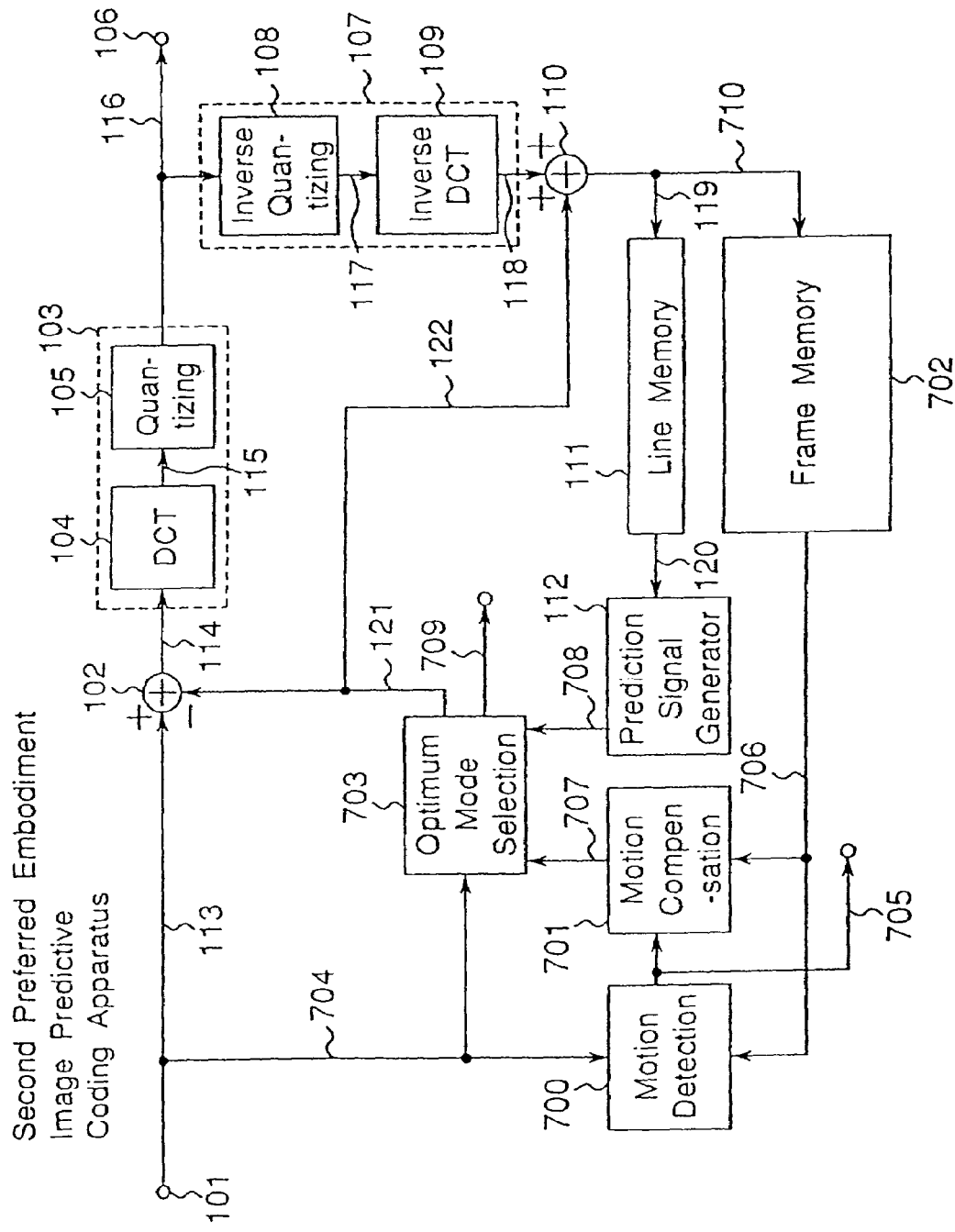
FIG. 8 is a block diagram showing a construction of an image predictive coding apparatus according to a second preferred embodiment of the present invention.

FIG. 8 is a block diagram showing a construction of an image predictive coding apparatus according to a second preferred embodiment of the present invention, where the components similar to those of FIG. 1 are denoted by the same reference numerals.

The image predictive coding apparatus shown in FIG. 8 is characterized in that a motion detector 700, a motion compensator 701, an optimum mode selector 703 and a frame memory 702 are incorporated into the image predictive coding apparatus of FIG. 1.

The construction and operation of the image predictive coding apparatus of FIG. 8 will be described below.

In a manner similar to that of the first preferred embodiment, inputted image data of the target small region to be processed is inputted via an input terminal 101 to an adder 102. The adder 102 subtracts the image data of the target small region to be processed from image data of an optimum prediction small region inputted from an optimum mode selector 703 via a line 121 and thereafter outputs the image data of the subtraction result to an encoder 103. The encoder 103 outputs the inputted image data of the subtraction result via an output terminal 106 while encoding the data in a compression coding manner. At the same time, the encoder outputs the compression-coded image data of the small region to a decoder 107 to decode the data in an expansion decoding manner and thereafter outputs the resulting data to an adder 110 to add the expansion-decoded image data to the image data of the optimum prediction small region.

Then, in a manner similar to that of the first preferred embodiment, only the pixel value of the image data to be used for generating image data of an intra-frame prediction small region is stored into a line memory 111, while all the pixel values of the reconstructed image are stored into the frame memory 702.

When the image data of the next image is inputted via the input terminal 101, the motion detector 700 receives the inputs of the image data of the target small region to be processed and the reconstructed image data stored in the frame memory 702, and the motion detector 700 detects the motion of the image by a block matching or similar method and outputs a motion vector via a line 705. The outputted motion vector is subjected to, for example, variable length coding to be stored or transmitted (not shown) and simultaneously transmitted to the motion compensator 701. The motion compensator 701 generates image data of a temporal prediction small region from the reconstructed image of the frame memory 702 indicated by of the motion vector and outputs the same to the optimum mode selector 703. The motion detecting process and the motion compensating process include forward prediction, backward prediction and bidirectional prediction, and these methods are disclosed in, for example, the specification of U.S. Pat. No. 5,193,004.

On the other hand, in a manner similar to that of the first preferred embodiment, the prediction signal generator 112 generates image data of the intra-frame prediction small region, outputs the data to the optimum mode selector 703. Simultaneously outputs the image data of the target small region to be processed is input to the optimum mode selector 703. The optimum mode selector 703 selects the image data having the smallest error (e.g., the sum of the absolute values of differences obtained every pixel) with respect to the image data of the target small region to be processed from the image data of the intra-frame prediction small region and the image data of a temporal prediction small region and outputs the selected image data as image data of an optimum prediction small region to the adder 102. An identifier representing the prediction small region whose image data has been selected is outputted to be transmitted via a line 709 to the receiving side or the reproducing side.

As described above, there is no need for transmitting any inter-frame motion vector by introducing the intra-frame prediction to the image data coded in predictive mode. Therefore, the number of bits can be further reduced.

The first and second preferred embodiments are in the case where significant pixels exist throughout the entire image. There is a case where a significant pixel and an insignificant pixel exist in a screen. For example, in the case of an image picked up by chromakey, pixels expressing the subject are significant, and pixels expressing a region in blue or the like which serves as a background are insignificant pixels. By transmitting the texture and shape of the significant object through coding, reproduction and display of individual objects can be achieved. When generating image data of the intra-frame prediction small region by the prediction signal generator 112 for such an input image, insignificant pixel values cannot be used.

Figure 9:
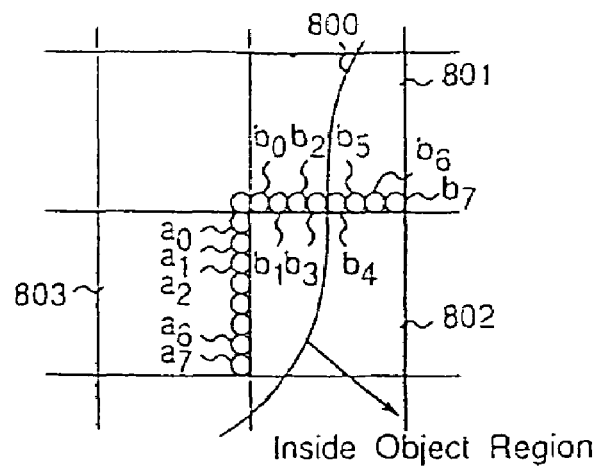
FIG. 9 is a schematic view showing an example of an input image which is inputted to the image predictive coding apparatuses of FIG. 1 and FIG. 8 and includes a significant pixel.
Figure 10:
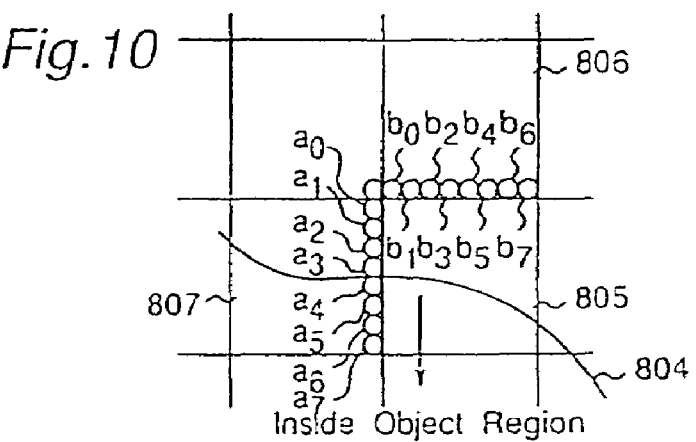
FIG. 10 is a schematic view showing an example of an input image which is inputted to the image predictive coding apparatuses of FIG. 1 and FIG. 8 and includes a significant pixel.
Figure 11:
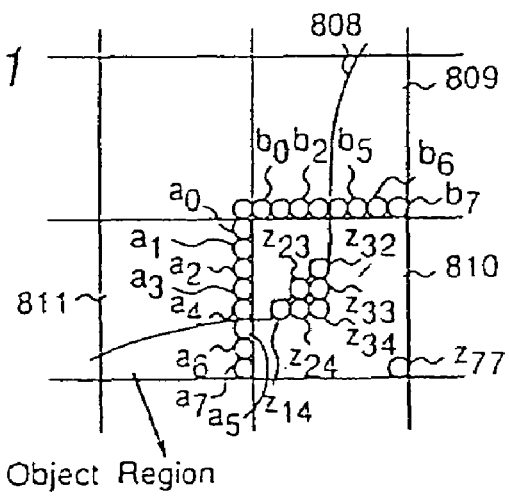
FIG. 11 is a schematic view showing an example of an input image which is inputted to the image predictive coding apparatuses of FIG. 1 and FIG. 8 and includes an insignificant pixel.

FIG. 9 through FIG. 11 show schematic views of input images having significant pixels and insignificant pixels. In the present preferred embodiment, a shape signal is used for expressing whether or not the pixel is significant. The shape signal is compression-coded by a predetermined method and transmitted to the receiving side or the reproducing side. As a method for coding a shape, a chain coding method and the like can be used. A compressed shape signal is reproduced by being expanded again, and the reproduced shape signal is used for generating an intra-frame prediction image signal as follows.

In FIG. 9, a shape curve 800 is the boundary line and the direction indicated by arrow is the inside of an object, and the image data of the inside of the object is comprised of significant pixels. Among the reproduced pixels adjacent to a target small region 802 to be processed, $b_4$, $b_5$, $b_6$ and $b_7$ are the significant pixels, and only these pixel values are repetitively used as the pixel values of the intra-frame prediction small region of the objective small region 802 to be processed.

In FIG. 10, a shape curve 804 is the boundary line, and the direction indicated by arrow is the inside of an object, and the image data of the inside of the object is comprised of significant pixels. Among the reproduced pixels adjacent to a target small region 805 to be processed, $a_4$, $a_5$, $a_6$ and $a_7$ are the significant pixels, and only these pixel values are repetitively used as the pixel values of the intra-frame prediction small region of the objective small region 805 to be processed.

Further, in FIG. 11, a curve 808 is the boundary line, and the direction indicated by arrow is the inside of an object, and the image data of the inside of the object is comprised of significant pixels. Among the reproduced pixels adjacent to a target small region 810 to be processed, $a_5$, $a_6$, $a_7$, $b_4$, $b_5$, $b_6$ and $b_7$ are the significant pixels, and only these pixel values are repetitively outputted. In a place where two pixel values overlap each other, a value obtained by averaging those pixel values is used as the pixel value of the intra-frame prediction small region of the objective small region 810 to be processed.

In FIG. 11, for example, the value of a pixel $z_{77}$ of the objective small region 810 to be processed is the average value of $a_7$ and $b_7$. In a place where no pixel exists, the average value of horizontally and vertically adjacent two pixel values is taken. For example, the value of a pixel $z_{14}$ is the average value of $a_5$ and $b_4$. Thus, the image data of the intra-frame prediction small region of an image having an arbitrary shape is generated.

Although the above-mentioned preferred embodiment has been described on the basis of a small region divided in a square shape, the present invention is not limited to this, and the screen may be divided into triangular small regions. In this case, the image processing is executed in a similar manner.

As another preferred embodiment, it is acceptable to obtain the average value by device of only the significant pixel values and use the average value as the pixel value of the intra-frame prediction small region. Concretely, in FIG. 9, the average value of the pixels $b_4$, $b_5$, $b_6$ and $b_7$ is calculated, and the calculated average value is used as the pixel value of the intra-frame prediction small region. In FIG. 10, the average value of the pixels $a_4$, $a_5$, $a_6$ and $a_7$ is calculated, and the calculated average value is used as the pixel value of the intra-frame prediction small region. In FIG. 11, the average value of the pixels $a_5$, $a_6$, $a_7$, $b_4$, $b_5$, $b_6$ and $b_7$ is calculated, and it is used as the pixel value of the intra-frame prediction small region.

Third Preferred Embodiment

Figure 12:
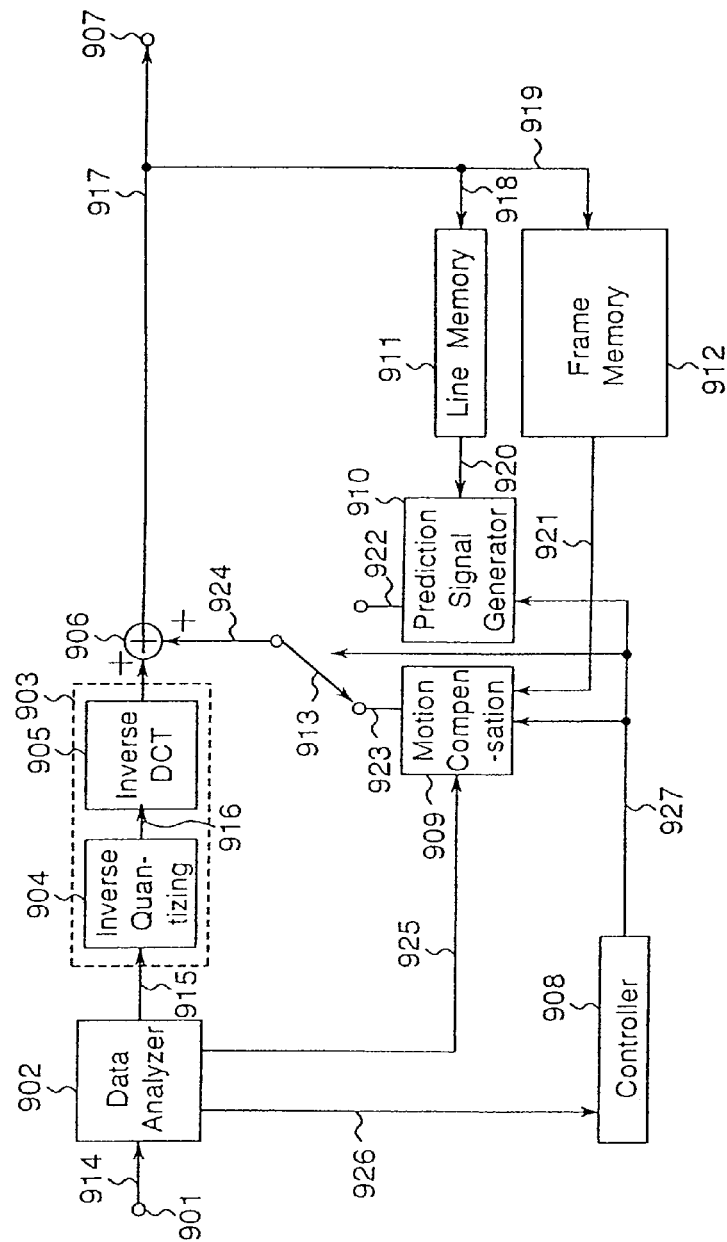
FIG. 12 is a block diagram showing a construction of an image predictive decoding apparatus according to a third preferred embodiment of the present invention.

FIG. 12 is a block diagram showing a construction of an image predictive decoding apparatus according to a third preferred embodiment of the present invention.

In FIG. 12 are shown an input terminal 901, a data analyzer 902, a decoder 903, an adder 906, an output terminal 907, a controller 908, a motion compensator 909, a prediction signal generator 910, a line memory 911 and a frame memory 912.

The construction and operation of the image predictive decoding apparatus of FIG. 12 will be described below. In FIG. 12, compression-coded image data is inputted to the data analyzer 902. The data analyzer 902 analyzes the inputted image data and outputs image data of a compressed difference small region to the decoder 903 via a line 915, outputs a control signal to the controller 908 via a line 926 and further outputs the above-mentioned motion vector (only when it exists) to the motion compensator 909. The decoder 903 is provided with an inverse quantizing unit 904 and an inverse DCT transformer 905 and expands the compressed image data of a difference small region to restore the data into image data of an expanded difference small region.

In the present preferred embodiment, the compressed image data of the difference small region is inverse quantized by the inverse quantizing unit 904, and thereafter image data of a frequency domain obtained after the inverse quantization is transformed into image data of the spatial domain by the inverse DCT transformer 905. The image data of the expanded difference small region obtained after the transform is inputted to the adder 906, and the adder 906 adds the inputted image data of the expanded difference small region to image data of an optimum prediction small region transmitted from a motion compensator 923 or a prediction signal generator 922 via a switch 913 and a line 924, thereby generating image data of a reproduction small region of the addition result. The adder 906 outputs the reconstructed image data to the output terminal 907 via a line 917 and simultaneously stores the data into the frame memory 912. The pixel values of the image data for use in generating an image of an intra-frame prediction small region are stored into the line memory 911.

The image data of the optimum prediction small region is determined by the controller 908 on the basis of a control signal from the data analyzer 902, so that the switching of the switch 913 is controlled. In a case where the image data of the intra-frame prediction small region is selected by the controller 908, the switch 913 connects the line 924 to the line 922, so that the prediction signal generator 910 makes access to the line memory 911 in response to the control signal from the controller 908 to output the adjacent reproduction pixel value as the pixel value in the intra-frame prediction small region. The detail of the operation of the prediction signal generator 910 has been described in detail with reference to FIG. 4, FIG. 5 and FIG. 6. In a case where the image data of a time prediction small region is selected by the controller 908, the switch 913 connects the line 924 to the line 923, so that the motion compensator 909 executes a motion compensating process on the image data from the frame memory 912 on the basis of a motion vector to be transmitted from the data analyzer 902 via a line 925 in response to the control signal from the controller 908, thereby generating image data of the time prediction small region and outputting the data to the adder 906 via the switch 913 and the line 924.

Fourth Preferred Embodiment

Figure 13:
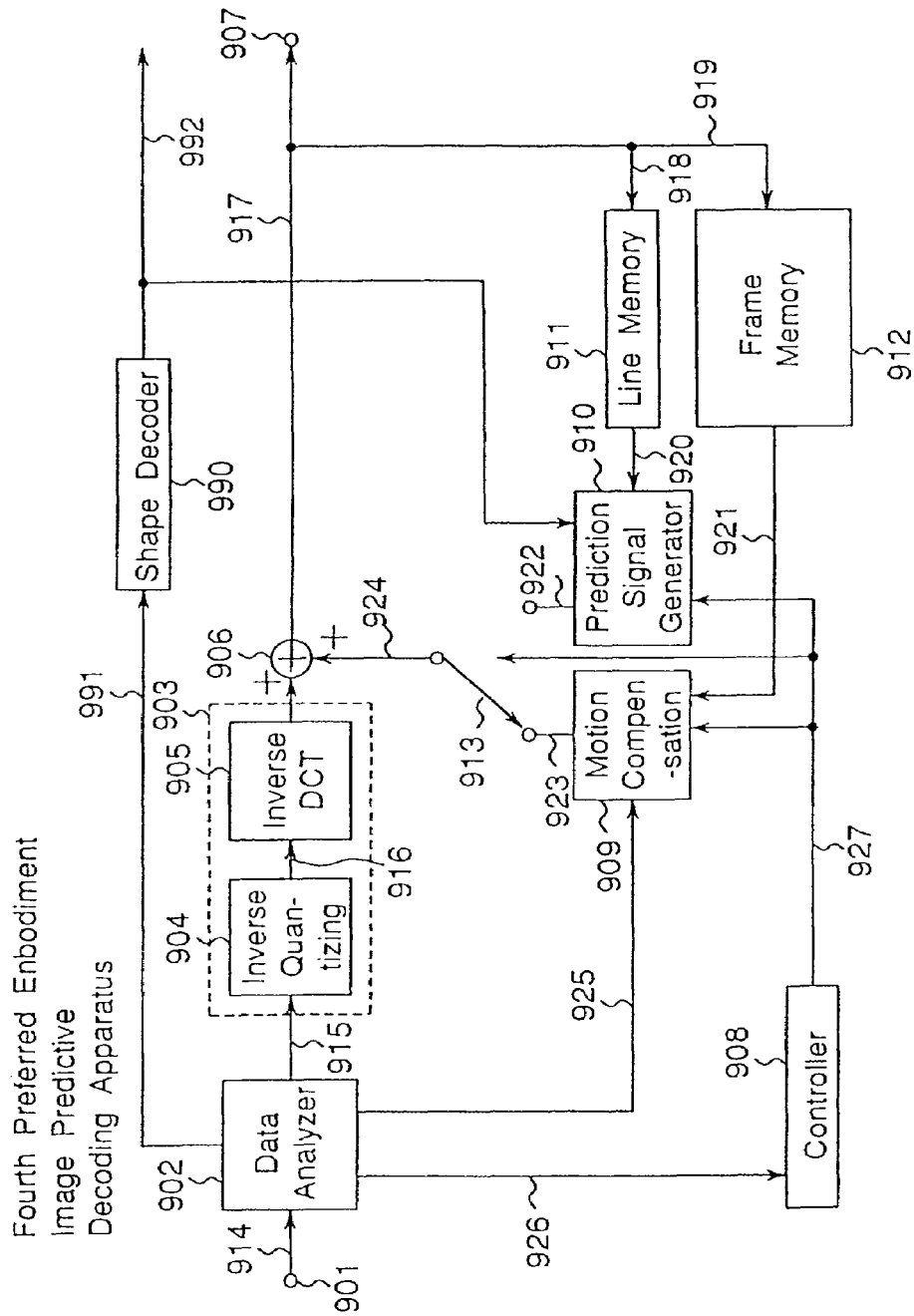
FIG. 13 is a block diagram showing a construction of an image predictive decoding apparatus according to a fourth preferred embodiment of the present invention.

FIG. 13 is a block diagram showing a construction of an image predictive decoding apparatus according to a fourth preferred embodiment of the present invention. In FIG. 13, the components similar to those of FIG. 12 are denoted by the same reference numerals. The image predictive decoding apparatus of FIG. 13 is characterized in that a shape decoder 990 is incorporated into the basic construction of the image predictive decoding apparatus of FIG. 12. The basic operation of the image predictive decoding apparatus of FIG. 13 is the same as that of FIG. 12, and therefore, only the different operation will be described in detail below.

In the present preferred embodiment, the compression-coded image data includes compression-coded shape data. The data analyzer 902 extracts the shape data and outputs the same to the shape decoder 990, and in response to this, the shape decoder 990 reproduces a shape signal in an expanding manner. The reconstructed shape signal is transmitted to the receiving side or the reproducing side and simultaneously inputted to the prediction signal generator 910. The prediction signal generator 910 generates image data of an intra-frame prediction small region as described with reference to FIG. 9 through FIG. 11 based on this reconstructed shape signal. Thus, the image data of the intra-frame prediction small region of the image having an arbitrary shape is generated, and the image data can be decoded and reproduced on the receiving side or the reproducing side.

The third and fourth preferred embodiments are characterized by the provision of the line memory 911. In the absence of the line memory 911, access must be made from the frame memory 912 to a pixel for generating the image data of the intra-frame prediction small region. For the purpose of generating a prediction signal by the pixel of the adjacent small region, it is required to execute write and read operations at high speed on the frame memory. By providing a special line memory or a buffer, the image data of the intra-frame prediction small region can be generated at high speed without using any high-speed frame memory.

In the above preferred embodiment, the average value of the plurality of pixel values may be a specifically weighted average value.

As described above, according to the first preferred embodiment group of the present invention, by merely using the reconstructed pixel value adjacent to the image data of the target small region to be processed as the pixel value of the intra-frame prediction signal, a high-accuracy prediction signal can be simply generated with a smaller amount of computation than in the prior arts, and this can produce a unique effect that the number of bits of the intra-frame coding can be reduced. The line memory 911 is provided for storing therein the reproduced pixel value for use in generating the intra-frame prediction signal, and therefore, access can be made at high speed to the pixel value, thereby allowing the intra-frame prediction signal to be generated at high speed.

Second Preferred Embodiment Group

The second preferred embodiment group includes fifth to seventh preferred embodiments.

In view of the problems of the prior art, the inventors of this invention have discovered that the image coding efficiency can be further improved by removing not only the redundancy between two images or the insides of two blocks in one image but also the redundancy between two blocks in one image.

The inventors have discovered that the DCT transform coefficients located in the same positions of adjacent blocks closely resemble each other in many cases. The inventors have also discovered that the resemblance is particularly great in a case where the original image compositions of two blocks closely resemble each other or when an identical image pattern of, for example, a straight line, an angle and so forth is included. Identical information device a redundancy according to an information theory.

This kind of redundancy existing in the DCT transform domain over a block can be removed or remarkably reduced by adaptive intra-prediction (intra-frame prediction) from a previous block. Then, the following VLC entropy coding process can achieve a higher coding efficiency by virtue of the small entropy of prediction. As a result of prediction of this DCT transform domain, input of redundant data to a VLC entropy coding circuit can be remarkably reduced. Accordingly, there can be expected a great saving of bits. Therefore, the image quality of the coded image data is definitely improved.

The present preferred embodiment of the present invention provides a system for accurately predicting DCT transform coefficients from another block. This system is able to remove the redundancy existing over the adjacent block, further reduce the entropy of the quantized DCT transform coefficients and consequently reduce the number of bits required for coding the DCT transform coefficients.

The DCT transform coefficients of the target current block to be processed at the present timing (referred to as a current block hereinafter) can be predicted from the DCT transform coefficients at the same position in the preceding adjacent block. The adjacent block has been already decoded in the processing stage. That is, according to the first DC coefficient in one of previously decoded adjacent blocks, a first DC coefficient is predicted. A second coefficient AC1 is predicted from the second coefficient AC1 in the same decoded block. The same operation will be executed subsequently. By using this method, several predicted blocks can be obtained from the decoded blocks located upwardly on the left-hand side, diagonally on the left-hand side, upwardly diagonally on the right-hand side and upwardly with respect to the DCT transform block that is coded at the present timing. These predicted blocks are checked by being subjected to the actual entropy coding. Then, a prediction block having a smaller number of bits is selected, thereafter subjected to the entropy coding and transmitted to the image predictive decoding apparatus on the receiving side or the reproducing side together with an additional indication bit. The image predictive decoding apparatus is informed of the adjacent block from which the current block is predicted.

A method according to the present preferred embodiment of the present invention can predict the DCT transform coefficients of the current block. The DCT transform coefficients generally has high correlation with the DCT transform coefficients of another adjacent block. The reason for this is that the DCT transform tends to give an identical value or an identical distribution of the DCT transform coefficients to a similar block image.

Inputted image data of an intra-frame or temporarily predicted frame is normally subjected first to a block-based DCT transform process. After the DCT transform coefficients of the current block are obtained, a DCT transform domain predicting process can be executed before quantization or after quantization.

Figure 15:
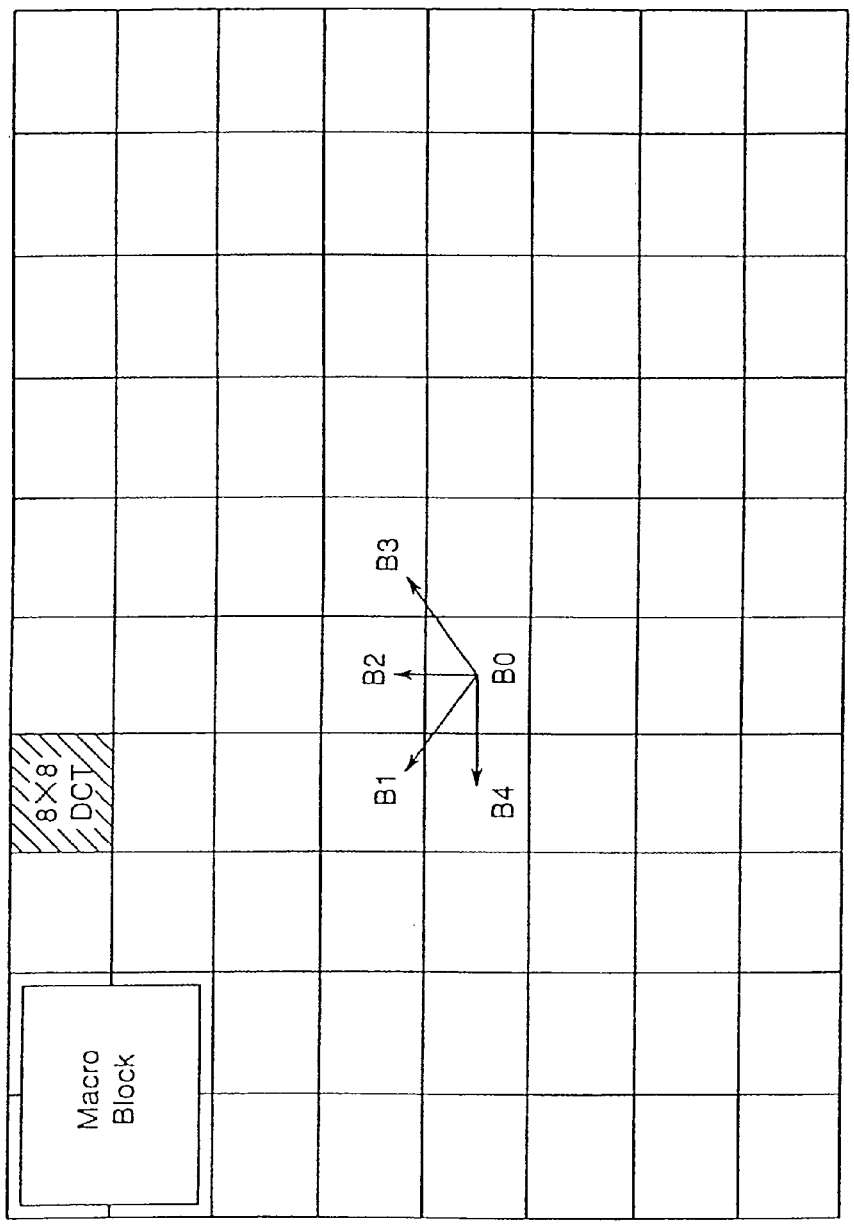
FIG. 15 is a schematic view of an image for explaining an adaptive DCT transform domain for intra-frame prediction.

As shown in FIG. 15, the DCT transform coefficients of the current block can be predicted from blocks that are the already decoded blocks and adjacent blocks, i.e., an upper left-hand block B1, an upper block B2, an upper right-hand block B3 and a left-hand block B4. A predicted block can be obtained by subtracting all the DCT transform coefficients of the current block from all the DCT transform coefficients of the preceding adjacent block located in the same position. The block can also be obtained by partially subtracting the DCT transform coefficients instead of all the DCT transform coefficients.

The predicted DCT transform coefficients of different predicted blocks are quantized if the prediction is executed before the quantization. Then, the DCT transform coefficients are subjected to the entropy coding process. The entropy coding process is identical to that of the image predictive coding apparatus, and it is checked which predicted block is used as a low order bit.

The prediction block which uses the low order bit is selected, and the selected prediction block is coded in an entropy coding manner together with an indication bit for informing the image predictive decoding apparatus of the prediction determination.

In the image predictive decoding apparatus, the block predicted by the indication bit is decoded. That is, the DCT transform coefficients predicted for one block are decoded in an inverse entropy decoding manner, and thereafter the DCT transform coefficients of the block are obtained by adding reference DCT transform coefficients of the adjacent block which is decoded before being expressed by the indication bit to the above decoded DCT transform coefficients. Finally, an inverse DCT transform process is applied to the restored DCT transform coefficients of each block, so that decoded image data is obtained.

The present preferred embodiment of the present invention provides an image coding apparatus capable of reducing the redundancy of the other types existing in the DCT transform domain over the adjacent block in addition to the spatial redundancy which is normally removed by a transform such as DCT transform, the redundancy which is removed between frames by motion detection and compensation and the statistical redundancy which is removed through the entropy coding among quantization transform coefficients inside a block.

Figure 14:
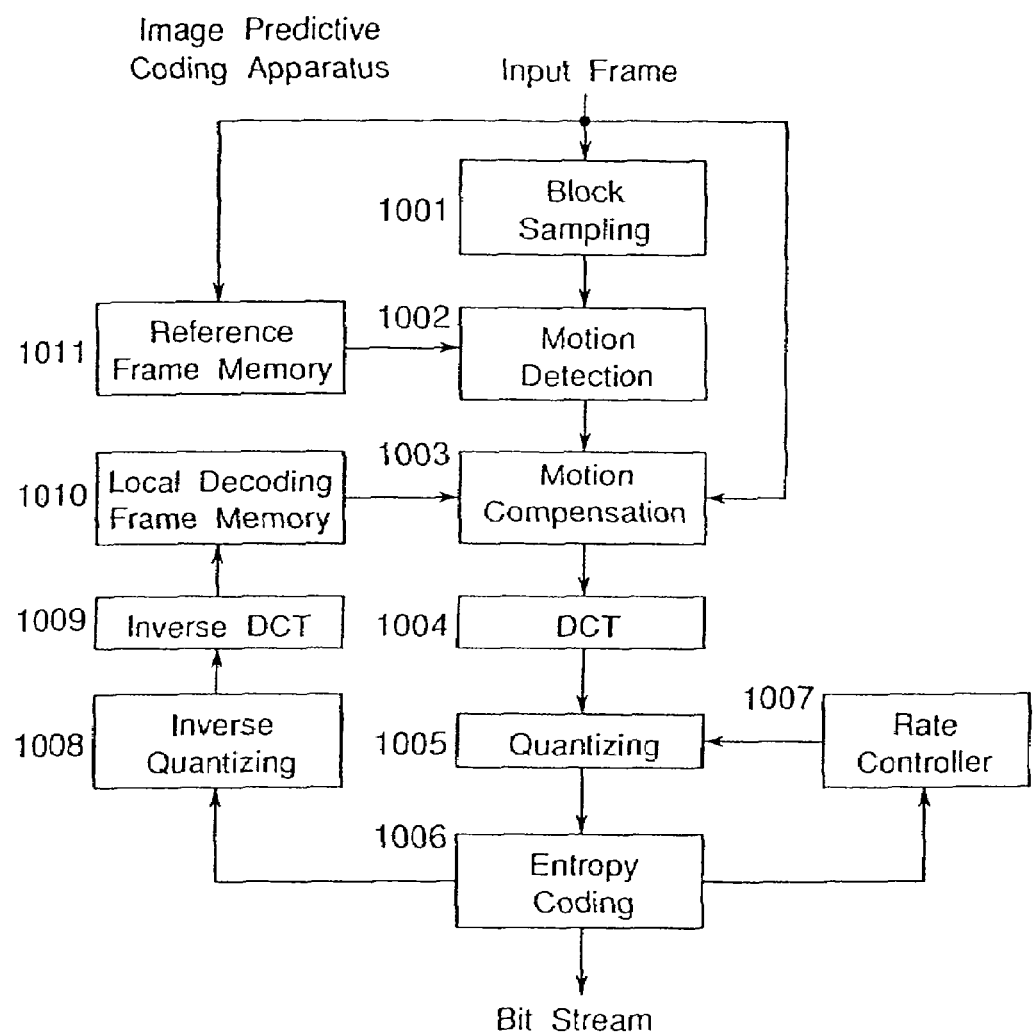
FIG. 14 is a block diagram showing a construction of a prior art image predictive coding apparatus.

As is apparent from FIG. 14 which shows a prior art image predictive coding apparatus, the image predictive coding apparatus which is generally used for the prior art image coding (e.g., MPEG) is provided with a block sampling unit 1001, a DCT transform unit 1004, a quantizing unit 1005 and an entropy coding unit 1006.

According to the intra-frame coding (coding inside a frame), an inputted image signal is subjected first to a block sampling process. Next, a DCT transform process is directly executed. Subsequently, a quantizing process and an entropy coding process are executed. On the other hand, according to the inter-frame coding (prediction frame coding), the image data of the objective frame to be processed at the present timing is subjected to the processes of a motion detecting unit 1002 and a motion compensating unit 1003 after a block sampling process and further to a DCT transform process. Further, a quantizing process and an entropy coding process are executed.

In this case, the quantized value is coded in an entropy coding manner in the entropy coding unit 1006, and code data is outputted. The entropy coding is a system for considerably reducing the total amount of codes so as to make coding approach the entropy or the average information amount by assigning a short code to a value which frequently occurs and assigning a long code to a value which scarcely occurs. This is a reversible coding. A variety of systems are proposed for the entropy coding, and Huffman coding is used in a baseline system. The Huffman coding method differs depending on a quantized DC coefficient value and an AC coefficient value.

That is, the DC coefficient exhibits the average value of 8×8 pixel block, however, the average value of adjacent blocks often has a similar value in a general image. Therefore, the entropy coding is executed after taking differences between a block and the preceding block. With this arrangement, values concentrate in the vicinity of zero, and therefore, the entropy coding becomes effective. The AC coefficients are subjected to, for example, a zigzag scan, thereby transforming two-dimensional data into one-dimensional data. Further, AC coefficients including, in particular, high-frequency components frequently yield zero, and therefore, the entropy coding is executed by a combination of AC coefficients value having a value other than zero and the number (run length) of zeros before it.

A rate controller 1007 feeds back the bit used for the previously coded block, controls the processing in the quantizing unit 1005 and adjusts the code bit rate. In this case, the rate controller 1007 controls the code bit rate so as to assign different amounts of bits to object data coded on the basis of the coded unit properties and usable bits as well as to each frame and each coded block. The inverse quantizing process and the inverse DCT transform process are executed in the units 1008 and 1009 which serve as parts of the local decoder. The image data decoded by the local decoder is stored into a local decoding frame memory 1010 and used for a motion detecting process. A unit 1011 is a reference frame memory for saving the preceding original frame for motion detection. Finally, a bit stream is outputted from the entropy encoding unit 1006 and transmitted to the image predictive decoding apparatus on the receiving side or the reproducing side.

FIG. 15 is a schematic view of an image for explaining an adaptive DCT transform domain for intra-frame prediction.

FIG. 15 shows an arrangement that four 8×8 DCT transform blocks are constituting a macro block in the DCT transform domain. In this case, B0 indicates a current block at the present timing having 8×8 DCT transform coefficients. B2 indicates an already decoded block located adjacently on the upper side. B1 and B3 indicate already decoded two blocks located adjacently diagonally on the upper side. B4 indicates the preceding block located adjacently on the left-hand side. FIG. 15 shows the fact that the block having DCT transform coefficients can be predicted from the plurality of adjacent decoded blocks having the 8×8 DCT transform coefficients.

Attention must be paid to the fact that the block used for the prediction of the current block is always different. Therefore, a determination is executed on the basis of a least bit use rule, and the determination is adaptively given to different blocks on the image predictive decoding apparatus side. The image predictive decoding apparatus is informed of the determination by an indication bit. In this case, the least bit use rule is used for determining the predicting method among a plurality of different predicting methods. After each predicting method is applied, the amount of bits for use in coding the block is counted. As a result, the method which achieves the least amount of bits is selected as the predicting method to be used.

It is to be noted that the DCT transform domain prediction can be executed after or before the quantization.

Fifth Preferred Embodiment

Figure 16:
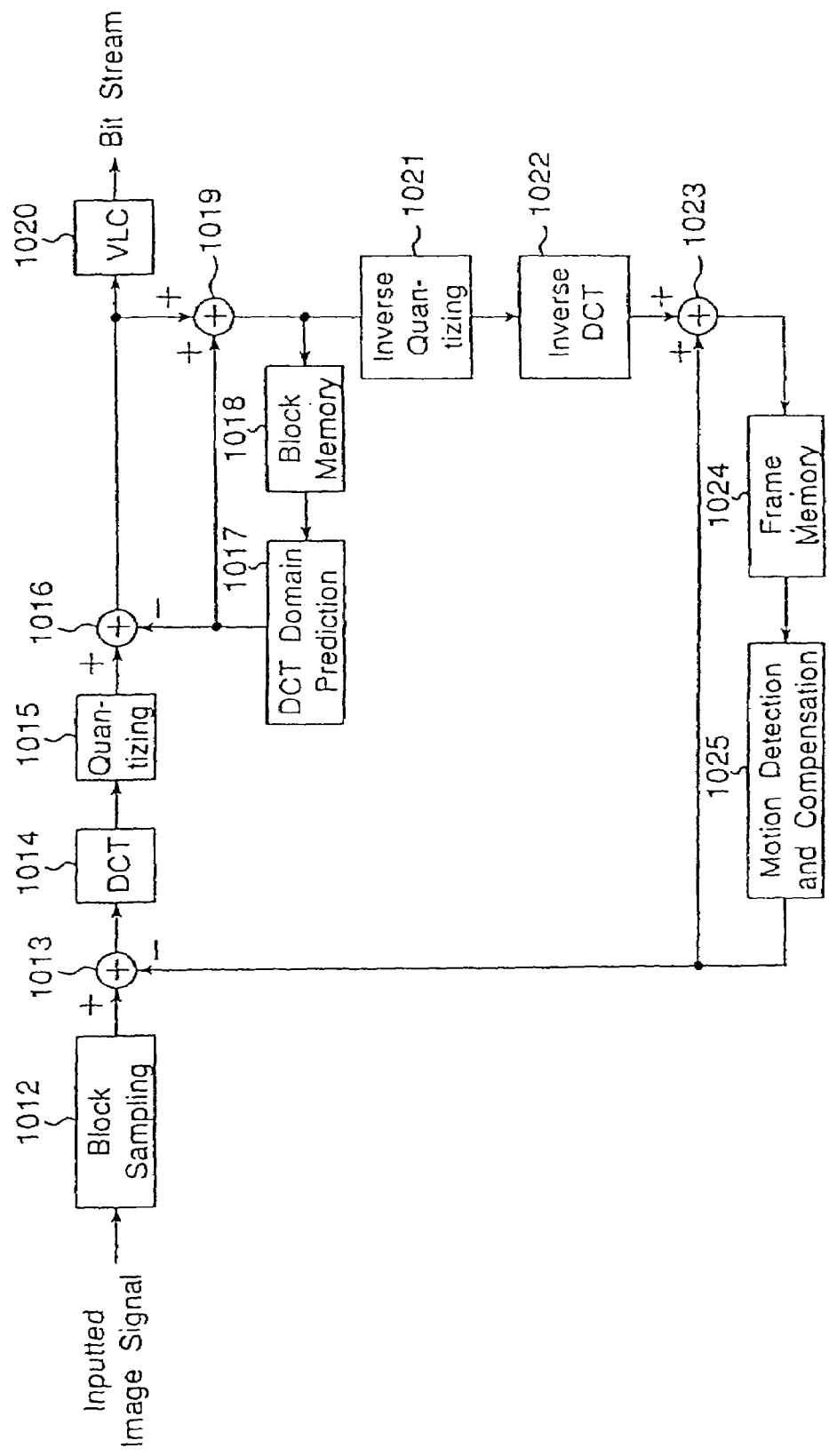
FIG. 16 is a block diagram showing a construction of an image predictive coding apparatus according to a fifth preferred embodiment of the present invention.

FIG. 16 is a block diagram showing a construction of an image predictive coding apparatus according to a fifth preferred embodiment of the present invention. The image predictive coding apparatus shown in FIG. 16 is characterized in that the DCT transform domain predicting process is executed after the quantizing process.

In FIG. 16, an inputted image signal is subjected first to block sampling by a block sampling unit 1012. Then, according to the intra-frame coding, the sampled block image data is inputted to a DCT transform unit 1014 through an adder 1013 without undergoing the process in the adder 1013. On the other hand, according to the prediction frame coding, the adder 1013 subtracts motion detection image data outputted from a motion detecting and compensating unit 1025 from the sampled block image data and outputs the image data of the subtraction result to the DCT transform unit 1014. Then, the DCT transform process is executed in the unit 1014, and thereafter the quantizing process is executed in a unit 1015.

The DCT transform domain predicting process is executed in a unit 1017, while the reference numeral 1018 denotes a block memory for storing therein previously decoded block for prediction. An adder 1016 subtracts the decoded adjacent block outputted from the DCT transform domain predicting unit 1017 from the DCT transform block at the present timing outputted from the quantizing unit 1015. The determination of the coded adjacent block is executed in the DCT transform domain predicting unit 1017. Finally, the predicted DCT transform block is subjected to an entropy VLC coding process by a unit 1020, and the coded bits are written into a bit stream.

An adder 1019 restores the DCT transform block at the present timing by adding the preceding adjacent block used for prediction to the prediction block. Then, the restored DCT transform block is subjected to an inverse quantizing process and an inverse DCT transform process in the units 1021 and 1022, respectively. The image data which is locally decoded and belongs to the block outputted from the inverse DCT transform unit 1022 is inputted to an adder 1023. The adder 1023 obtains reconstructed image data by adding the image data of the preceding frame to the image data of the restored block, and the data is stored into a frame memory 1024. A motion detecting and compensating process is executed in a unit 1025. The frame memory 1024 is used for storing the preceding frame for the motion detecting and compensating process.

Sixth Preferred Embodiment

Figure 17:
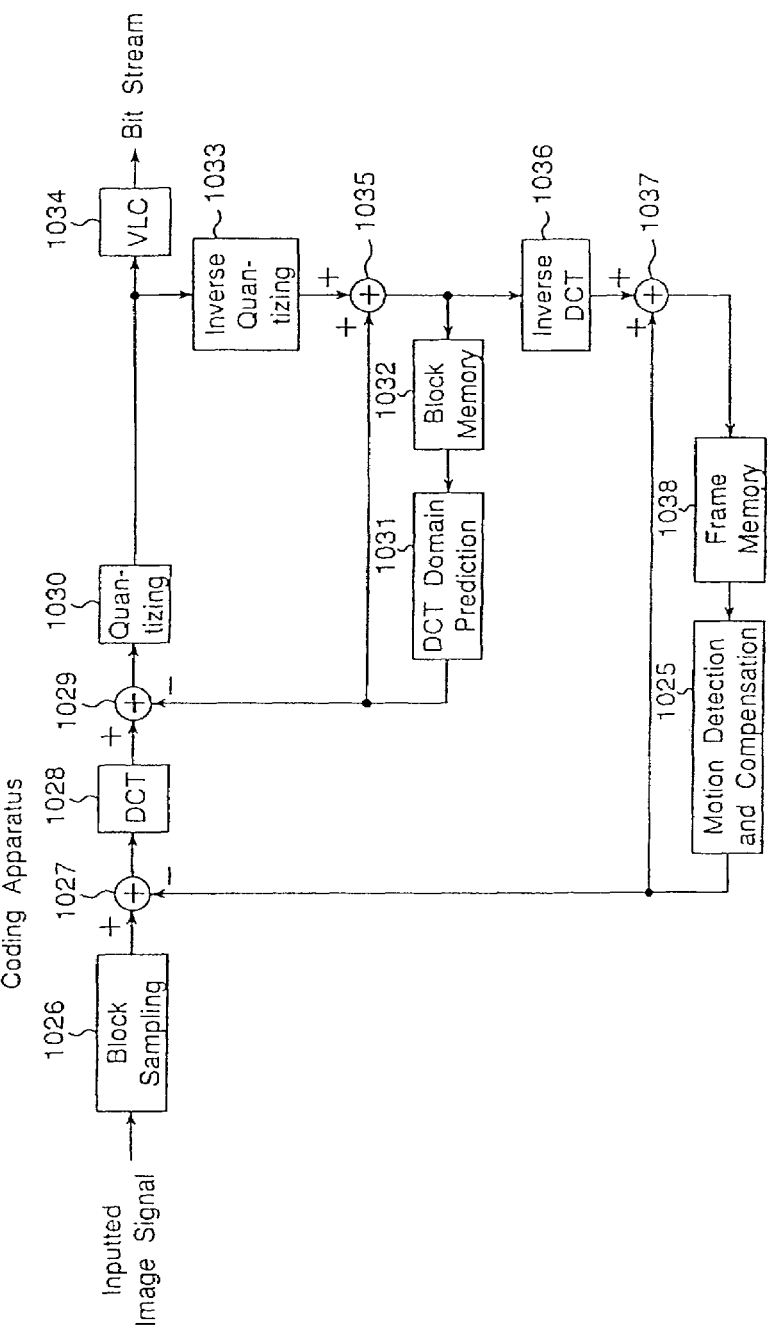
FIG. 17 is a block diagram showing a construction of an image predictive coding apparatus according to a sixth preferred embodiment of the present invention.

FIG. 17 is a block diagram showing a construction of an image predictive coding apparatus according to a sixth preferred embodiment of the present invention. The image predictive coding apparatus of FIG. 17 is characterized in that the DCT transform domain predicting process is executed before the quantizing process. An inputted image signal is subjected to a block sampling process in a unit 1026. Then, an adder 1027 executes a subtracting process for prediction frame coding, and the image data of the subtraction result is outputted to an entropy VLC coding unit 1034 and an inverse quantizing unit 1033 via a DCT transform unit 1028, an adder 1029 and a quantizing unit 1030.

A block memory 1032 stores therein the image data of the preceding block for the DCT transform domain predicting process of a unit 1031. The image data of the DCT transform block at the present timing outputted from the DCT transform unit 1028 is subtracted from the preceding DCT transform block selected by the DCT transform domain predicting unit 1031 by the adder 1029 according to the least bit use rule. The image data of the DCT transform block of the subtraction result is quantized by the quantizing unit 1030 and thereafter outputted to the inverse quantizing unit 1033 and the entropy VLC coding unit 1034. The inverse quantizing unit 1033 restores the inputted quantized image data of the DCT transform block through inverse quantization and outputs the resulting data to an adder 1055. The adder 1055 adds the image data of the restored DCT transform block to the image data of the preceding DCT transform block from the DCT transform domain predicting unit 1031, stores the image data of the addition result of the preceding block into the block memory 1032 and outputs the data to an inverse DCT transform unit 1036.

The inverse DCT transform unit 1036 executes an inverse DCT transform process on the image data of the preceding block inputted from an adder 1035 and outputs the restored image data obtained after the transform process to an adder 1037. The adder 1037 adds the image data of the preceding frame outputted from the motion detecting and compensating unit 1025 to the restored image data outputted from the inverse DCT transform unit 1036, temporarily stores the image data of the addition result into a frame memory 1038 and thereafter outputs the data to the motion detecting and compensating unit 1025.

B1. General Description of Mode Determination

Figure 18:
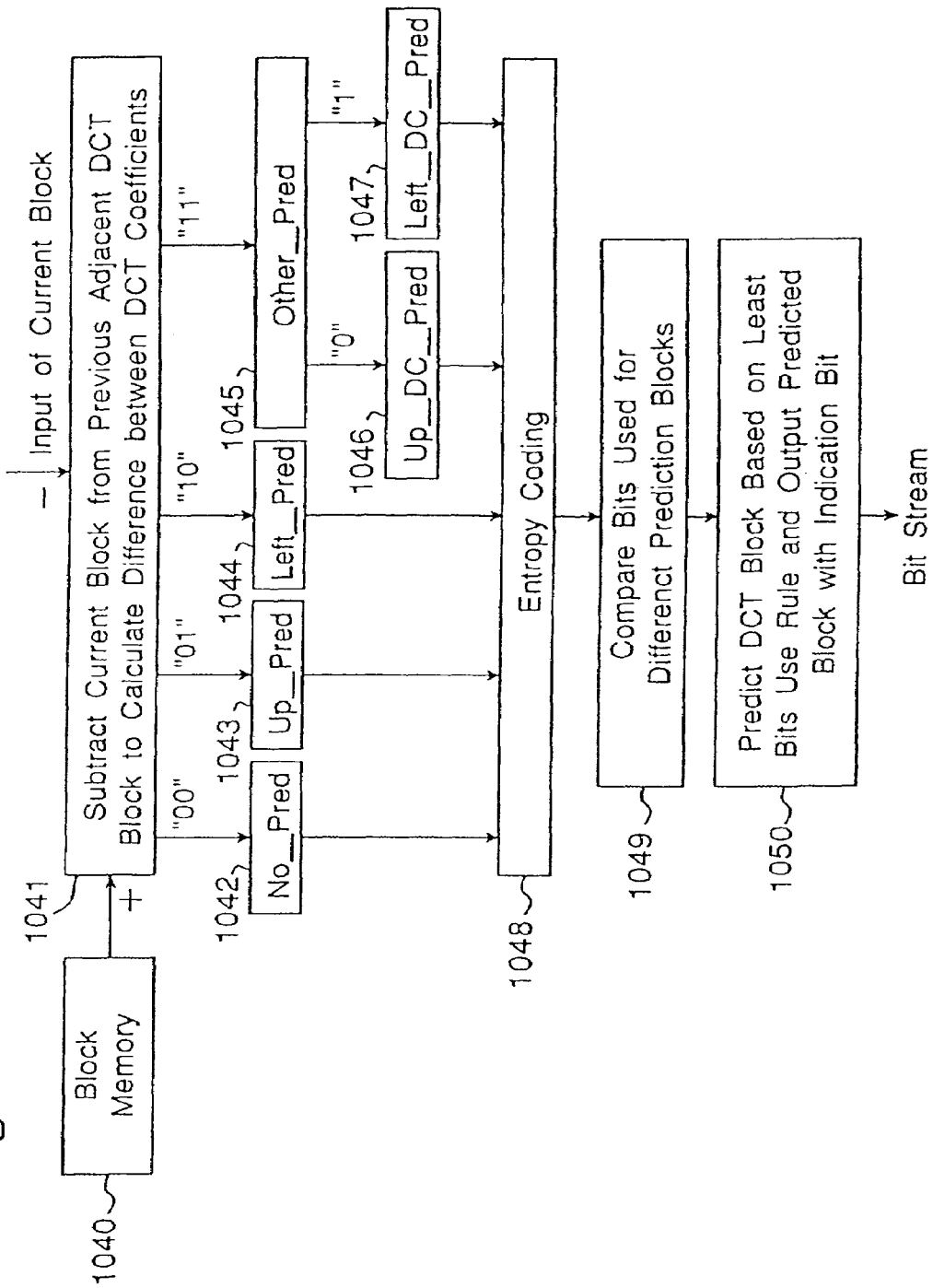
FIG. 18 is a block diagram showing a construction of DCT transform domain prediction circuits of FIG. 16 and FIG. 17.

FIG. 18 is a block diagram showing a construction of DCT transform domain prediction circuits 1017 and 1031 of FIG. 16 and FIG. 17.

In FIG. 18, the reference numeral 1040 denotes a block memory for storing therein the image data of the preceding adjacent block for prediction. The objective current block to be processed at the present timing is inputted to a unit 1041, and the unit 1041 subtracts the inputted image data of the current block from the preceding adjacent DCT transform block stored in the block memory 1040, thereby obtaining the image data of predictive DCT transform blocks of the following four types:

(a) No-Pred block denoted by 1042,
(b) Up-Pred block denoted by 1043,
(c) Left-Pred block denoted by 1044, and
(d) Other-Pred block denoted by 1045.

In this case, the above four types of blocks are expressed by two bits. That is, for example, "00" expresses the No-Pred block, "01" expresses the Up-Pred block, "10" expresses the Left-Pred block and "11" expresses the Other-Pred block.

The No-Pred block is the image data itself of the DCT transform block at the present timing in the absence of prediction. The Up-Pred block represents the image data of a prediction block obtained in a case where the block used for the prediction is the upwardly adjacent DCT transform block B2. The Left-Pred block represents the image data of a prediction block obtained in a case where the block used for the prediction is the leftwardly adjacent DCT transform block B4. The Other-Pred block represents the image data of a prediction block obtained in a case where prediction is effected only on the DC coefficient. In the case of the Other-Pred block, two types of predicting methods exist. That is, an Up-DC-Pred (1046) represents the image data of a prediction block obtained in a case where a prediction is effected on only the DC coefficient based on the upwardly adjacent DCT transform block B2. A Left-DC-Pred (1047) represents the image data of a prediction block obtained in a case where a prediction is effected on only the DC coefficient based on the leftwardly adjacent DCT transform block B4. In these two cases, an additional one bit is required for designation. The bit is used so that, for example, "0" expresses the Up-DC-Pred (1046) and "1" expresses the Left-DC-Pred (1047).

It is possible to make a prediction based on the diagonally adjacent blocks B1 and B3. However, the prediction result is not as good as that made on the blocks located upwardly or on the left-hand side, and therefore, they are not used in the present invention.

All the predicted blocks are inspected and checked by being subjected to the actual entropy coding process in a unit 1048. The bits used for different predicted blocks are subjected to a comparison in a unit 1049. Finally, a unit 1050 determines the DCT transform block predicted on the basis of the least bit use rule and outputs the predicted DCT transform block together with an indication bit. That is, the predicted DCT transform block having the minimum number of bits is selected.

B2. Execution of Mode Determination

Figure 19:
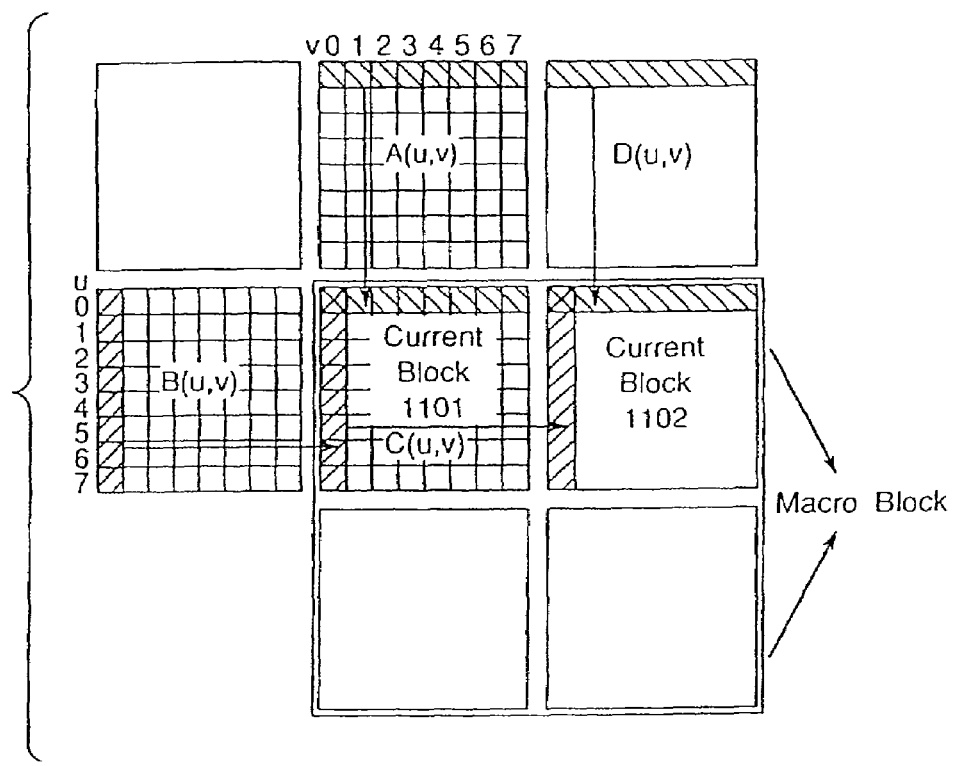
FIG. 19 is a schematic view of an image showing an example of a DC/AC predictive coding method of the DCT transform domain prediction circuit of FIG. 18.

FIG. 19 is a schematic view of an image showing an example of a DC/AC predictive coding method of the DCT transform domain prediction circuit of FIG. 18.

In FIG. 19, a subset of the previously defined DC/AC-predicted image data for actual use is shown. A current block 1101 is an 8×8 block located on the upper left-hand side of a current macro block, while a current block 1102 is an 8×8 block located on the upper right-hand side of the current macro block. The reference characters A and B denote 8×8 blocks adjacent to the current block 1101. Highlighted upper row and left column of the current block 1101 are predicted from the same positions of adjacent blocks A and B. That is, the top row of the current block 1101 is predicted from the top row of the block A located on the upper side of it, and the left column of the current block 1101 is predicted from the left column of the block B located on the left-hand side of it. According to a similar procedure, the current block 1102 is predicted from a block D located on the upper side of it and the current block B located on the left-hand side of it.

It is assumed that $C(u,v)$ is the block to be coded, $E_i(u,v)$ is a prediction error in the case of a mode i and $A(u,v)$ and/or $B(u,v)$ is obtained by subtracting a prediction value from each block. In actual implementation, only the following three modes which appear most frequently as described in the above-mentioned section B1 are used.

(a) Mode 0: DC prediction only $$E_0(0,0)=C(0,0)-(A(0,0)+B(0,0))/2,$$

$$E_0(u,v)=C(u,v), u0; v 0; u=0,\ldots,7; v=0,\ldots,7 \quad (1)$$

(b) Mode 1: DC/AC prediction from block located on the upper side $$E_1(0,v)=C(0,v)-A(0,v), v=0,\ldots,7,$$

$$E_1(u,v)=C(u,v), u=1,\ldots,7; v=0,\ldots,7 \quad (2)$$

(c) Mode 2: DC/AC prediction from block located on the left-hand side $$E_2(u,0)=C(u,0)-B(u,0), u=0,\ldots,7,$$

$$E_2(u,v)=C(u,v), u=0,\ldots,7; v=1,\ldots,7. \quad (3)$$

Mode selection is executed by calculating the sum $SAD_{mo\text{-}dei}$ of the absolute values of errors predicted for four luminance signal blocks in a macro block and selecting the mode having the minimum value.

$$SAD_{mode i} = \sum_{b} \left[ E_i(0, 0) + 32 \cdot \sum_{u} E_i(u, 0) + 32 \cdot \sum_{1v} E_i(0, v) \right], \quad (4)$$

$$i = 0, \ldots, 2; b = 0, \ldots, 3; u, v = 1, \ldots, 7$$

Mode determination can be executed depending on a difference in application targeted for varied coding bit rate on both a block base and a macro block base. The mode is coded with the variable-length codes of the following Table 1.

TABLE 1

| | VLC Table for DC/AC Mode | |
|---|---|---|
| Index | DC/AC Prediction Mode | VLC code |
| 0 | 0 (DC Only) | 0 |
| 1 | 1 (Vertical DC & AC) | 10 |
| 2 | 2 (Horizontal DC/AC) | 11 |

When executing a DC/AC prediction after quantization, the preceding horizontally adjacent block or the vertically adjacent block generally has a varied quantization step to be used, and therefore, several sorts of weighting factors are required for scaling the quantized DCT transform coefficients.

It is assumed that QacA is the quantized DCT transform coefficients of the block A (See FIG. 19) and QacB is the quantized DCT transform coefficients of the block B (See FIG. 19). Assuming that QstepA is the quantization step to be used for quantizing the block A, then QstepB is the quantization step to be used for quantizing the block B and QstepC is the quantization step to be used for quantizing the current block C. Therefore, the scaling equations are as follows:

$$Q'acA = (QacA \times QstepA)/QstepC \quad (5)$$

$$Q'acB = (QacB \times QstepB)/QstepC \quad (6)$$

where Q'acA is the DCT transform coefficients from the block A to be used for predicting the top row of the current block C, while Q'acB is the DCT transform coefficients from the block B to be used for predicting the left-hand column of the current block C.

Seventh Preferred Embodiment

Figure 20:
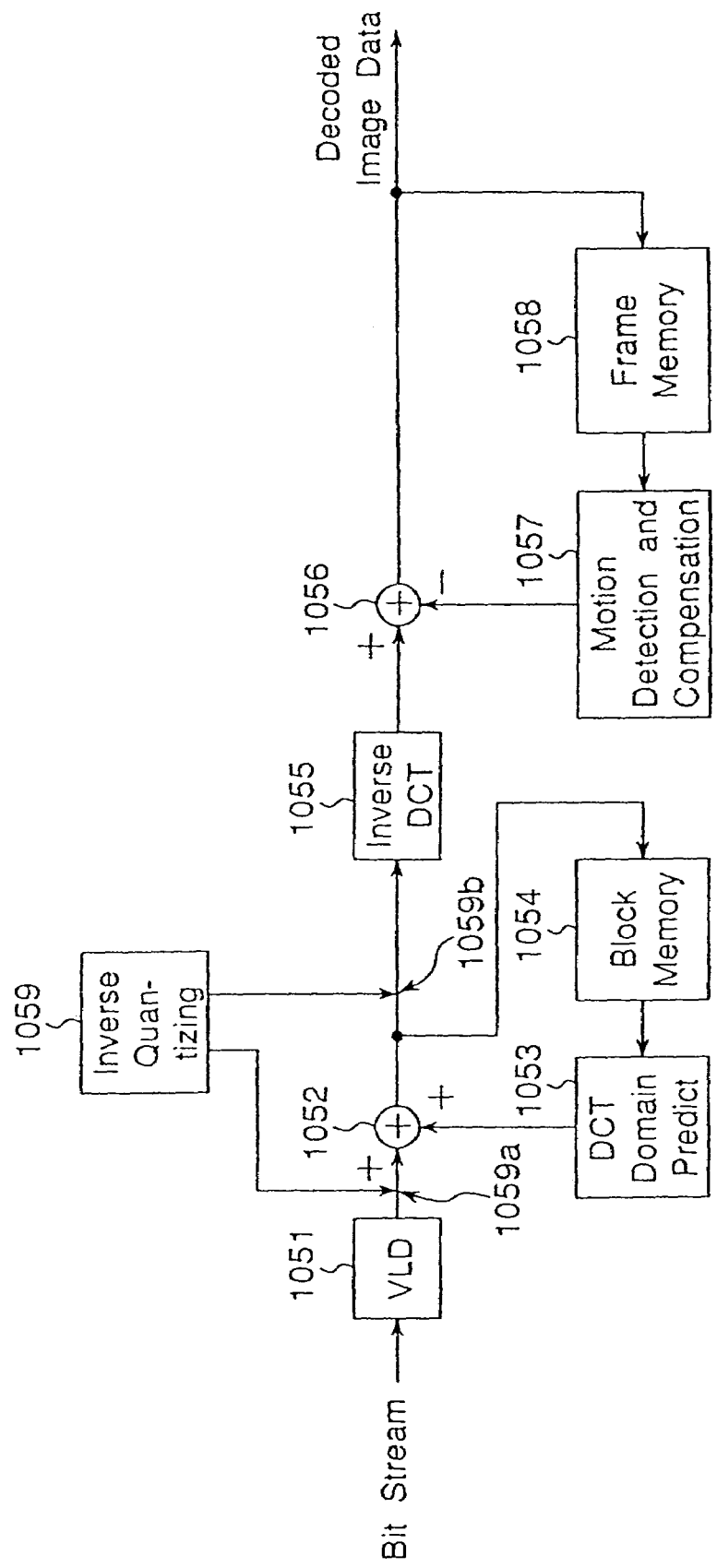
FIG. 20 is a block diagram showing a construction of an image predictive decoding apparatus according to a seventh preferred embodiment of the present invention.

FIG. 20 is a block diagram showing a construction of an image predictive decoding apparatus according to a seventh preferred embodiment of the present invention.

In FIG. 20, the bit stream from the image predictive coding apparatus is inputted to an entropy VLD decoding unit 1051 and decoded in a variable length decoding manner. The decoded image data is added to the image data of the preceding adjacent DCT transform block from a DCT transform domain predicting unit 1053, thereby restoring the image data of the DCT transform block. The preceding adjacent DCT transform block is identified by an indication bit taken out of the bit stream and used for prediction in the unit 1053. The reference numeral 1054 denotes a block memory for storing therein the adjacent DCT transform block to be used for prediction. A restored DCT transform block obtained from an adder 1052 is outputted to an inverse DCT transform unit 1055. The inverse DCT transform unit 1055 executes an inverse DCT transform process on the inputted DCT transform block to generate image data of the restored DCT transform coefficients and output the data to an adder 1056. The adder 1056 adds the restored image data from the inverse DCT transform unit 1055 to the image data of the preceding frame from a motion detecting and compensating unit 1057, thereby generating image data which has undergone motion detection, compensation and decoding and outputting the data. The decoded image data is temporarily stored in a frame memory for storing therein image data of the preceding frame for the motion detection and compensation and thereafter outputted to the motion detecting and compensating unit 1057. The motion detecting and compensating unit 1057 executes the motion detecting and compensating process on the inputted image data.

Further, the decoded image data outputted from the adder 1056 is inversely restored in correspondence with the processes of block sampling units 1012 and 1026 of FIG. 16 and FIG. 17, so that the original image data is restored.

Further, the reference numeral 1059 denotes an inverse quantizing unit. When the DCT transform domain predicting process is executed before the quantizing process as shown in FIG. 17, the inverse quantizing unit 1059 is inserted in a position 1059a shown in FIG. 20. When the DCT transform domain predicting process is executed after the quantizing process as shown in FIG. 16, the inverse quantizing unit 1059 is inserted in a position 1059b shown in FIG. 20.

Figure 21:
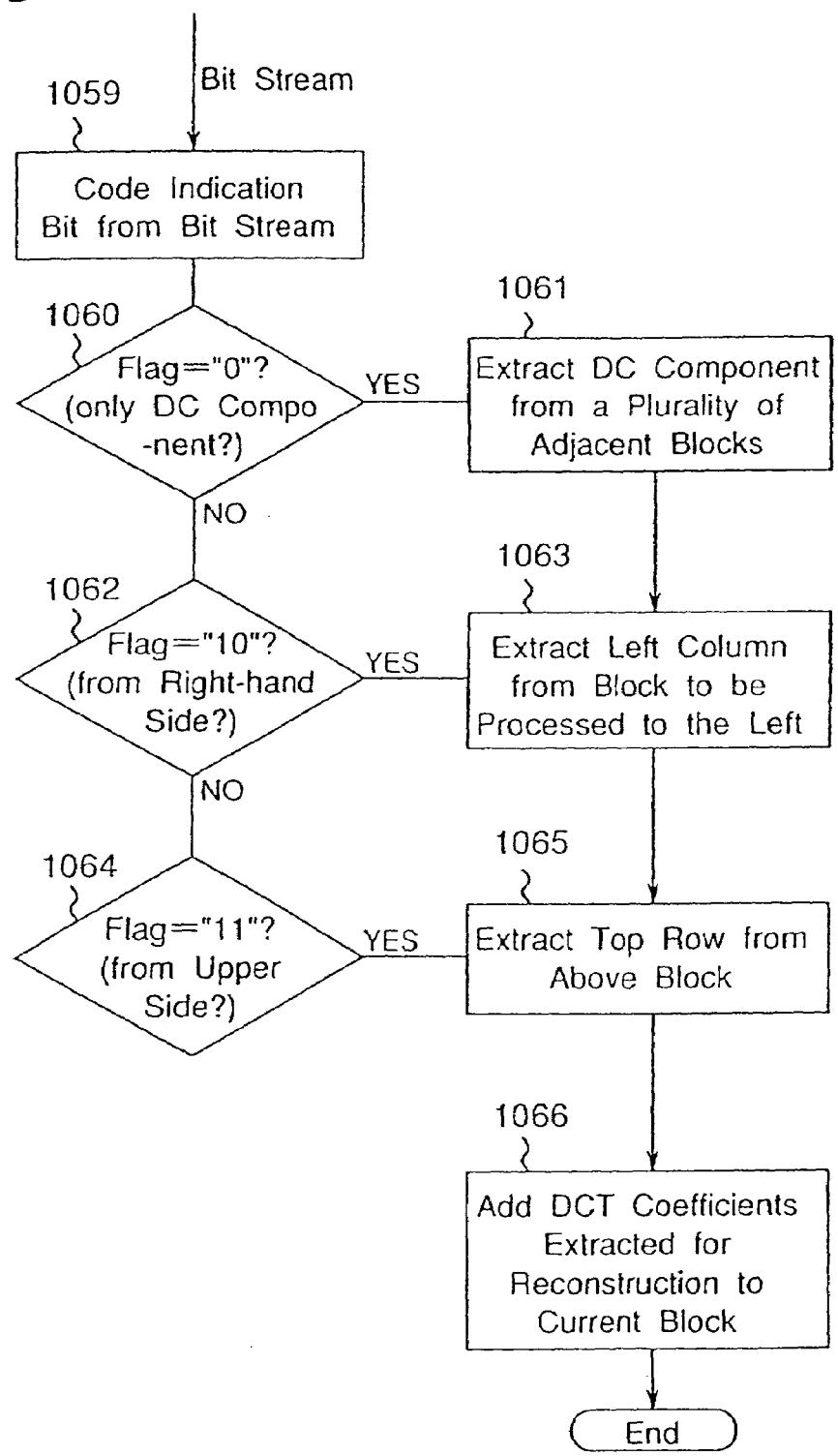
FIG. 21 is a flowchart showing a DC/AC predictive decoding method of the image predictive decoding apparatus of FIG. 20.

FIG. 21 is a flowchart showing a DC/AC predictive decoding method of the image predictive decoding apparatus of FIG. 20. That is, FIG. 21 shows a detail of bit stream decoding for obtaining a DC/AC prediction mode and reconstructing DCT transform coefficients from an adjacent DC/AC prediction value.

First of all, in Step 1059, the indication bit is decoded from the inputted bit stream, and the flag of the indication bit is checked in Step 1060. When it is "0", a DC value is calculated from the average value of the image data of the block located on the upper side and the block located on the left-hand side in Step 1061, and the program flow proceeds to Step 1063. When the answer is NO in Step 1060, the program flow proceeds to Step 1062. When the designator flag checked in Step 1062 is "10", the image data of the left-hand column of the block located on the left-hand side is extracted in Step 1063, and the program flow proceeds to Step 1065. When the answer is NO in Step 1062, the program flow proceeds to Step 1064. When the indicator flag checked in Step 1064 is "11", the image data of the top row of the block located on the upper side is extracted in Step 1065, and the program flow proceeds to Step 1066. Finally, in Step 1066, the DCT transform coefficients obtained or extracted in Steps 1061, 1063 or 1065 is added to the corresponding DCT transform coefficients of the current block.

Further, a modification example of the present preferred embodiment group will be described below.

(a) The above-mentioned block sampling units 1012 and 1026 may include an interleaving process for alternately inserting pixels so that the pixels in a two-dimensional array in the group of four blocks are comprised of odd-numbered pixels located in the odd-numbered rows in the first block, the pixels are comprised of even-numbered pixels located in the odd-numbered rows in the second block, the pixels are comprised of the odd-numbered pixels located in the even-numbered rows in the third block and the pixels are comprised of the even-numbered pixels located in the even-numbered rows in the fourth block.

(b) It is acceptable to select the above-mentioned prediction block from the blocks which have been previously restored, stored in the above-mentioned block memory and located adjacently to the coded current block and select all the transform coefficients in the block.

(c) It is acceptable to select the above-mentioned prediction block from the blocks which have been previously restored, stored in the above-mentioned block memory and located adjacently to the coded current block and select a predetermined subset as the transform coefficients of the block.

(d) It is acceptable to select the above-mentioned prediction block from the blocks which have been previously restored, stored in the above-mentioned block memory and located upwardly and leftwardly adjacent to the coded current block, use only the transform coefficients of the top row of the block and the leftmost column of the block and set the remaining transform coefficients to zero.

(e) It is acceptable to select the above-mentioned prediction block from the blocks which have been previously restored, stored in the above-mentioned block memory and located in the vicinity of the coded current block and weight the transform coefficients of the blocks by different weighting functions.

(f) It is acceptable to select the above-mentioned prediction block from the blocks which have been previously restored, stored in the above-mentioned block memory and located in the vicinity of the coded current block and execute a transform computation on the transform coefficients of the blocks.

(g) It is acceptable to obtain the above-mentioned prediction block through weighted averaging of a plurality of blocks which have been previously restored, stored in the above-mentioned block memory and located in the vicinity of the coded current block.

(h) It is acceptable to execute an inverse interleaving process on the above-mentioned decoded image data when restoring the original image data by forming pixels in a two-dimensional array from a plurality of groups each comprised of four interleaved blocks based on the decoded image data so that the odd-numbered pixels located in the odd-numbered rows are all obtained from the first block, even-numbered pixels located in the odd-numbered rows are obtained from the second block, the odd-numbered pixels located in the even-numbered rows are obtained from the third block and even-numbered pixels located in the even-numbered rows are obtained from the fourth block.

As described above, according to the present preferred embodiment group of the present invention, a great effect can be produced for the removal or reduction of the redundancy in the DCT transform domain between adjacent blocks, and consequently the number of bits to be used is reduced, eventually allowing the coding efficiency to be remarkably improved. Referring to FIG. 18 as a detailed example of the image predictive coding apparatus, the predicting process is preferably executed merely by using the adjacent block located on the upper side or the left-hand side.

In regard to a sequence including QCIF, bits can be saved by 6.4% in high order bit rate coding, and bits can be saved by 20% in low order bit rate coding. Further, bits can be saved by about 10% in another QCIF sequence such as the test sequence of, for example, Akiyo, Mother, Daughter or the like. Furthermore, more bits can be saved in CIF and CCIR sequences.

As described above, according to the second preferred embodiment group of the present invention, novel image predictive coding apparatus and image predictive decoding apparatus which increase the coding efficiency at the present timing can be provided. The present apparatuses require no complicated device operable to increasing the coding efficiency, and their circuit constructions are very simple and easily formed.

Third Preferred Embodiment Group

The third preferred embodiment group includes an eighth preferred embodiment.

In view of the problems of the prior arts, the present inventor has considered a further improvement of the redundancy by reducing not only the redundancy between two images or the inside of a block in one image but also the redundancy between the blocks in an image and making the block scan pattern more appropriate.

It has been discovered that DCT transform coefficients in adjacent blocks closely resemble each other in many cases when located in the same positions. In a case where the properties of the two blocks of the original image closely resemble each other, or when they include same horizontal or vertical line, diagonal line or another image pattern, the above-mentioned fact can be considered correct. From the viewpoint of information theory, identical information means a redundancy.

The redundancy existing in the DCT transform domain over a block can be removed or reduced by adaptability prediction of the preceding block. This fact produces the result that the VLC entropy coding can achieve a higher coding efficiency for the smaller entropy of a prediction error signal.

At the same time, it has been known that important DCT transform coefficients are concentrated on the transform blocks located in the leftmost column and the top row in the horizontal and vertical structures. Therefore, the preferred embodiment of the present invention can solve the above-mentioned problems in the coefficient scan by making scan adaptable based on a prediction mode.

The preferred embodiment of the present invention provides a method for adaptively predicting the DCT transform coefficients of the current block from another block, consequently removing the redundancy between adjacent blocks. Prediction error information can be further reduced by making a scan method adaptable to the prediction mode in which the entropy of the DCT transform coefficients are made smaller. As a result, the number of bits for coding the DCT transform coefficients can be reduced.

In an attempt at solving this problem, a method for executing the determination of the prediction mode is obtained on the basis of the actual bit rate generated by each prediction and scan method.

The preferred embodiment of the present invention provides a method for predicting the DCT transform coefficients of the current block. DCT transform tends to give an identical value or an identical distribution of the DCT transform coefficients to the image data of an identical block, and therefore, the current block normally keeps a satisfactory mutual relationship with the DCT transform coefficients in the other adjacent blocks.

Inputted image data is of an intra-frame or temporarily predicted frame. First of all, the inputted image data is subjected to a DCT transform process which is normally based on a block. After the DCT transform coefficients of the current block is obtained, the prediction of the DCT transform domain can be executed before or after quantization.

Figure 23:
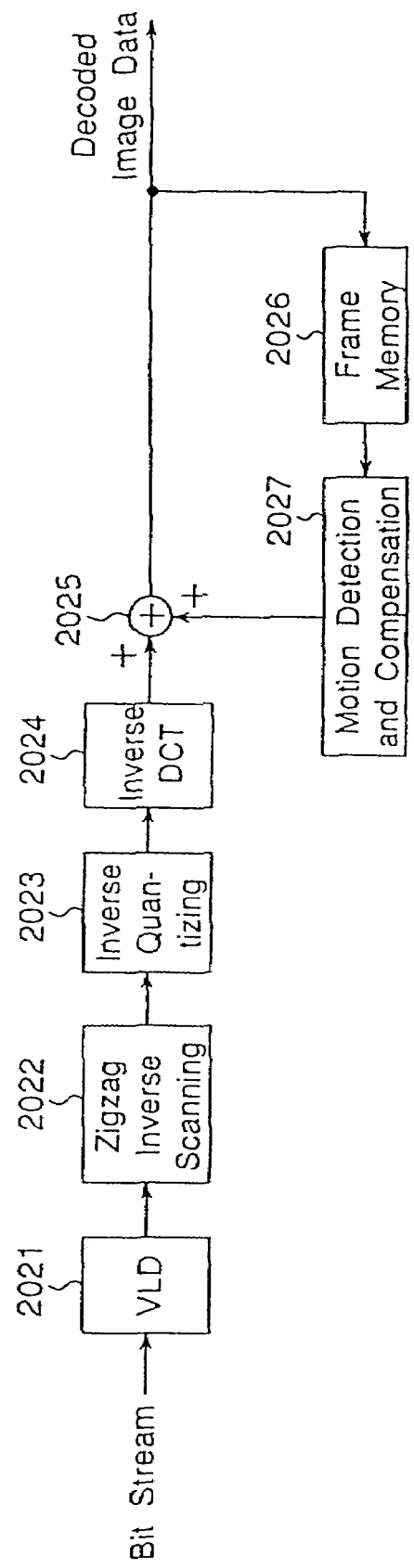
FIG. 23 is a block diagram showing a construction of a prior art image predictive decoding apparatus.

The DCT transform coefficients in the current block can be predicted from the preceding adjacent block located diagonally (obliquely) on the upper left-hand side. They have been already decoded at the time as shown in FIG. 23. For the predicted block, a predicted error signal is generated by subtracting one or more DCT transform coefficients of the preceding adjacent block from the DCT transform coefficients in the same position of the current block.

A prediction error signal in a varied mode is quantized if a prediction is made before the quantizing process. The quantized prediction error signal is scanned for a sequence (series) of image data before entropy coding is executed. A block predicted on the basis of the least bit use rule, i.e., the prediction block having the least amount of bits is selected. Coded data of this block is transmitted to an image predictive decoding apparatus together with a prediction mode to be used.

The image predictive decoding apparatus decodes the predicted block by means of the used prediction mode and the coded data of the block. After the coded data of the block is subjected to inverse entropy decoding, the quantized prediction error is inversely scanned according to a scan mode to be used. If the quantizing process is executed after the predicting process, the block is inverse quantized. The reconstructed block can be obtained by adding the DCT transform coefficients in the previously decoded adjacent block designated by the prediction mode to the current DCT transform coefficients. When the quantizing process is executed before the predicting process, the reconstructed coefficients are inverse quantized. Finally, the inverse DCT transform process is applied to the DCT transform coefficients reconstructed for each block, so that a decoded image can be obtained.

The preferred embodiment of the present invention provides image predictive coding apparatus and image predictive decoding apparatus which reduce the redundancy existing in the DCT transform domain over the adjacent block.

Eighth Preferred Embodiment

Figure 22:
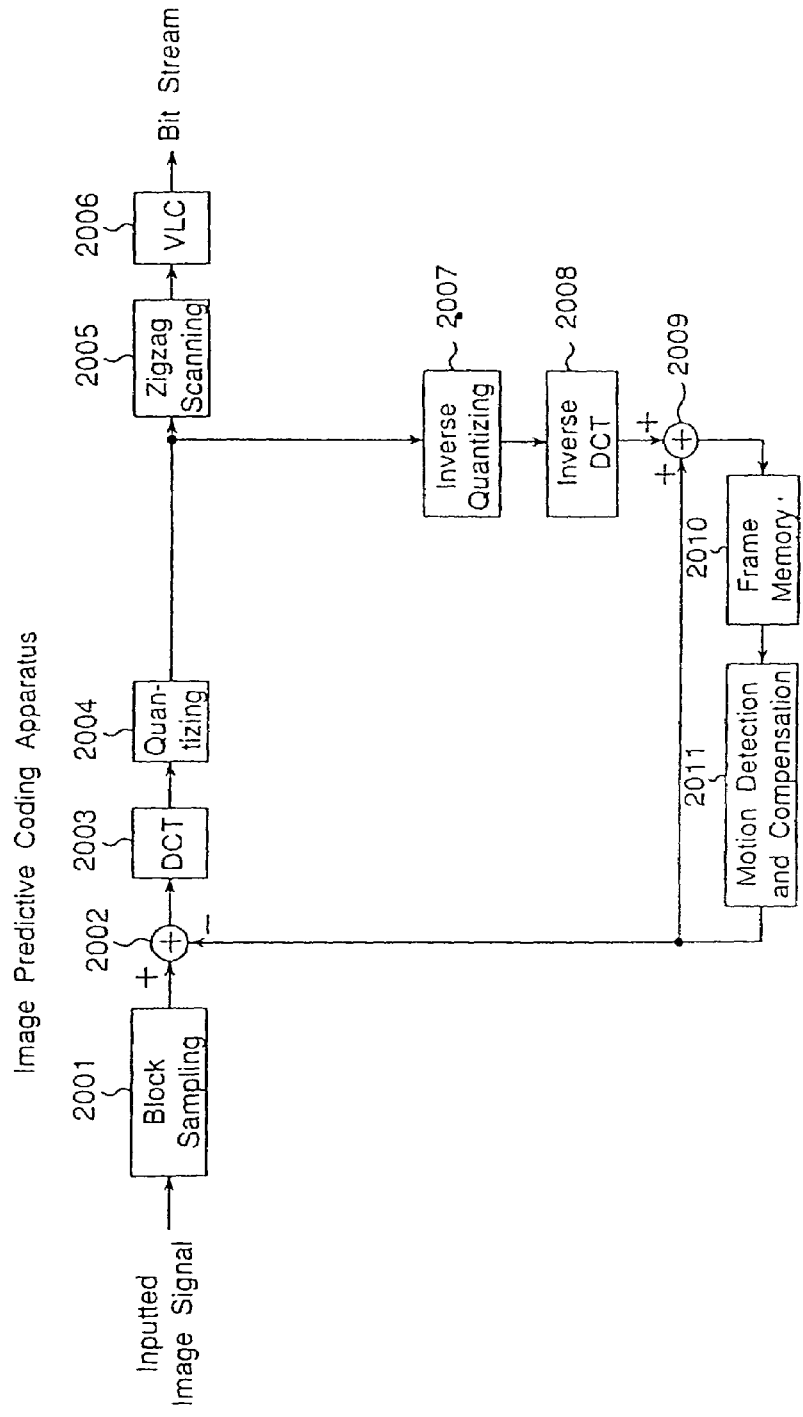
FIG. 22 is a block diagram showing a construction of a prior art image predictive coding apparatus.
Figure 24:
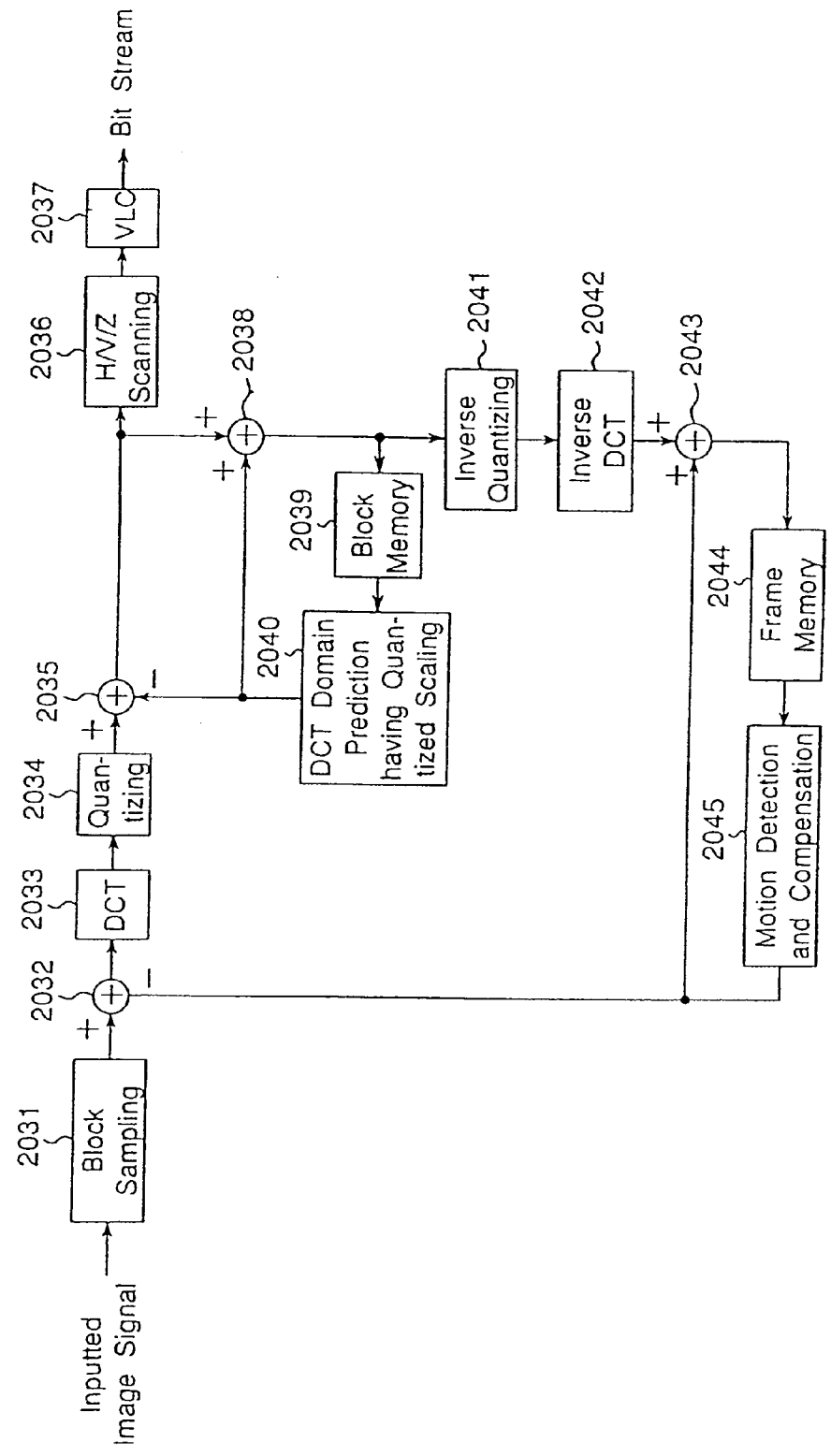
FIG. 24 is a block diagram showing a construction of an image predictive coding apparatus according to an eighth preferred embodiment of the present invention.

FIG. 24 is a block diagram showing a construction of an image predictive coding apparatus according to an eighth preferred embodiment of the present invention. In comparison with the prior art image predictive coding apparatus of FIG. 22, the image predictive coding apparatus of FIG. 24 is characterized by the provision of (a) an adder 2035;
(b) an H/V/Z scan unit 2036;
(c) an adder 2038;
(d) a block memory 2039; and
(e) a DCT transform domain predicting unit 2040 having a quantization scaling.

According to the intra-frame coding (coding inside a frame), an inputted image signal is subjected to a block sampling process in a unit 2031 and thereafter subjected directly to a DCT transform process in a unit 2033. Then, the DCT transform coefficients outputted from the DCT transform unit 2033 is subjected to a quantizing process in a unit 2034. On the other hand, according to the inter-frame coding or inter-frame coding (prediction frame coding), after a block sampling process in the unit 2031, an adder 2032 subtracts image data outputted from a motion detecting and compensating unit 2045 from the image data obtained after the block sampling process, thereby obtaining prediction error data. Then, the prediction error data is outputted to the adder 2035 via the DCT transform unit 2033 for executing the DCT transform process and the quantizing unit 2034 for executing the quantizing process. The DCT transform coefficients are predicted through a DCT transform domain process in the unit 2040, and the predicted DCT transform coefficients are inputted to the adder 2035. The adder 2035 subtracts the predicted DCT transform coefficients obtained from the DCT transform domain predicting unit 2040 from the DCT transform coefficients obtained from the quantizing unit 2034 and outputs the DCT transform coefficients of the prediction error of the subtraction result to the H/V/Z scan unit 2036 and the adder 2038. The H/V/Z scan unit 2036 adaptively executes a horizontal scan, a vertical scan or a zigzag scan on the inputted DCT transform coefficients depending on the selected prediction mode and outputs the DCT transform coefficients obtained after the scan process to an entropy VLC coding unit 2037. Then, the entropy VLC coding unit 2037 executes the entropy VLC coding process on the inputted DCT transform coefficients and transmits the coded bit stream to the image predictive decoding apparatus on the receiving side or the reproducing side.

The adder 2038 adds the quantized DCT transform coefficients outputted from the adder 2035 to the predicted DCT transform coefficients from the DCT transform domain predicting unit 2040, thereby obtaining restored quantized DCT transform coefficient data. The quantized DCT transform coefficient data is outputted to the block memory 2039 and an inverse quantizing unit 2041.

In the local decoder provided in the image predictive coding apparatus, the restored DCT transform coefficient data from the adder 2038 is temporarily stored into the block memory 2039 for storing therein the data of one block for the execution of the next prediction and thereafter outputted to the DCT transform domain predicting unit 2040. The inverse quantizing unit 2041 inverse quantizes the inputted quantized DCT transform coefficients and outputs the resultant to an inverse DCT transform unit 2042. Then, the inverse DCT transform unit 2042 executes the inverse DCT transform process on the inputted restored DCT transform coefficients to thereby restore the image data of the block at the present timing and then output the resulting data to an adder 2043.

According to the inter-frame coding, in order to generate locally decoded image data, the adder 2043 adds image data which has undergone motion detection and compensation in the motion detecting and compensating unit 2045 to the restored image data from the inverse DCT transform unit 2042 to thereby obtain locally decoded image data, and the data is stored into a frame memory 2044 of the local decoder. It is to be noted that the construction and processes of the adder 2043, the frame memory 2044 and the motion detecting and compensating unit 2045 are similar to those of the units 2009, 2010 and 2011 of the prior art of FIG. 22.

Finally, a bit stream is outputted from the entropy coding unit 2037 and transmitted to an image predictive coding apparatus.

Figure 25:
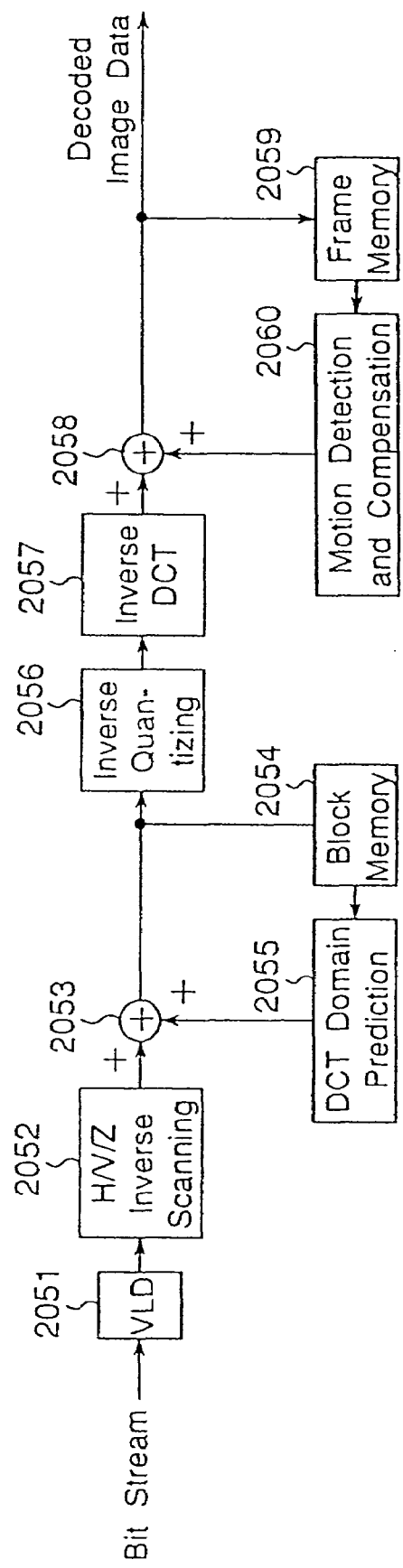
FIG. 25 is a block diagram showing a construction of an image predictive decoding apparatus according to the eighth preferred embodiment of the present invention.

FIG. 25 is a block diagram showing a construction of an image predictive decoding apparatus according to the eighth preferred embodiment of the present invention. In comparison with the prior art image predictive decoding apparatus of FIG. 23, the image predictive decoding apparatus of FIG. 25 is characterized by the provision of:

(a) an H/V/Z scan unit 2052;
(b) an adder 2053;
(c) a DCT transform domain predicting unit 2055; and
(d) a block memory 2054.

In FIG. 25, the bit stream from the image predictive coding apparatus is decoded in a variable length decoder unit 2051. The decoded data is inputted to the H/V/Z scan unit 2052 and scanned horizontally in the reverse direction, vertically in the reverse direction or in a zigzag manner in the reverse direction depending on the scan mode. The data obtained after the scan process is inputted to the adder 2053, and the adder 2053 adds the data obtained after the reverse scan process to prediction error data from the DCT transform domain predicting unit 2055 to thereby obtain decoded DCT transform coefficient data and store this into the block memory 2054. Then, an inverse quantizing unit 2056 inverse quantizes the inputted coded DCT transform coefficient data to thereby obtain inverse quantized DCT transform coefficient data and output the data to an inverse DCT transform unit 2057. The inverse DCT transform unit 2057 executes an inverse DCT transform process on the inputted DCT transform coefficient data to thereby restore the original image data and then output the data to an adder 2058. According to the inter-frame coding, the adder 2059 adds image data from the inverse DCT transform unit 2057 to prediction error data from a motion detecting and compensating unit 2060 to thereby obtain locally decoded image data, output the data to an external device and store the same into a frame memory 2059.

Further, the decoded image data outputted from the adder 2058 is subjected to an inverse restoring process corresponding to the process of the block sampling unit 2031 of FIG. 24, so that the original image data is restored.

In the above preferred embodiment, the quantizing process is executed prior to the predicting process. According to a modification example, the quantizing process may be executed after the predicting process. In this case, in the local decoder and the image predictive decoding apparatus, the inverse quantizing process is executed before the prediction value is added. The other details are all similar to those of the above-mentioned preferred embodiment.

Figure 26:
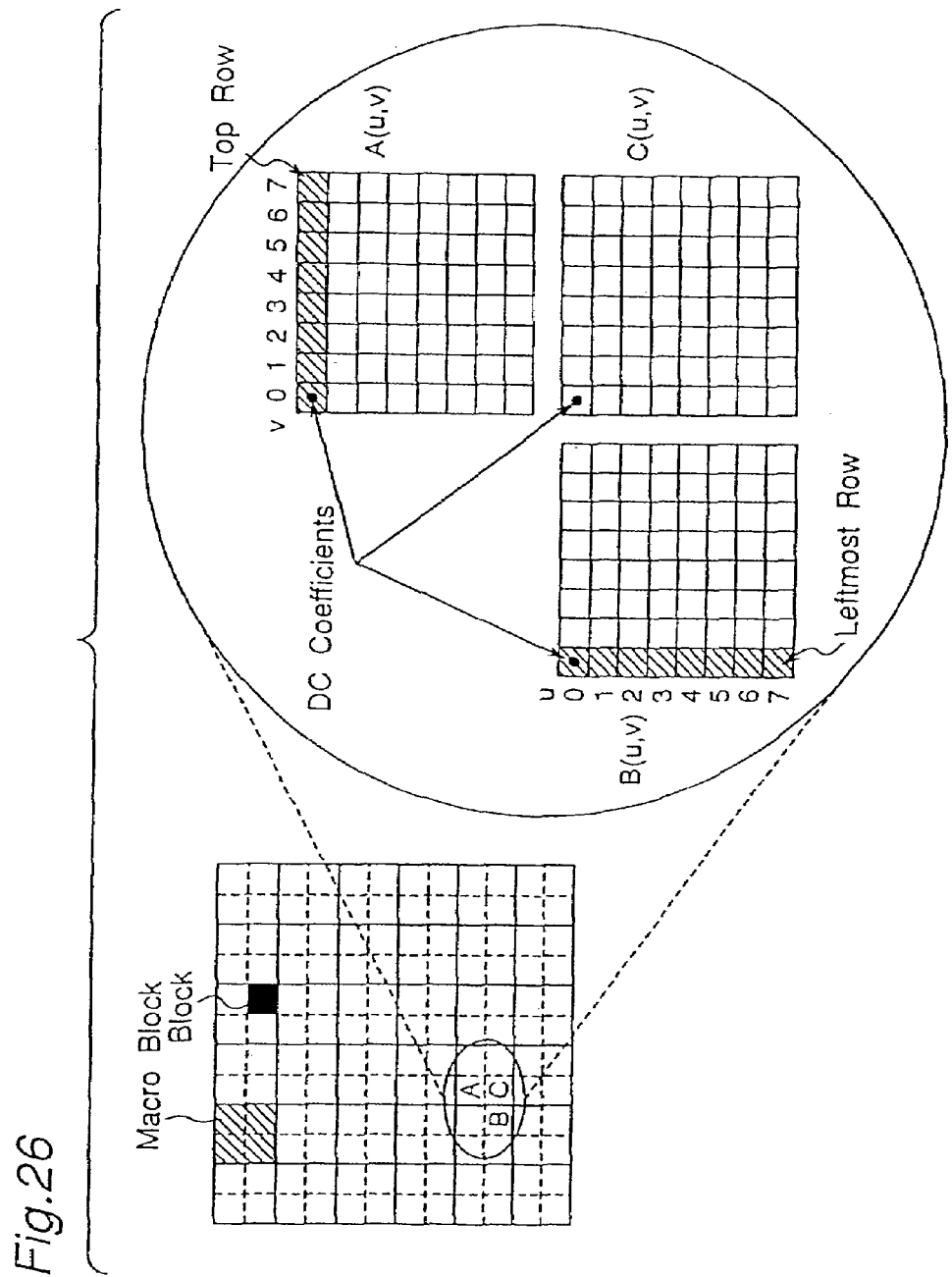
FIG. 26 is a schematic view of an image showing a constructions of a macro block and blocks of a frame as well as a block predicting method.

FIG. 26 is a schematic view of an image showing a constructions of a macro block and blocks of a frame obtained through the block division as well as a block predicting method according to the eighth preferred embodiment. The enlarged view of FIG. 26 shows how the prediction data for the current block is coded. In this case, a block C(u,v) is obtained from an upwardly adjacent block A(u,v) and a leftwardly adjacent block B(u,v). This preferred embodiment of the present invention will be described in more detail next.

C1. Coefficient Number Used for Prediction

The coefficient number used for prediction depends on the sequence of image data. A flag AC_Coeff is used for adaptively selecting the optimum number of coefficients to be used for each image. The flag is shown in Table 2 provided below and transmitted as part of side information from an image predictive coding apparatus to an image predictive decoding apparatus. The fixed length code and FLC for the flag AC_Coeff are shown in Table 2. In this case, FLC (Fixed Length Coding) is a reversible coding for assigning fixed length code words for expressing all the possible events.

TABLE 2

Fixed Length Code FLC for Flag AC_Coeff

| Index | AC_Coeff (used for Prediction) | FLC |
|---|---|---|
| 0 | DC Only | 000 |
| 1 | DC + AC1 | 001 |
| 2 | DC + AC1 + AC2 | 010 |
| 3 | DC + AC1 + AC2 + AC3 | 011 |
| 4 | DC + AC1 + AC2 + AC3 + AC4 | 100 |
| 5 | DC + AC1 + AC2 + AC3 + AC4 + AC5 | 101 |
| 6 | DC + AC1 + AC2 + AC3 + AC4 + AC5 + AC6 | 110 |
| 7 | DC + AC1 + AC2 + AC3 + AC4 + AC5 + AC6 + AC7 | 111 |

In this case, ACn is A(0, n) or B(n, 0) depending on the mode to be used

According to the specific case of the this preferred embodiment, all the AC coefficients located in the top row and the leftmost column are used for the prediction. In this case, no flag is required when both the image predictive coding apparatus and the image predictive decoding apparatus agree with this default value.

C2. Scaling of Quantization Step

When an adjacent block is quantized with a quantization step size different from that of the current block, the prediction of AC coefficients is not so efficient. Therefore, by the predicting method, prediction data is deformed so as to be scaled according to the ratio of the quantization step size of the current block at the present timing to the quantization step of the prediction data block. This definition is given by the equations in the following section C3.

C3. Prediction Mode

A plurality of modes to be set are as follows.

(a) Mode 0: DC prediction from the block located on the upper side of the block to be abbreviated as "UpwardDC Mode").

$$E_0(0,0)=C(0,0)-A(0,0), E_0(u,v)=C(u,v) \quad (7)$$

(b) Mode 1: DC prediction from the block located on the left-hand side of the block to be processed (abbreviated as "Leftward DC Mode").

$$E_1(0,0)=C(0,0)-B(0,0),$$

$$E_1(u,v)=C(u,v) \quad (8)$$

(c) Mode 2: DC/AC prediction from the block located on the upper side of the block to be processed (abbreviated as "Upward DC/AC Mode").

$$E_2(0,0)=C(0,0)-A(0,0),$$

$$E_2(0,v)=C(0,v)-A(0,v)-Q_A/Q_C, v=1,2,\ldots,AC\_Coeff$$

$$E_2(u,v)=C(u,v) \quad (9)$$

(d) Mode 3: DC/AC prediction from the block located on the left-hand side of the block to be processed (abbreviated as "Leftward DC/AC Mode").

$$E_3(0,0)=C(0,0)-B(0,0),$$

$$E_3(u,0)=C(u,0)-B(u,0) \cdot QB/QC\ u=1,2,\ldots,AC\_Coeff,$$

$$E_3(u,v)=C(u,v) \quad (10)$$

C4. Adaptive Horizontal/Vertical/Zigzag Scan

If the above four prediction modes are given, the efficiency of the intra-frame coding can be further improved by adopting a coefficient scan.

FIG. 27, FIG. 28 and FIG. 29 are schematic views for explaining the sequence of a horizontal scan, a vertical scan and a horizontal scan used for the coefficient scan of the eighth preferred embodiment. In this case, these scans are collectively referred to as H/V/Z scan.

C5. Determination of Explicit Mode

In determining an explicit mode, determination of the prediction mode is executed in the image predictive coding apparatus, and the determination information is explicitly transmitted from the image predictive coding apparatus to the image predictive decoding apparatus by means of several pieces of coded bit information of the bit stream.

Figure 30:
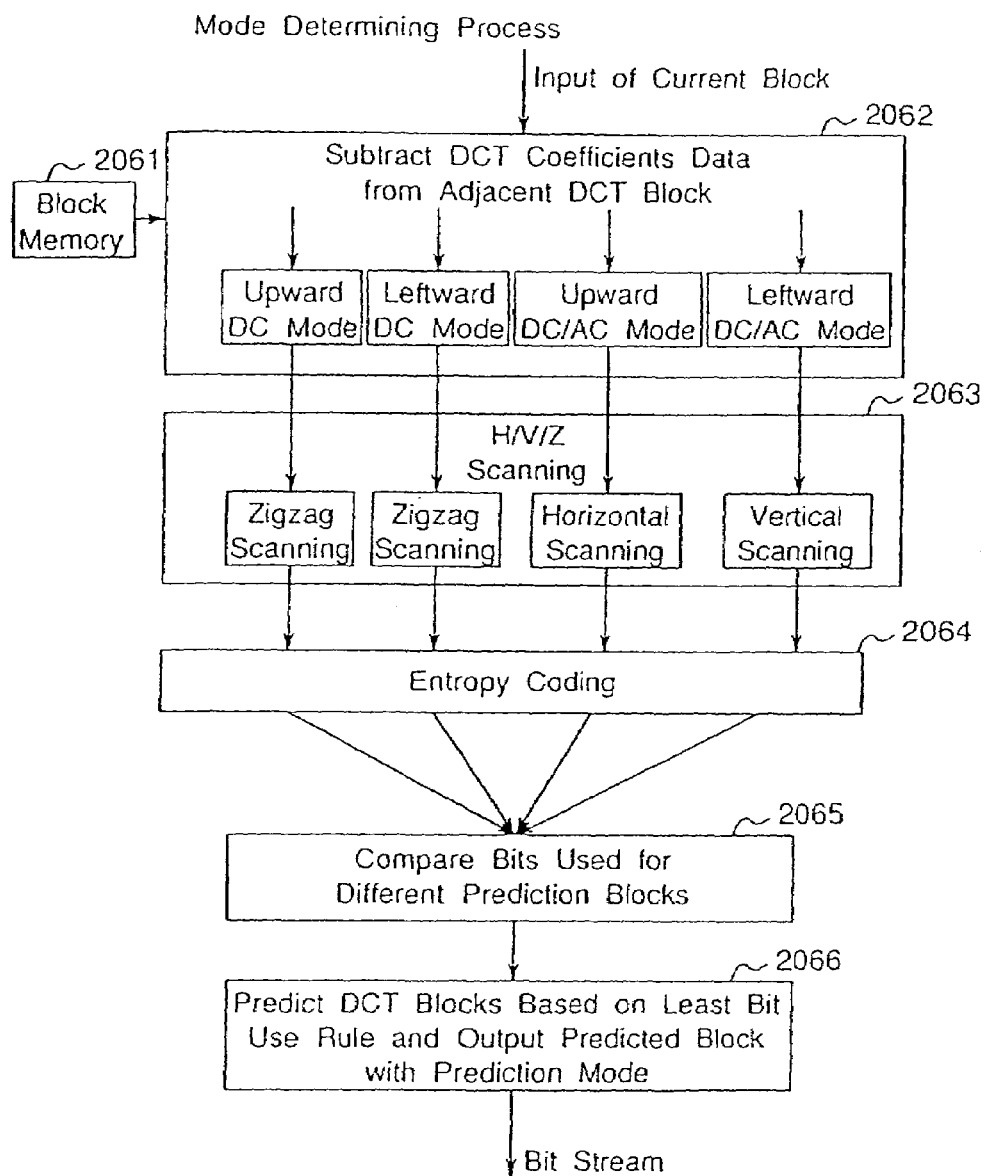
FIG. 30 is a flowchart showing a mode determining process used in the eighth preferred embodiment.

FIG. 30 is a flowchart showing a mode determining process used for the eighth preferred embodiment.

In FIG. 30, DCT transform coefficient data of the current block is inputted to a unit 2062, and the unit 2062 subtracts the inputted DCT transform coefficient data of the current block from the DCT transform coefficient data of the adjacent block obtained from a block memory 2061, thereby executing a DCT transform predicting process. In the unit 2062, the DCT transform predicting process is executed in the four modes described in the section C3. Then, the coefficient scan process is executed in an H/V/Z scan unit 2063, and in this case, the respectively corresponding scan processes described in the section C4. are executed as shown in FIG. 30. Further, the DCT transform coefficient data obtained after the scan process is transmitted to an entropy coding unit 2064 in which the variable length coding process is executed. Then, in a unit 2065, all the bits generated in different modes are compared with one another, and a unit 2066 selects the block of the DCT transform coefficients of the prediction mode which generates the least amount of bits. The bits of these DCT transform coefficient data are transmitted as a bit stream from the unit 2066 to the image predictive decoding apparatus together with a prediction mode value. It is to be noted that the prediction mode is coded with the fixed length codes shown in the following Table 3.

TABLE 3

FLC Table for DC/AC/Scan Mode

| Index | DC/AC Mode | Scan Mode | FLC code |
|---|---|---|---|
| 0 | Upward DC | Zigzag Scan | 00 |
| 1 | Leftward DC | Zigzag Scan | 01 |
| 2 | Upward (DC + AC) | Horizontal Scan | 10 |
| 3 | Leftward (DC + AC) | Vertical Scan | 11 |

C6. Determination of Implicit Mode

According to a second preferred embodiment of the mode determination, the image predictive coding apparatus and the image predictive decoding apparatus commonly own an identical prediction mode determining function. The image predictive coding apparatus and the image predictive decoding apparatus cooperatively determine the directionality concerning the determination of the prediction mode based on the DC coefficients values of a decoded block adjacent to the current block. That is, according to the determination in the implicit mode, the determination in the implicit mode is executed in the image predictive coding apparatus and the image predictive decoding apparatus by several rules. Then, additional information data representing the mode determination is not transmitted from the image predictive coding apparatus to the image predictive decoding apparatus.

Figure 31:
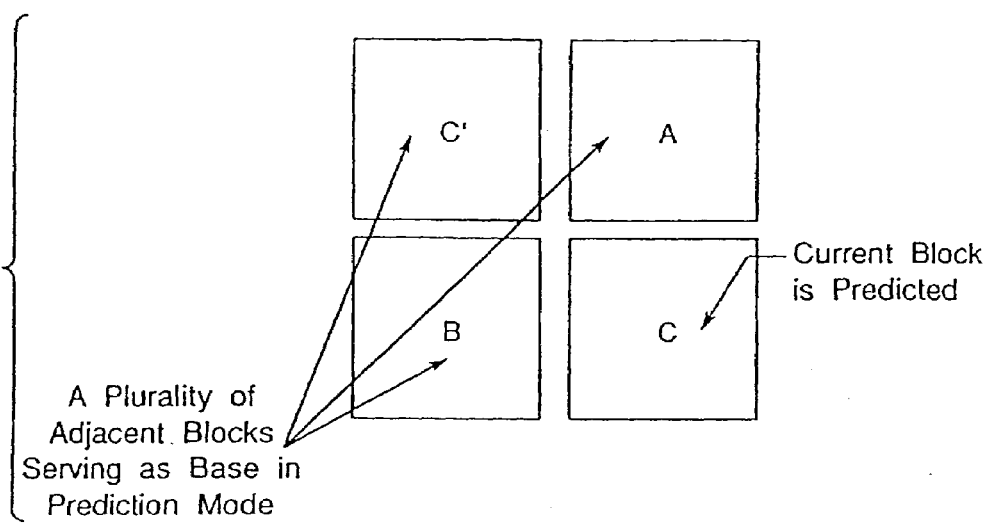
FIG. 31 is a schematic view of an image showing a relationship between blocks according to implicit mode determination of the eighth preferred embodiment.

FIG. 31 is a schematic view of an image showing a relationship between blocks according to the implicit mode determination of the eighth preferred embodiment. That is, FIG. 31 shows a positional relationship between blocks and the objective current block to be predicted.

In FIG. 31, a block C is the current block to be processed which is currently predicted. A block A is the block located on the upper side of the current block C being predicted. A block C is the block located on the left-hand side of the current block C. A block C' is the block that is located diagonally to the current block C and between the block A and the block B.

First of all, the DC direction is determined. It is determined whether or not the AC coefficients are similarly predicted according to an individual determining method. For executing this, the sum total of the differences between the absolute values of prediction coefficients is compared with the absolute value of non-prediction coefficients and they are determined which is smaller. One bit is used for this designation to the image predictive decoding apparatus. For determining whether or not the directionality of DC prediction and AC coefficients are predicted, the following equations are used.

Table 3 shows the possible four conclusions summarized.

(A1) If $$(B(0,0)-C'(0,0) < C'(0,0)-A(0,0)) \tag{11}$$

then there holds $$E(0,0)=C(0,0)-A(0,0) \tag{12}$$

and
(a1) if $$\left(\sum_{v=1}^{7} C(0,v) \geq \sum_{v=1}^{7} C(0,v) - A(0,v)\right) \tag{13}$$

then $$E(0,v)=C(0,v)-A(0,v) \cdot Q_A/Q_C, v=1,\ldots,7 \tag{14}$$

or
(a2) if the above equation (13) does not hold, then $$E(0,v)=C(0,v) \tag{15}$$

(A2) If the above equation (11) does not hold, then $$E(0,0)=C(0,0)-B(0,0) \tag{16}$$

and
(b1) if $$\left(\sum_{v=1}^{7} C(u,0) \geq \sum_{v=1}^{7} C(u,0) - B(u,0)\right) \tag{17}$$

then $$E(u,0)=C(u,0)-B(u,0) \cdot Q_B/Q_C, v=1,\ldots,7 \tag{18}$$

or
(b2) if the above equation (17) does not hold, then $$E(u,0)=C(u,0) \tag{19}$$

Further, in regard to all the other coefficients, there holds $$E(u,v)=C(u,v) \tag{20}$$

TABLE 4

FLC Table for DC/AC Scan Mode by Implicit Determination

| FLC Code | Implicit Determination | DC/AC Mode | Scan Mode |
|---|---|---|---|
| 00 | \|B (0, 0) − C' (0, 0)\| < \|C' (0, 0) − A (0, 0)\| | Upward DC | Zigzag Scan |
| 01 | \|B (0, 0) − C' (0, 0)\| ≧ \|C' (0, 0) − A (0, 0)\| | Leftward DC | Zigzag Scan |
| 10 | \|B (0, 0) − C' (0, 0)\| < \|C' (0, 0) − A (0, 0)\| | Upward DC | Horizontal Scan |
| 11 | \|B (0, 0) − C' (0, 0)\| ≧ \|C' (0, 0) − A (0, 0)\| | Leftward (DC + AC) | Vertical Scan |

In the above eighth preferred embodiment, the DCT transform coefficients predicting process is executed on the quantized transform coefficient data by the unit 2040. However, the present invention is not limited to this, and the process may be executed on transform coefficient data that is not quantized in a manner similar to that of the sixth preferred embodiment of FIG. 17. In this case, in the corresponding image predictive decoding apparatus, shown in FIG. 25, the inverse quantizing unit 2056 is shifted to be inserted between the H/V/Z scan unit 2052 and the adder 2053.

A modification example of the eighth preferred embodiment will be described below.

(a) The block sampling unit 2031 may include an interleaving process for alternately inserting pixels so that the pixels in a two-dimensional array in the group of four blocks are comprised of odd-numbered pixels located in the odd-numbered rows in the first block, the pixels are comprised of even-numbered pixels located in the odd-numbered rows in the second block, the pixels are comprised of the odd-numbered pixels located in the even-numbered rows in the third block and the pixels are comprised of even-numbered pixels located in the even-numbered rows in the fourth block.

(b) It is acceptable to select the above-mentioned prediction block from the blocks which have been previously restored, stored in the above-mentioned block memory and located adjacently to the coded current block and select all the coefficient data in the block.

(c) It is acceptable to select the above-mentioned prediction block from the blocks which have been previously restored, stored in the above-mentioned block memory and located adjacently to the coded current block and select a predetermined subset as the coefficient data of the block.

(d) It is acceptable to select the above-mentioned prediction block from the blocks which have been previously restored, stored in the above-mentioned block memory and located upwardly and leftwardly adjacent to the coded current block, use only the coefficient data of the top row of the block and the leftmost column of the block and set the remaining coefficient data to zero.

(e) It is acceptable to select the above-mentioned prediction block from the blocks which have been previously restored and stored in the above-mentioned block memory according to the above-mentioned criteria, and determine the use of only a subset including one or more pieces of coefficient data from the top row or the leftmost column of the block by executing a communication between the image predictive coding apparatus and the image predictive decoding apparatus.

(f) It is acceptable to select the above-mentioned prediction block from the blocks which have been previously restored and stored into the above-mentioned block memory according to the above-mentioned criteria, determine the use of only a subset including one or more pieces of coefficient data from the top row or the leftmost column by the image predictive coding apparatus and inform the image predictive decoding apparatus of a flag representing the determined number of subsets and pieces of coefficient data by periodically inserting them into the data to be transmitted to the image predictive decoding apparatus.

(g) It is acceptable to select the above-mentioned prediction block from the blocks which have been previously restored and stored into the above-mentioned block memory according to the above-mentioned criteria, and multiply the coefficient data of each block by a ratio equal to the ratio of the quantization step size of the current block to be coded to the quantization step size of the prediction block.

(h) It is acceptable to select the above-mentioned prediction block from the blocks which have been previously restored and stored into the above-mentioned block memory according to the above-mentioned criteria, and weight the coefficient data of each block by a varied weighting factor.

(i) It is acceptable to select the above-mentioned prediction block from the blocks which have been previously restored and stored into the above-mentioned block memory according to the above-mentioned criteria, and execute a predetermined transform computation on the coefficient data of each block.

(j) It is acceptable to obtain the above-mentioned prediction block through weighted averaging of the blocks which have been previously restored and stored into the above-mentioned block memory and located adjacently to the current block to be coded.

(k) The scan method may include at least one scan method of:

(i) a horizontal scan executed so that the coefficient data are scanned every row from left to right, started from the top row and ended in the lowermost row;

(ii) a vertical scan executed so that the coefficient data are scanned every column from the top row toward the lowermost row, started from the leftmost column and ended in the rightmost column; and (iii) a zigzag scan executed so that the coefficient data are diagonally scanned from the leftmost coefficient data in the top row toward the rightmost coefficient data in the lowermost row.

(l) It is acceptable to select the above-mentioned prediction block from the blocks which have been previously restored and stored into the above-mentioned block memory according to the above-mentioned criteria, make the prediction mode of the above-mentioned prediction block include at least one prediction mode of:

(i) a first mode in which only the top and leftmost coefficient data representing the average value of the block called a DC coefficient from the block located on the upper side of the objective current block to be processed are used for prediction;

(ii) a second mode in which only a DC coefficient from the block located on the left-hand side of the objective current block to be processed is used for prediction;

(iii) a third mode in which a DC coefficient and zero or more AC coefficients including high-frequency components from the top row of the block located on the upper side of the objective current block to be processed are used for prediction; and (iv) a fourth mode in which a DC coefficient and zero or more AC coefficients including high-frequency components from the leftmost column of the block located on the left-hand side of the objective current block to be processed are used for prediction and scan the coefficient data of the above-mentioned prediction error according to the zigzag scan method (m) It is acceptable to select the above-mentioned prediction block from the blocks which have been previously restored and stored into the above-mentioned block memory according to the above-mentioned criteria, scan the coefficient data of the above-mentioned prediction error according to one of the above-mentioned scan methods, and make the prediction mode for predicting the coefficient data of the above-mentioned prediction error include at least one of the followings:

(i) a first mode in which only the DC coefficient of the block located on the upper side of the objective current block to be processed is used for prediction and the coefficient data of the above-mentioned prediction error is subjected to the zigzag scan process;

(ii) a second mode in which only the DC coefficient of the block located on the left-hand side of the objective current block to be processed is used for prediction and the coefficient data of the above-mentioned prediction error is subjected to the zigzag scan process;

(iii) a third mode in which the DC coefficient and zero or more AC coefficients including high-frequency components of the top row of the block located on the upper side of the objective current block to be processed are used for prediction and the coefficient data of the above-mentioned prediction error is subjected to the horizontal scan process;

(iv) a fourth mode in which the DC coefficient and zero or more AC coefficients including high-frequency components of the leftmost column of the block located on the left-hand side of the objective current block to be processed are used for prediction and the coefficient data of the above-mentioned prediction error is subjected to the vertical scan process.

(n) It is acceptable to execute an inverse interleaving process on the above-mentioned decoded image data when restoring the original image data by forming pixels in a two-dimensional array from a plurality of groups each comprised of four interleaved blocks based on the above-mentioned decoded image data so that the odd-numbered pixels located in the odd-numbered rows are all obtained from the first block, even-numbered pixels located in the odd-numbered rows are obtained from the second block, the odd-numbered pixels located in the even-numbered rows are obtained from the third block and even-numbered pixels located in the even-numbered rows are obtained from the fourth block.

(o) The image predictive coding apparatus and the image predictive decoding apparatus may determine the above-mentioned prediction mode by a predetermined identical rule.

(p) The image predictive coding apparatus and the image predictive decoding apparatus may determine the above-mentioned scan method by a predetermined identical rule.

As described above, the third preferred embodiment group of the present invention is very effective in reducing or removing the redundancy in the DCT transform domain over the adjacent block, and the number of bits to be used is reduced, consequently allowing the coding efficiency to be remarkably improved. This is also useful as a tool of a novel video compression algorithm.

Although the above-mentioned preferred embodiments have described the image predictive coding apparatus and the image predictive decoding apparatus, the present invention is not limited to this. There may be an image predictive coding method including steps obtained by replacing the constituent elements such as the means and units of the image predictive coding apparatus with respective steps. There may also be an image predictive decoding method including steps obtained by replacing the constituent elements such as the means and units of the image predictive decoding apparatus with respective steps. In this case, for example, the steps of the above image predictive coding method and/or the image predictive decoding method are stored as a program into a storage device, and a controller such as a microprocessor unit (MPU) or a central processing unit (CPU) executes the program, thereby executing the image predictive coding process and/or the image predictive decoding process.

Furthermore, the present invention may provide a recording medium in which a program including the steps of the image predictive coding method and/or the image predictive decoding apparatus is recorded. The recording medium has a disk-like shape in which, for example, its recording region is segmented in a sector-like form or its recording region has a spiral form segmented into blocks, and the medium is provided by an optical disk such as CD-ROM or DVD, a magneto-optic disk or a magnetic disk such as a floppy disk.

INDUSTRIAL APPLICABILITY

As mentioned above, according to the present invention, there is provided an image predictive coding apparatus comprising:

dividing device operable to divide inputted image data to be coded into image data of a plurality of small regions which are adjacent to one another;

first generating device operate, when coding the image data of an objective small region to be processed among the image data of the plurality of small regions which are divided by the dividing device and adjacent to one another, to use image data of a reproduced reproduction small region adjacent to the image data of the objective small region to be processed as image data of an intra-frame prediction small region of the objective small region to be processed, to use the image data of the intra-frame prediction small region as image data of an optimum prediction small region and to generate image data of a difference small region which are differences between the image data of the objective small region to be processed and the image data of the optimum prediction small region;

coding device operable to code the image data of the difference small region generated by the generating device;

decoding device operable to decode the image data of the difference small region coded by the coding device; and second generating device operable to generate image data of a reproduced reproduction small region by adding the image data of the difference small region decoded by the decoding device to the image data of said optimum prediction small region.

Therefore, by merely using the reproduced pixel value adjacent to the image data of the objective small region to be processed as the pixel value of the intra-frame prediction signal, a high-accuracy prediction signal can be simply generated with a smaller amount of computations than in the prior arts, thereby allowing the obtainment of the unique effect that the number of bits of the intra-frame coding can be reduced.

Also, according to the present invention, there is provided an image predictive coding apparatus comprising:

sampling device operable to sample an inputted image signal into image data of a plurality of blocks each including pixel values of a two-dimensional array;

transforming device operable to transform the image data of the blocks sampled by the sampling device into coefficient data of a predetermined transform domain;

a block memory for storing therein coefficient data of a restored block;

predicting device operable to form coefficient data of a plurality of prediction blocks for the coefficient data of the block transformed by the transforming device based on the coefficient data of a block which has been previously reconstructed and stored in the block memory;

determining device operable to determine, select and output the coefficient data of a most efficient prediction block among the coefficient data of the plurality of prediction blocks formed by the predicting device and transmit an identifier indicating the selected prediction block in an indication bit form to an image predictive decoding apparatus;

first adding device operable to subtract the coefficient data of the prediction block selected by the determining device from the coefficient data of the current block at the present timing, thereby outputting coefficient data of a prediction error of the result of subtraction;

quantizing device operable to quantize the coefficient data of the prediction error outputted from the first adding device;

coding device operable to code in an entropy coding manner the coefficient data of the prediction error from the quantizing device and transmit the coded coefficient data of the prediction error to the image predictive decoding apparatus;

inverse quantizing device operable to inverse quantize the coefficient data of the prediction error from the quantizing device and output the coefficient data of the restored block;

second adding device operable to add the coefficient data of the prediction block outputted from the determining device to the coefficient data of the prediction error outputted from the inverse quantizing device to thereby output coefficient data of the restored block and storing the data into the block memory; and inverse transforming device operable to inverse transform the coefficient data of the block outputted from the second adding device, thereby generating image data of the restored block.

Therefore, novel image predictive coding apparatus and image predictive decoding apparatus which increase the coding efficiency at the present timing can be provided. The apparatuses do not require any complicated device operable to increasing the coding efficiency, and the circuit construction thereof is very simple and is able to be easily formed.

Further, according to the present invention, there is provided an image predictive coding apparatus comprising:

sampling device operable to sample an inputted image signal into image data of a plurality of blocks each including pixel values of a two-dimensional array;

transforming device operable to transform the image data of the blocks sampled by the sampling device into coefficient data of a predetermined transform domain;

a block memory for storing therein coefficient data of a restored block;

predicting device operable to form coefficient data of a plurality of prediction blocks for the coefficient data of the block transformed by the transforming device based on the coefficient data of a block which has been previously reconstructed and stored in the block memory;

determining device operable to determine, select and output the coefficient data and scan method of a most efficient prediction block among the coefficient data of the plurality of prediction blocks formed by the predicting device and transmit an identifier indicating the selected prediction block and scan method in an indication bit form to an image predictive decoding apparatus;

first adding device operable to subtract the coefficient data of the prediction block selected by the determining device from the coefficient data of the current block at the present timing, thereby outputting coefficient data of a prediction error of the result of subtraction;

quantizing device operable to quantize the coefficient data of the prediction error outputted from the first adding device;

scanning device operable to execute a scan process on the coefficient data of the prediction error from the quantizing device according to the scan method determined by the determining device and outputting the coefficient data of the prediction error obtained after the scan process;

coding device operable to code in an entropy coding manner the coefficient data of the prediction error obtained after the scan process outputted from the scanning device and transmit the coded coefficient data of the prediction error to the image predictive decoding apparatus;

inverse quantizing device operable to inverse quantize the coefficient data of the prediction error from the quantizing device and output the coefficient data of the restored block;

second adding device operable to add the coefficient data of the prediction block outputted from the determining device to the coefficient data of the prediction error outputted from the inverse quantizing device to thereby output coefficient data of the restored block and storing the data into the block memory; and inverse transforming device operable to inverse transform the coefficient data of the block outputted from the second adding device, thereby generating image data of the restored block.

Therefore, the apparatus is very effective in reducing or removing the redundancy in the transform domain over the adjacent block, and the number of bits to be used is reduced, consequently allowing the coding efficiency to be remarkably improved. This is also useful as a tool of a novel video compression algorithm.

What is claimed is:

1. An image predictive coding method comprising:
   sampling an image signal into a plurality of blocks;
   obtaining a quantized DC coefficient and quantized AC coefficients of a current block;
   adaptively selecting a prediction block for the current block from either an above block or a left block immediately adjacent to the current block;
   predicting the quantized DC coefficient of the current block from a quantized DC coefficient of the prediction block adaptively selected from either the above block or the left block; and
   predicting the quantized AC coefficients of the current block from either set of quantized AC coefficients of:
   (a) a first column of the left block when the left block is selected in the quantized DC coefficient prediction of the current block; or
   (b) a first row of the above block when the above block is selected in the quantized DC coefficient prediction of the current block.

2. An image predictive coding apparatus comprising:
   a sampling unit operable to sample an image signal into a plurality of blocks;
   a transforming unit operable to generate a quantized DC coefficient and quantized AC coefficients of a current block;
   a prediction block selecting unit operable to adaptively select a prediction block for the current block from either an above block or a left block immediately adjacent to the current block;
   a DC coefficient predicting unit operable to predict the quantized DC coefficient of the current block from a quantized DC coefficient of the prediction block adaptively selected from either an above block or a left block; and
   an AC coefficient predicting unit operable to predict the quantized AC coefficients of the current block from either set of quantized AC coefficients of:
   (a) a first column of the left block when the left block is selected in said DC coefficient predicting unit; or
   (b) a first row of the above block when the above block is selected in said DC coefficient predicting unit.

3. An image predictive coding method of claim 1, wherein the quantized AC coefficients of the prediction block used for predicting the quantized AC coefficients of the current block are scaled by a ratio of a quantization step-size of the current block and a quantization step-size of the prediction block.

4. An image predictive coding apparatus of claim 2, wherein the quantized AC coefficients of the prediction block used for predicting the quantized AC coefficients of the current block are scaled by a ratio of a quantization step-size of the current block and a quantization step-size of the prediction block.

* * * * *

UNITED STATES PATENT AND TRADEMARK OFFICE
CERTIFICATE OF CORRECTION

| | | |
|---|---|---|
| PATENT NO. | : 7,424,158 B2 | Page 1 of 1 |
| APPLICATION NO. | : 11/601796 | |
| DATED | : September 9, 2008 | |
| INVENTOR(S) | : Sheng Mei Shen | |

It is certified that error appears in the above-identified patent and that said Letters Patent is hereby corrected as shown below:

Title Page

In Section (*), after line 3, insert: --This patent is subject to a terminal disclaimer.--.

Signed and Sealed this

Sixth Day of January, 2009

JON W. DUDAS
*Director of the United States Patent and Trademark Office*